US011255248B2

(12) United States Patent
Christensen et al.

(10) Patent No.: US 11,255,248 B2
(45) Date of Patent: Feb. 22, 2022

(54) SNOWMOBILE HAVING A PARALLEL-PATH EXHAUST SYSTEM FOR TWO-STROKE ENGINE

(71) Applicant: Arctic Cat Inc., Thief River Falls, MN (US)

(72) Inventors: Cord Miller Christensen, Goodridge, MN (US); Alexander Konrad Fuhrman, Thief River Falls, MN (US)

(73) Assignee: ARCTIC CAT INC., Thief River Falls, MN (US)

( * ) Notice: Subject to any disclaimer, the term of this patent is extended or adjusted under 35 U.S.C. 154(b) by 699 days.

(21) Appl. No.: 16/158,554

(22) Filed: Oct. 12, 2018

(65) Prior Publication Data

US 2019/0107031 A1 Apr. 11, 2019

Related U.S. Application Data

(63) Continuation-in-part of application No. 16/103,718, filed on Aug. 14, 2018.

(Continued)

(51) Int. Cl.
*F01N 13/10* (2010.01)
*B62M 27/02* (2006.01)

(Continued)

(52) U.S. Cl.
CPC ............ *F01N 13/10* (2013.01); *B62M 27/02* (2013.01); *F02B 37/02* (2013.01);

(Continued)

(58) Field of Classification Search
CPC .. F01N 13/10; F01N 13/1805; F01N 2590/00; B62M 27/02; B62M 2027/023; F02B 37/02
See application file for complete search history.

(56) References Cited

U.S. PATENT DOCUMENTS 3,726,084 A 4/1973 Meier et al.
4,285,200 A 8/1981 Byrne et al.

(Continued)

FOREIGN PATENT DOCUMENTS

EP 2196641 6/2010
JP 59176419 10/1984

(Continued)

OTHER PUBLICATIONS

Push Turbo, http://www.pushturbo.com/home/arctic-cat-section/arctic-cat-800-turbo-kit-8000-2/, last viewed Jul. 11, 2017.

(Continued)

*Primary Examiner* — Jacob M Amick
(74) *Attorney, Agent, or Firm* — Billion & Armitage

(57) ABSTRACT

A snowmobile includes a frame, at least one ski, handbars operatively coupled to the at least one ski, and an engine assembly comprising an engine and an exhaust manifold. The exhaust manifold includes at least a first inlet, a first outlet, and a second outlet. The first inlet is configured to connect to a first exhaust port. The first outlet is connected to provide exhaust received from the first inlet to a first exhaust path and the second outlet is connected to provide exhaust received from the first inlet to a second exhaust path.

14 Claims, 54 Drawing Sheets

Related U.S. Application Data

(60) Provisional application No. 62/545,824, filed on Aug. 15, 2017.

(51) Int. Cl.
*F02B 37/02* (2006.01)
*F01N 13/18* (2010.01)

(52) U.S. Cl.
CPC .... *B62M 2027/023* (2013.01); *F01N 13/1805* (2013.01); *F01N 2590/00* (2013.01)

(56) References Cited

U.S. PATENT DOCUMENTS

| | | | | |
|---|---|---|---|---|
| 4,512,292 | A | 4/1985 | Hundertmark et al. | |
| 4,702,079 | A | 10/1987 | Saito et al. | |
| 6,561,297 | B2 | 5/2003 | Yatagai et al. | |
| 6,651,765 | B1 * | 11/2003 | Weinzierl | B62M 27/02 180/190 |
| 7,104,352 | B2 | 9/2006 | Weinzierl et al. | |
| 7,159,680 | B2 | 1/2007 | Pichler et al. | |
| 7,264,075 | B2 | 9/2007 | Schuemacher et al. | |
| 7,497,292 | B2 | 3/2009 | Yatagai et al. | |
| 8,011,342 | B2 | 9/2011 | Bluhm | |
| 8,459,392 | B2 | 6/2013 | Bernier et al. | |
| 2004/0109759 | A1 * | 6/2004 | Korner | F01D 25/26 415/205 |
| 2008/0142287 | A1 | 6/2008 | Simmons et al. | |
| 2009/0250281 | A1 | 10/2009 | Weinzierl | |
| 2012/0291747 | A1 | 11/2012 | Jurjevec et al. | |
| 2017/0122230 | A1 | 5/2017 | Bhattacharya et al. | |
| 2017/0211572 | A1 | 7/2017 | Jeong et al. | |
| 2017/0219085 | A1 | 8/2017 | Kiyokami et al. | |
| 2017/0241326 | A1 * | 8/2017 | Vezina | F02M 35/10157 |
| 2018/0215446 | A1 * | 8/2018 | Foxhall | F02M 26/41 |

FOREIGN PATENT DOCUMENTS

| | | |
|---|---|---|
| WO | 2009/114414 | 9/2009 |
| WO | 2010/105620 | 9/2010 |
| WO | 2016/038419 | 3/2016 |

OTHER PUBLICATIONS

Arcticinsider, "Everything You Wanted to know about the Arctic Cat C-TEC2 8000 Engine", Jan. 24, 2017, 11 pages.

* cited by examiner

SNOWMOBILE HAVING A PARALLEL-PATH EXHAUST SYSTEM FOR TWO-STROKE ENGINE

CROSS-REFERENCE TO RELATED TO APPLICATION(S)

This application is a continuation-in-part of U.S. application Ser. No. 16/103,718, filed Aug. 14, 2018 and titled "PRESSURIZED OIL SYSTEM POWERED BY TWO-STROKE ENGINE", which claims the benefit of U.S. Provisional Application No. 62/545,824, filed on Aug. 15, 2017, both of which are incorporated herein by reference herein. A claim of priority is made.

TECHNICAL FIELD

This invention relates generally to exhaust systems, and in particular to exhaust systems utilized in conjunction with turbocharged two-stroke engines.

BACKGROUND

Two-stroke engines are commonly employed in recreational vehicles, such as snow vehicles, due to the simplicity of design, power, and efficiency as compared with four-stroke engines. Turbochargers may be utilized in conjunction with a two-stroke engine to increase power. A turbocharger utilizes a turbine to extract energy from the exhaust of the two-stroke engine. The extracted energy drives a compressor, which provides compressed air to the engine for combustion. The provision of compressed air to the two-stroke engine increases the amount of fuel that is combusted, and therefore increases the power generated by the two-stroke engine. There remains a need to improve the efficacy and responsiveness of two-stroke engines employing turbochargers, particularly in the context of snow vehicles and snowmobiles.

SUMMARY

In order to improve responsiveness, it has been determined that it would be beneficial to locate the turbocharger relatively close to the exhaust outlet of the two-stroke engine and, in some instances, in a parallel arrangement with an expansion chamber. In some embodiments, an exhaust manifold includes at least a first inlet and a first and second outlet. The first inlet is configured to connect to at least a first exhaust port. The first outlet is connected to provide exhaust received from the first inlet to a first exhaust path. The second outlet is connected to provide exhaust received from the first inlet to a second exhaust path.

In some embodiments, a snowmobile a frame, at least one ski, handlebars operatively coupled to the at least one ski, and an exhaust system, which includes an exhaust manifold, an expansion chamber, and a turbocharger. The exhaust manifold includes first and second inlets and first and second outlets, wherein the first inlet is connected to receive exhaust from a first cylinder and the second inlet is connected to receive exhaust from a second cylinder. Exhaust provided at the first and second inlets is communicated by the exhaust manifold to the first and second outlets. The expansion chamber is connected to receive exhaust from the first outlet. The turbocharger is connected to receive exhaust from the second outlet.

In some embodiments, a snowmobile includes an engine system, wherein the engine system includes a two-stroke engine, an expansion chamber, a turbocharger, an exhaust muffler, and an intake manifold. The two-stroke engine includes at least a first combustion cylinder. The exhaust manifold includes at least a first inlet and first and second outlets, wherein the first inlet is connected to receive exhaust from the first combustion cylinder. Exhaust provided at the first inlet is communicated by the exhaust manifold to the first and second outlets. The expansion chamber is connected to receive exhaust from the first outlet and the turbocharger is connected to the second outlet to receive exhaust from the second outlet. Turbocharger utilizes the received exhaust to generated compressed air at a compressed air outlet. The exhaust muffler is connected to receive exhaust output from the turbocharger and an intake manifold is connected to receive compressed air from the turbocharger and to provide the compressed air to the first combustion cylinder for combustion.

DETAILED DESCRIPTION

Figure 1:
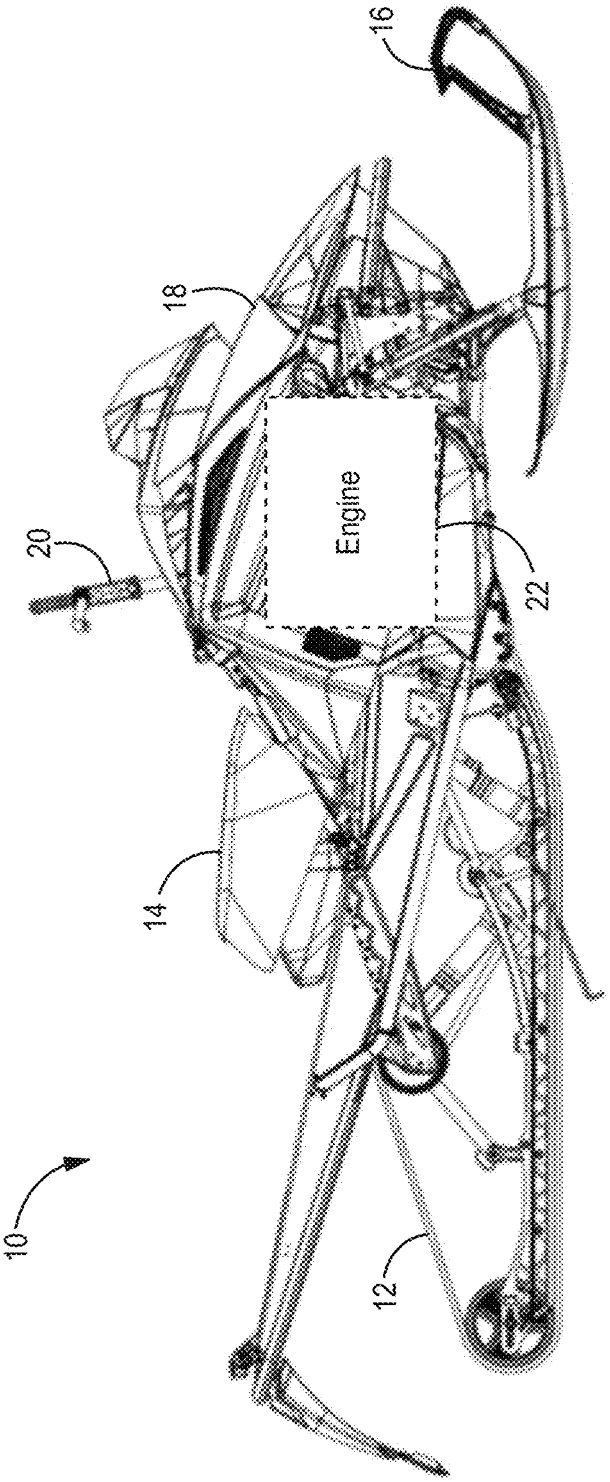
FIG. 1 is a side view of a snow vehicle according to one embodiment.

Referring to FIG. 1, a side view of a snow vehicle 10 is illustrated. In this embodiment, snow vehicle 10 is a snowmobile that includes track 12, seat 14, one or more skis 16, hood 18, handlebars 20 and engine 22 (obscured by hood 18). As discussed in more detail below, engine 22 includes a first oiling system and a second oiling system. In some embodiments, the first oiling system is a total loss oiling system utilized to lubricate engine 22. In some embodiments, the second oiling system is a pressurized, closed-loop oiling system utilized to provide lubrication to one or more accessories, which may be associated with engine 22. The second oiling system includes at least one pump, mechanically coupled to the engine 22 to provide the desired oil pressure—typically greater than that provided in the first oiling system. Utilizing a second oiling system, distinct from the first oiling system, allows engine 22 to make use of one or more accessories—such as turbocharger(s)—utilizing higher oil pressure than the available in the two-stroke engine relying on a total loss oiling system.

Figure 2:
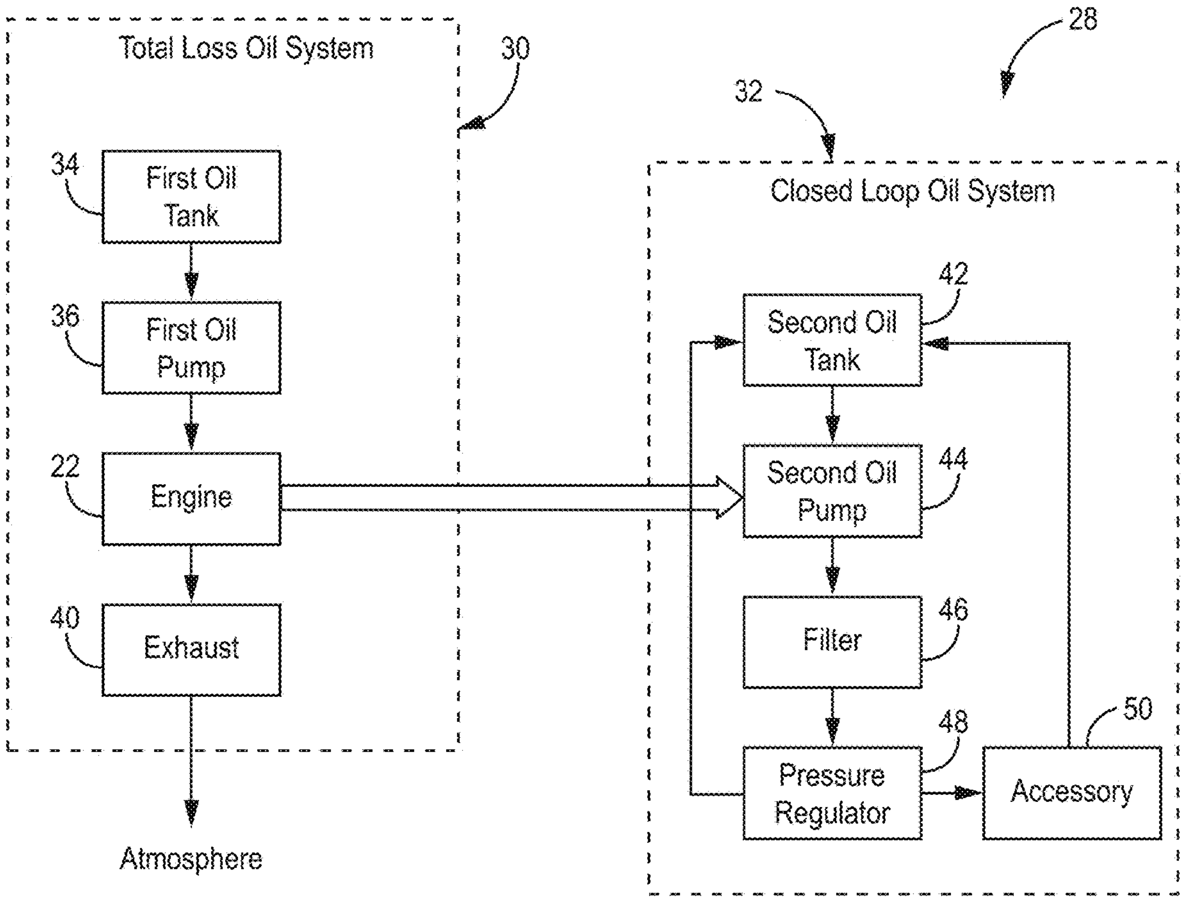
FIG. 2 is a block diagram of an oil distribution system that includes a first total-loss oiling system and a closed-loop oiling system according to one embodiment.

Referring now to FIG. 2, a block diagram of an oil distribution system 28 is shown that includes a first oiling system 30 and a second oiling system 32. In the embodiment shown in FIG. 2, first oiling system 30 includes first oil tank 34, first oil pump 36, two-stroke engine 22, and exhaust 40. Second oiling system 32 comprises second oil tank 42, second oil pump 44, filter (optional) 46, pressure regulator 48 and accessory 50. In this embodiment, first oiling system 30 is a total-loss system, in which oil provided to lubricate components of engine 22 is eventually combusted and dispelled into the atmosphere via exhaust 40. In particular, oil stored in first oil tank 34 is provided by one or more oil pumps 36 to two-stroke engine 22. The oil provided by oil pump(s) 36 is relatively low-pressure, which may be mixed with fuel and/or air and introduced in the cylinder(s), in the crankcase, or in both the cylinders and the crankcase. Oil provided by first oiling system 30 may be inadequate to properly lubricate one or more other accessories, such as a turbocharger.

In order to provide oil at a relatively higher oil pressure than that of the total-loss oiling system, a second oiling system 32 is provided. In some embodiments, the second oiling system 32 provides oil at a flow rate and/or pressure higher than that of the first oiling system 30. Oil pressure in the second oiling system 32 is developed by pump 44, which is mechanically coupled to the engine 22. In this way, although engine 22 is lubricated using a traditional total-loss oiling system, mechanical power provided by the engine is utilized to develop the oil pressure necessary for lubricating one or more accessories 50, such as one or more turbochargers and/or a high-pressure direct injection (HPDI) pressure pump assembly. In some embodiments, the second oiling system 32 provides oil to lubricate a cam lobe of an HPDI pressure pump assembly.

In the embodiment shown in FIG. 2, pump 44 is mechanically coupled to engine 22, and more particularly to the crankshaft (not shown in this view) of engine 22. Mechanical power generated by two-stroke engine 22 is utilized to drive pump 44. In contrast with the first oiling system 30, which provides oil at relatively low pressures to two-stroke engine 22 (e.g., less than 10 pounds per square inch (PSI)), the mechanical coupling of pump 44 to two-stroke engine 22 allows oil provided by pump 44 to be provided at higher pressures (e.g., greater than 10 PSI). In some embodiments, pressurized oil is filtered by filter 46 and regulated to a desired pressure by pressure regulator 48, wherein oil may be returned to second oil tank 42 from pressure regulator 48 if the pressure exceeds a desired pressure. As discussed below, some embodiments the respective locations of filter 46 and pressure regulator 48 may be modified—for example, by placing the pressure regulator 48 upstream of filter 46. Pressurized oil is fluidly communicated to one or more accessories 50 to lubricate the one or more accessories. In some embodiments, either in conjunction with or independent of utilizing the pressurized oil provided by second oiling system 32 for lubrication, the pressurized oil is utilized to provide hydraulic power to one or more components, and the oil is then returned to second oil tank 42. In some embodiments, oil provided to accessory 50 returns to second oil tank 42 simply due to gravity. In other embodiments, a secondary pump or 2 stage pump assembly (e.g., scavenge pump) may be utilized to pump oil utilized by accessory 50 to second oil tank 42. As described below (for example, with respect to FIG. 13), the scavenge pump may similarly be mechanically coupled to the engine 22, such that mechanical power generated by the two-stroke engine 22 is utilized to drive the scavenge pump. In some embodiments, one or both of the oiling systems (first oiling system 30 and second oiling system 32) includes an oil cooler to cool the oil.

The oil pressure provided by second oiling system 32 to accessory 50 may vary in some embodiments based on the engine RPM and/or engine load. In some embodiments, pressurized oil provided to accessory 50—under most operating conditions—has a pressure greater than that provided by first oiling system 30. In some embodiments, pressurized oil provided to accessory 50 may vary based on engine RPMs and/or engine load, but while the engine is running will provide an oil pressure that exceeds 10 PSI and, in some embodiments exceeding 20 PSI, 30 PSI, or 40 PSI. In some embodiments, the oil pressure generated by pump 44 and/or regulated by pressure regulator 48 is selected to satisfy the particular requirements of accessory 50. For example, in embodiments in which accessory 50 is a turbocharger, pressure provided may be greater than 10 PSI, 20 PSI, 30 PSI, and, in some embodiments, greater than 40 PSI. In this way, the second oiling system provides pressurized oil to one or more accessories. One of the benefits of this arrangement, in addition to the higher pressure provided by the second oiling system 32, is the ability to utilize oil in the second oil tank 42 having a composition selected specifically for lubricating the one or more accessories. That is, because oil utilized in first oiling system 30 is separate from the oil utilized in second oiling system 32, each can utilize a type of oil selected specifically for the particular application (e.g., first oil tank 34 may be comprised of oil selected to lubricate a two-stroke engine 22, while second oil tank 42 may be comprised of oil selected to lubricate the attached accessory 50). In some embodiments, the oil selected to lubricate the two-stroke engine 22 has a first viscosity or first range of viscosities, for example if it is a multi-viscosity oil. And, in some embodiments, the oil selected to lubricate (or power) the attached accessory 50 may have a second viscosity or second range of viscosities, for example if it is multi-viscosity oil. In some embodiments, the first viscosity (or first range of viscosities) is different than the second viscosity (or second range of viscosities). Further, in some embodiments, the oil selected to lubricate the two-stroke engine 22 may have different additives than the oil selected to lubricate (or power) the attached accessory 50. In some embodiments, first oil tank 34 and/or second oil tank 42 are closed, but in other embodiments, first oil tank 34 and/or second oil tank 42 are vented.

Figure 3:
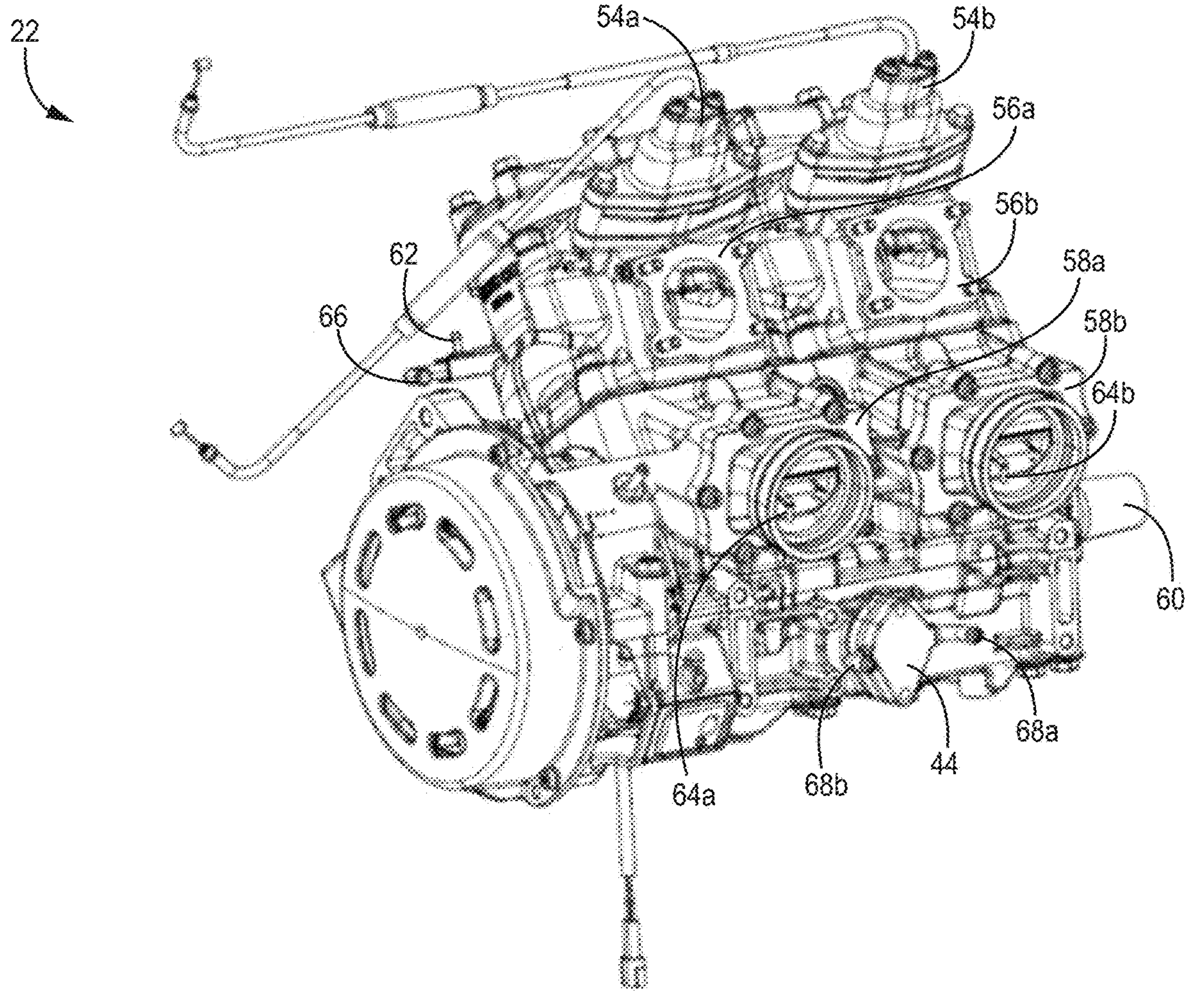
FIG. 3 is a perspective view of a two-stroke engine and oil pump utilized in the closed-loop oiling system according to one embodiment.
Figure 4:
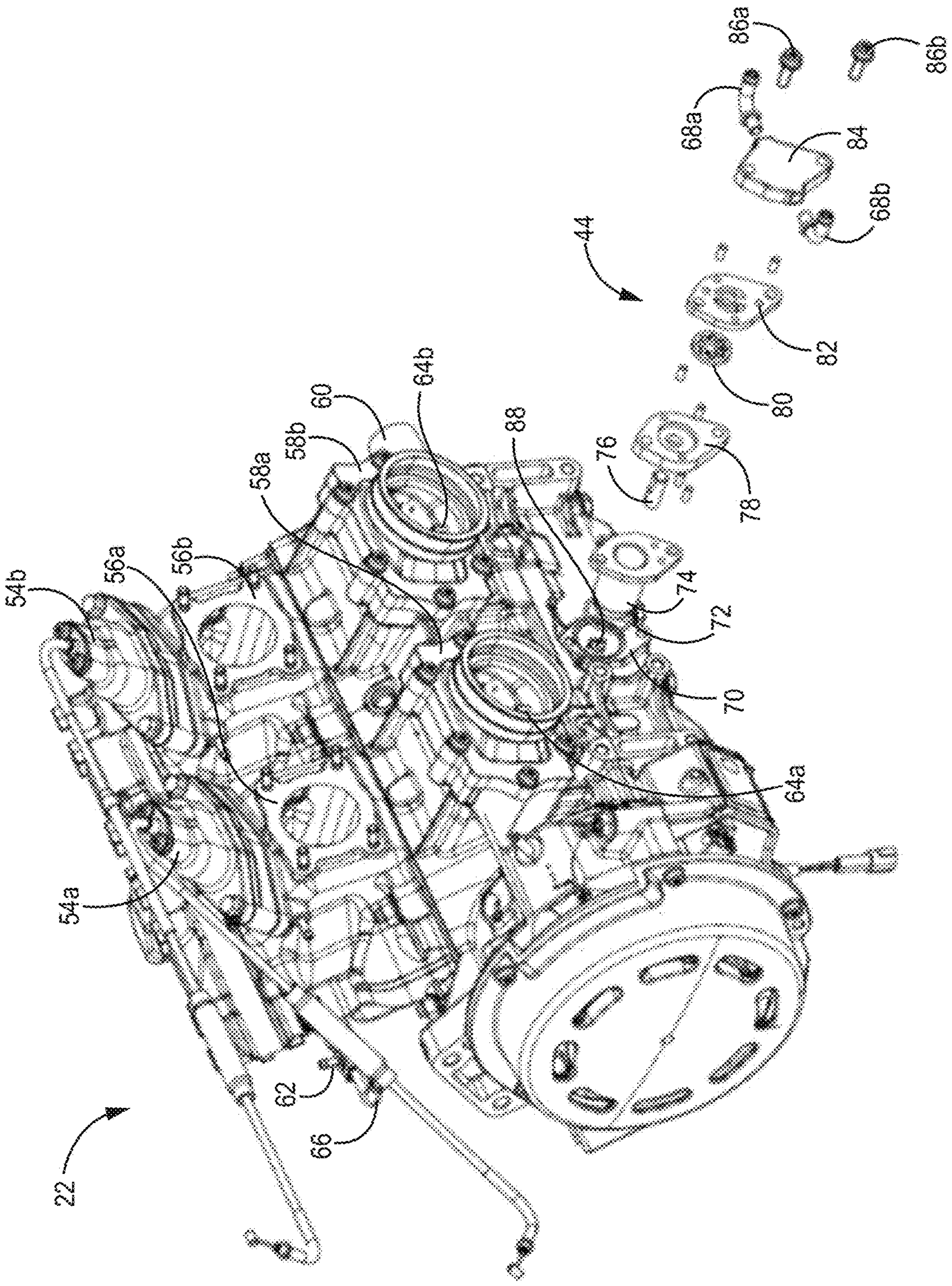
FIG. 4 is a perspective view of a two-stroke engine and exploded view of the oil pump utilized in the closed-loop oiling system according to one embodiment.
Figure 5:
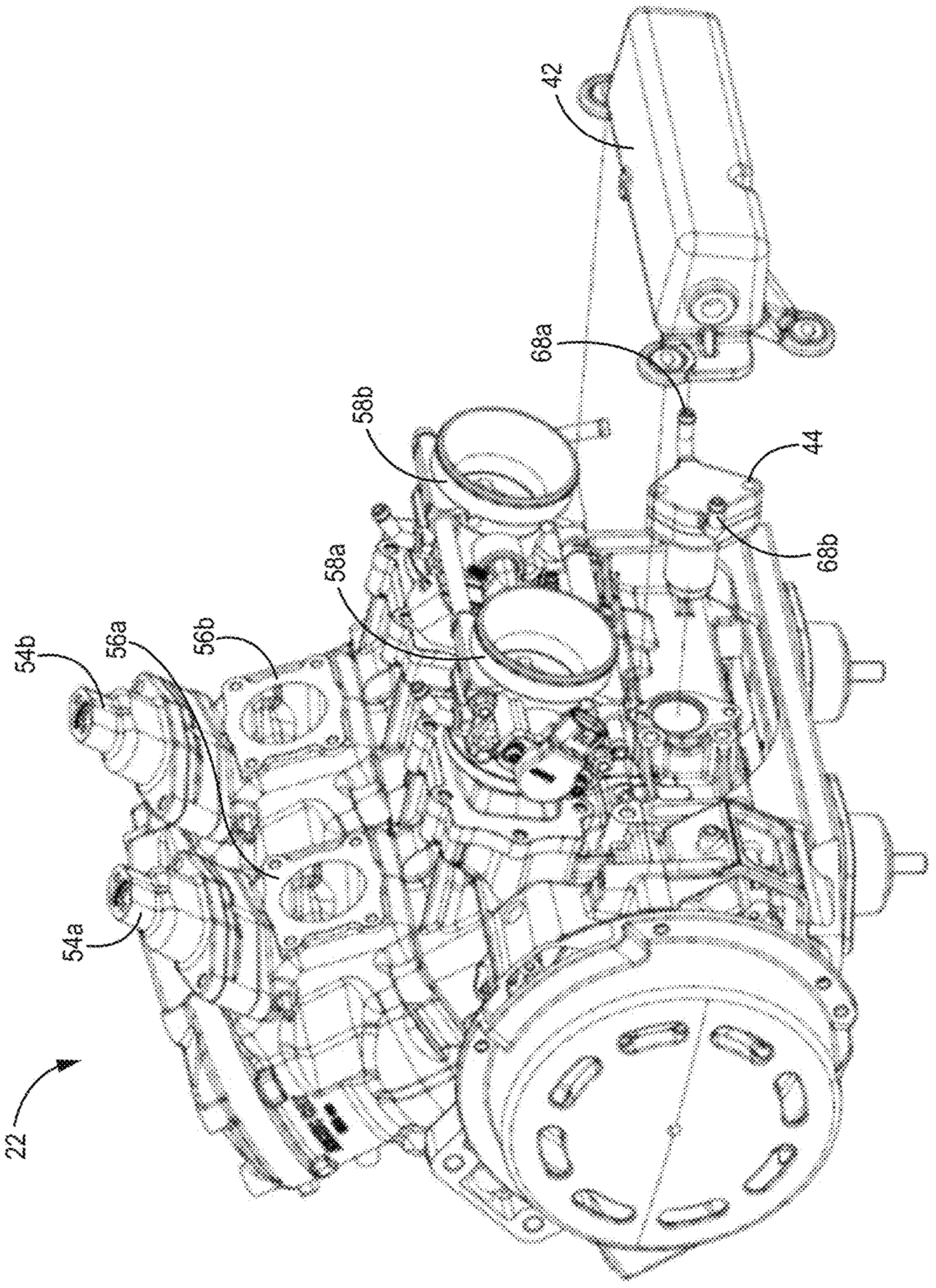
FIG. 5 is a perspective view of a two-stroke engine and exploded view of the oil pump and oil tank according to one embodiment.
Figure 6:
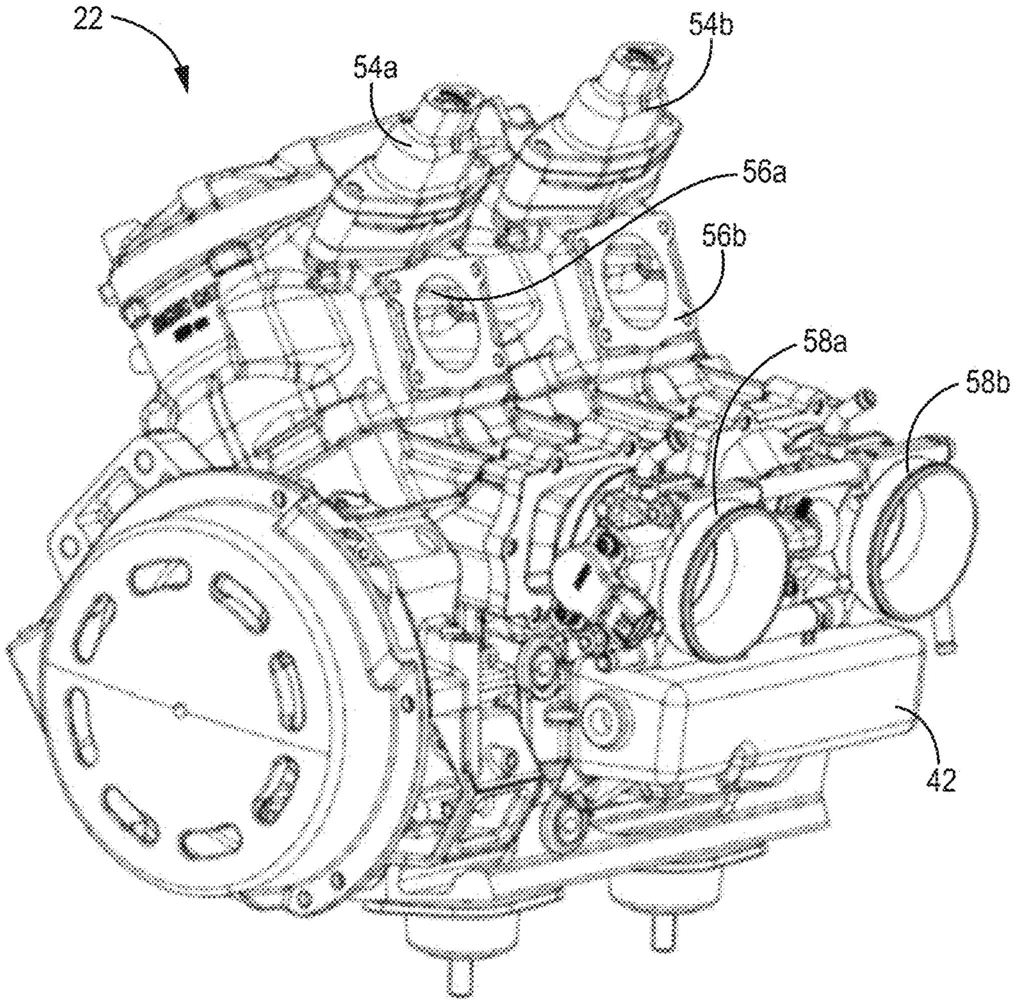
FIG. 6 is a perspective view of a two-stroke engine and installed oil tank according to one embodiment.

Referring now to FIGS. 3-6, perspective views of a two-stroke engine 22 are shown that include the oil pump 44 utilized in the second oiling system described with respect to FIG. 2. In particular, FIG. 3 illustrates oil pump 44 in an assembled and installed state; FIG. 4 illustrates oil pump 44 in an exploded view that illustrates components of an embodiment of an oil pump 44; FIG. 5 illustrates oil pump 44 and an embodiment of an oil tank 42 in an exploded view; and FIG. 6 illustrates an embodiment of an oil pump 44 (not visible) and oil tank 42 in an assembled state.

The embodiments shown in FIGS. 3-6 illustrates a two-cylinder, two-stroke engine, which may or may not include exhaust valve assemblies 54*a* and 54*b* (in some embodiments), exhaust ports 56*a* and 56*b*, air intake ports 58*a* and 58*b*, crankshaft 60, oil inlet ports 62, 64*a* and 64*b* associated with the first oiling system 30 (i.e., the total loss oiling system associated with two-stroke engine), and fuel inlet port 66. In some embodiments, fuel is provided to a fuel rail via fuel inlet port 66. First oiling system 30 provides lubrication to engine 22. In particular, oil is mixed directly with fuel via oil inlet port 62, and in addition is distributed into the crankcase via oil inlet ports 64*a* and 64*b*. As discussed above, in at least some embodiments, oil provided by the first oiling system to oil inlet ports 62, 64*a*, and 64*b* is provided at a relatively low pressure, and may therefore not be at a high enough pressure for accessories (not shown in this view) that require a higher oil pressure. In some embodiments, oil provided by the first oiling system to oil inlet ports 62, 64*a*, and 64*b* is provided at pressures less than 10 psi. In the embodiment shown in FIG. 3, the second oiling system 32, which in particular includes oil pump 44 and associated inlet/outlet ports 68*a* and 68*b*, operates a pressure greater than the first oiling system.

In the embodiment shown in FIG. 3, oil pump 44 is mechanically coupled to crankshaft 60. In this way, mechanical power developed in crankshaft 60 is delivered to oil pump 44, which provides pressurized oil to one or more accessories (not shown in this view). As described above, oil inlet ports 62, 64*a* and 64*b* are configured to provide oil to the cylinders and crankcase as part of the two-stroke oiling system (i.e., first oiling system 30), and are therefore not in fluid connection with oil pump 44. That is, as described with respect to FIG. 2, two distinct oiling systems are included: the two-stroke oiling system utilized to lubricate engine components such as the cylinders and crankcase as part of a total loss oiling system, and the pressurized accessory oiling system utilized to provide pressurized oil to one or more accessories. As illustrated in FIG. 3, some benefits of second oiling system 32 are: ability to provide pressurized oil in a limited amount of space (i.e., does not take up much real estate within engine 22); ability to provide oiling systems at different pressures; ability to provide oiling systems with different oils.

FIG. 4 is a perspective view of a two-stroke engine 22 and exploded view of oil pump 44 utilized in the second oiling system 32 according to one embodiment. In the embodiment shown in FIG. 4, oil pump 44 is a gerotor pump that includes mount 70, o-ring 72, bushing 74, shaft extender 76, gerotor housing 78, gear pair 80, inlet/outlet plate 82, inlet/outlet fitting 84, bolts 86*a* and 86*b*, and inlet/outlet port 68*a* and 68*b*.

In this embodiment, oil pump 44 is bolted to mount 70 using one or more fasteners such as bolts 86*a* and 86*b*. A shaft 88 (partially visible) is mechanically coupled to crankshaft 60 to deliver mechanical power from crankshaft 60 to oil pump 44 (e.g., via a power take-off). Rotating shaft 88 is surrounded, at least in part, by bushing 74. In other embodiments, bushing 74 is replaced by a sealed bearing assembly that surrounds rotating shaft 88. Shaft extender 76 is coupled to shaft 88, which in turn is coupled to the gear pair 80 housed within gerotor housing 78. Mechanical power causes one of the gerotor gears to rotate relative to the other gear, which results in fluid (e.g., oil) being pumped from an inlet/outlet port 68*a*, through inlet/outlet plate 82, to the other inlet/outlet port 68*b*. Mechanical power delivered to the gerotor ring (e.g., inner ring) results in oil being pumped from one of the inlet/outlet ports 68*a* to the other inlet/outlet port 68*b*.

FIG. 5 is a perspective view of a two-stroke engine 22 and exploded view of the assembled oil pump 44 and oil tank 42 according to one embodiment. One of the inlet/outlet ports 68*a* and 68*b* is positioned to draw oil from oil tank 42. As a closed-loop system, oil drawn from oil tank 42 by oil pump 44 is provided to one or more accessories and then returned to oil tank 42 as part of a recirculation path.

FIG. 6 shows a perspective view of an embodiment of a two-stroke engine 22 having an oil tank 42 installed. By locating oil pump 44 near the bottom of the engine, in at least some embodiments, oil is returned to oil tank 42 via gravity, without requiring a separate scavenge pump. However, it should be noted that in some embodiments, the location of oil pump 44 and oil tank 42 may be located in an appropriate location or configuration.

Figure 7:
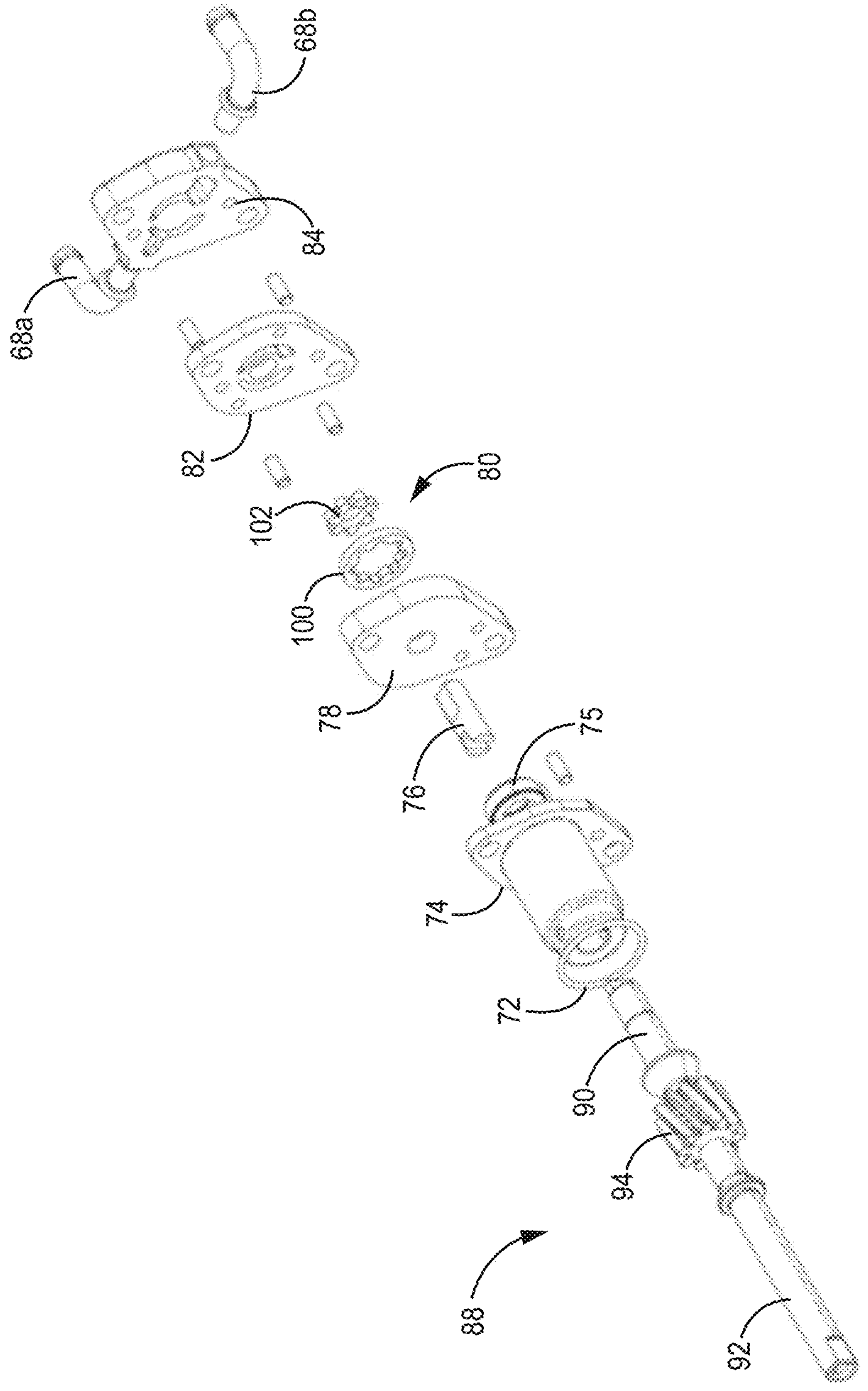
FIG. 7 is an exploded rear view of the oil pump according to one embodiment.
Figure 8:
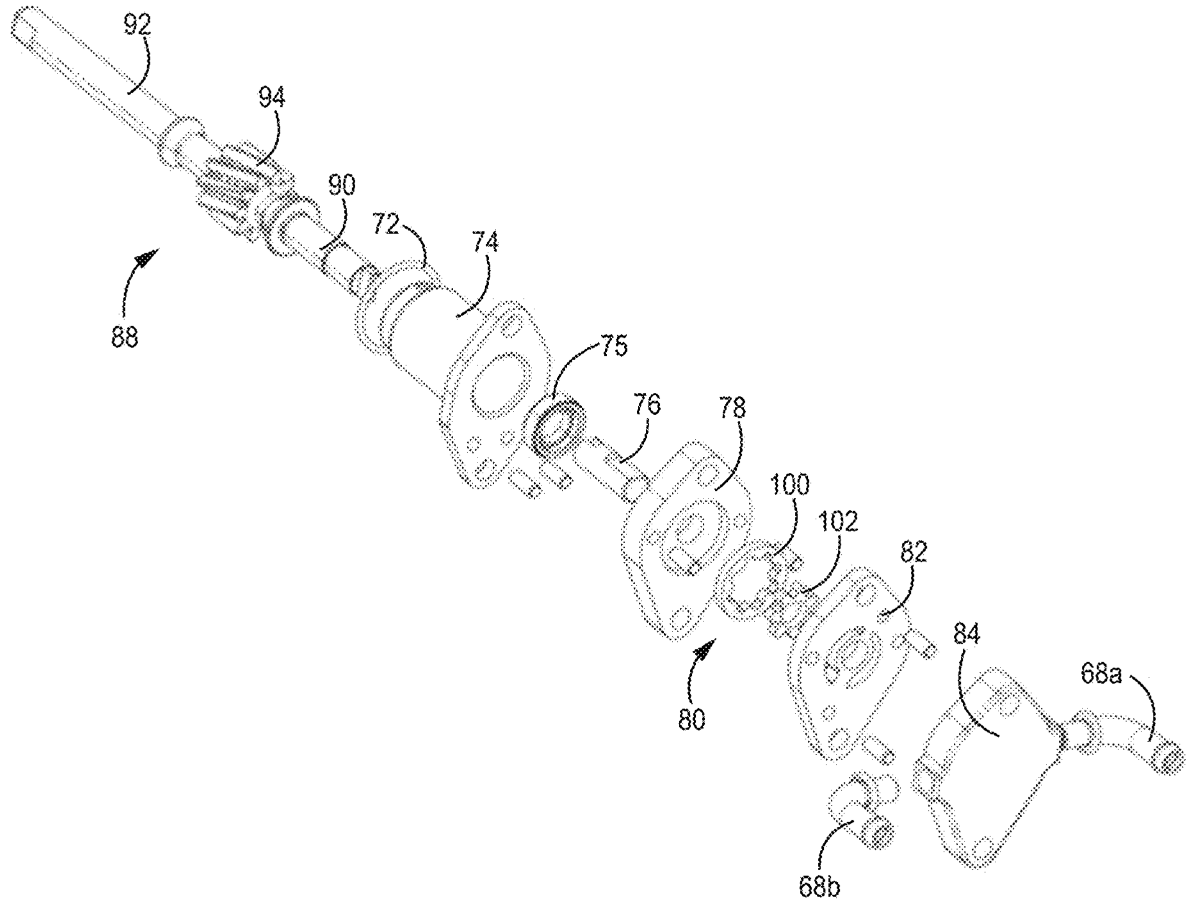
FIG. 8 is an exploded front view of the oil pump according to one embodiment.
Figure 9:
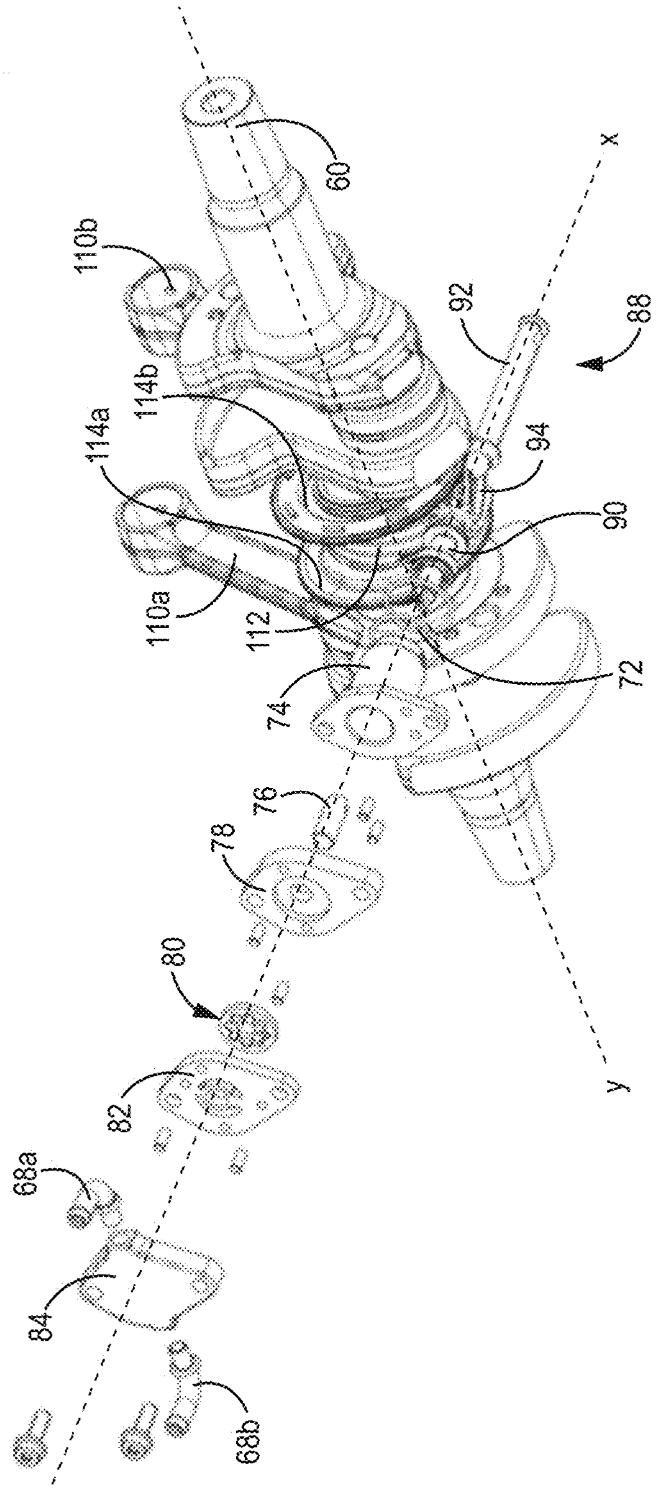
FIG. 9 is an exploded view of the oil pump mechanically coupled to the crankshaft according to one embodiment.

Referring now to FIGS. 7, 8, and 9, exploded views of an embodiment of oil pump 44 are provided. In particular, FIGS. 7 and 8 illustrate exploded views of oil pump 44, and FIG. 9 illustrates an exploded view of oil pump 44, which is mechanically coupled with crankshaft 60 according to various embodiments. As discussed with respect to FIG. 4, oil pump 44 includes o-ring 72, bushing 74, oil seal 75, shaft extender 76, gerotor housing 78, gear pair 80, inlet/outlet plate 82, inlet/outlet fitting 84 and inlet/outlet ports 68*a* and 68*b*. FIGS. 7 and 8 illustrate the power take-off shaft 88 and gearing utilized to transfer mechanical power from crankshaft 60 to oil pump 44. The embodiment shown in FIGS. 7 and 8, power take-off shaft 88 includes first portion 90, second portion 92 and gear 94. In some embodiments, gear 94 is a helical gear or spur gear that is coupled to the gear 112 (shown in FIG. 9) of crankshaft 60 in a crossed configuration in order to communicate mechanical power from a first axis to a perpendicular axis. In one embodiment, first oiling system 30 provides oil to lubricate the gear 112 (e.g., worm gear), wherein provided oil is returned to oil first oil tank 34 (shown in FIG. 2) and eventually provided to inlet ports 62, 64*a* and 64*b*, as part of the total loss oiling system.

The first portion 90 of power-take-off shaft 88 is housed and, in some embodiments, at least partially supported via bushing 74. As discussed above, in some embodiments the bushing 74 may be replaced with a sealed bearing assembly (e.g., roller bearing or ball bearing). First portion 90 is coupled to shaft extender 76, which in turn is mechanically coupled or integral in some embodiments to inner gear 102 of the gear pair 80. In this way, mechanical energy developed by the engine 22 in crankshaft 60 is communicated to inner gear 102. As inner gear 102 rotates relative to outer gear 100, the difference in number of teeth between inner gear 102 and outer gear 100 results in oil being drawn into the gears from a suction port (e.g., either inlet/outlet port 68*a* or 68*b*) and expelled through a discharge port (e.g., inlet/outlet port 68*a* or 68*b*). In some embodiments, the rotational speed of the shaft determines, at least in part, the volume, flow rate, and/or pressure of the oil expelled through the discharge port. As the shaft speed increases, the volume, flow rate, and/or pressure of oil discharged increases. In other embodiments, the pressure, flow rate, and/or volume of oil discharged is further calibrated by alternate widths of inner gear 102 and outer gear 100. In some embodiments, a pressure regulator is utilized in conjunction with the oil pump 44 to limit/regulate the oil pressure provided. In some embodiments, the pressure regulator may be incorporated as part of oil pump 44, while in other embodiments the pressure regulator may be implemented external to oil pump 44, for example downstream of the oil pump 44. In some embodiments, the oil pump 44 is a variable flow pump, for example a gerotor variable flow pump.

FIG. 9 illustrates the interaction between gear 94 and crankshaft 60. In particular, FIG. 9 illustrates connecting rods 110*a* and 110*b*, which are connected at a distal end to respective pistons (not shown), for example via wrist pins (also not shown), and on the other end to crankshaft 60. Although shown in FIG. 9 in relation to a two-cylinder engine, engines of any number of cylinders can be employed. The reciprocating motion provided by the pistons and connecting rods 110*a* and 110*b* causes crankshaft 60 to rotate about an axis y. In the embodiment shown in FIG. 9, crankshaft 60 includes gear 112, located between connecting rods 110*a* and 110*b* (and further located between oil seals 114*a* and 114*b*). Gear 112 is configured to interact with gear 94, causing power take-off shaft 88 to rotate about axis x. In some embodiments, axis x is perpendicular to axis y. The gears 112 and 94 are selected to provide the desired gear ratio, which may vary depending on the application.

Figure 10:
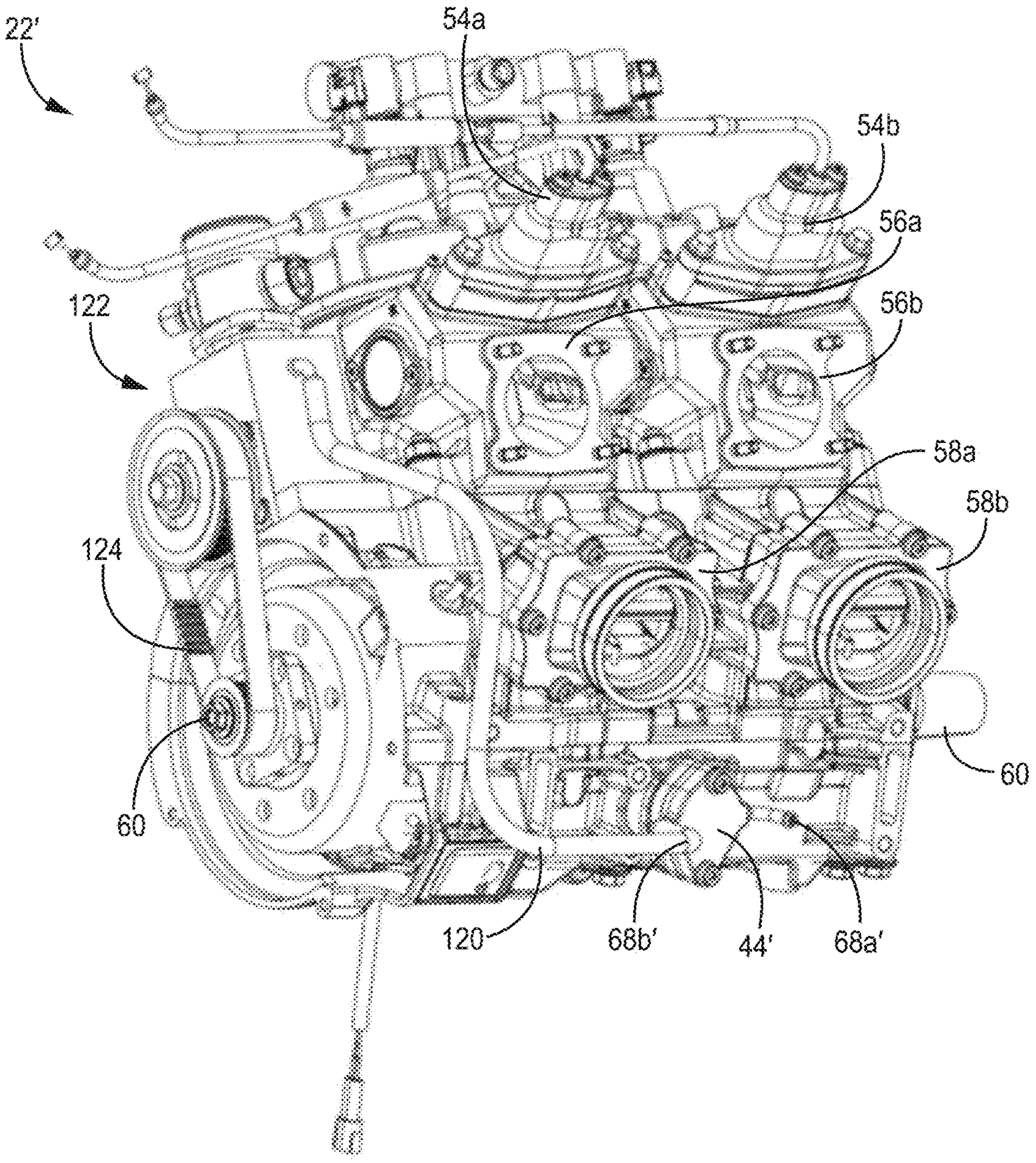
FIG. 10 is a perspective view of a two-stroke engine including an accessory connected to receive oil from the closed-loop oiling system according to one embodiment.

Referring now to FIG. 10, a perspective view of a two-stroke engine 22' is provided that illustrates an accessory connected to receive oil from the closed-loop oiling system. Components of two-stroke engine 22' remain relatively the same as that described with respect to FIGS. 3-6. However, in this embodiment, two-stroke engine 22' further includes an accessory 122. In the embodiment shown in FIG. 10, accessory 122 is a high-pressure direct injection (HPDI) pressure pump assembly that is coupled to crankshaft 60 via belt 124. Although shown as being driven by a belt 124, in some embodiments, the accessory 122 can be driven by a chain, gear set, or in any other suitable way. In this embodiment, one or more cam lobes (not visible) included as part of the HPDI pressure pump assembly 122 are utilized to convert rotational motion to linear motion/actuation of accessories associated with engine 22'. Lubrication of the cam lobes is provided by oil pump 44', which provides pressurized oil via line 120 to HPDI pressure pump assembly 122. Line 120 may be a flexible hose or a hard tube, depending on the application. In other embodiments, accessory 122 may be utilized in applications other than HPDI pressure pump assembly.

Oil provided to accessory 122 is returned to oil tank 42 (shown in FIG. 5). In some embodiments, because accessory 122 is located above oil pump 44' and oil tank 42, pressurized oil provided to accessory 122 is returned to oil tank 42 by way of gravity. In other embodiments, however, a sump and scavenge pump may be relied upon to return oil to oil tank 42 as part of the closed-loop pressurized oiling system. In addition, in some embodiments a pressure regulator may be connected between oil pump 44' and accessory 122—e.g., along line 120—to regulate the pressure of oil provided to accessory 122. In some embodiments, line 120 is flexible while in some embodiments it is formed from a stiff material. In some embodiments, the pressure regulator may be connected to oil tank 42 (as shown in FIG. 5), in which excess oil is directed to oil tank 42 to maintain a desired oil pressure, for example via a bypass. In some embodiments, the pressure regulator is incorporated as part of oil pump 44'.

In some embodiments, accessory 122 requires oil pressure greater than that provided by the total loss oiling system (i.e., first oiling system 30) connected to provide oil to engine 22. In particular, in some embodiments, oil pressure greater than 10 PSI is provided to accessory 122. In some embodiments, an oil pressure greater than 20 PSI is provided to accessory 122, and in some embodiments an oil pressure greater than 40 PSI is provided to accessory 122.

Figure 11A:
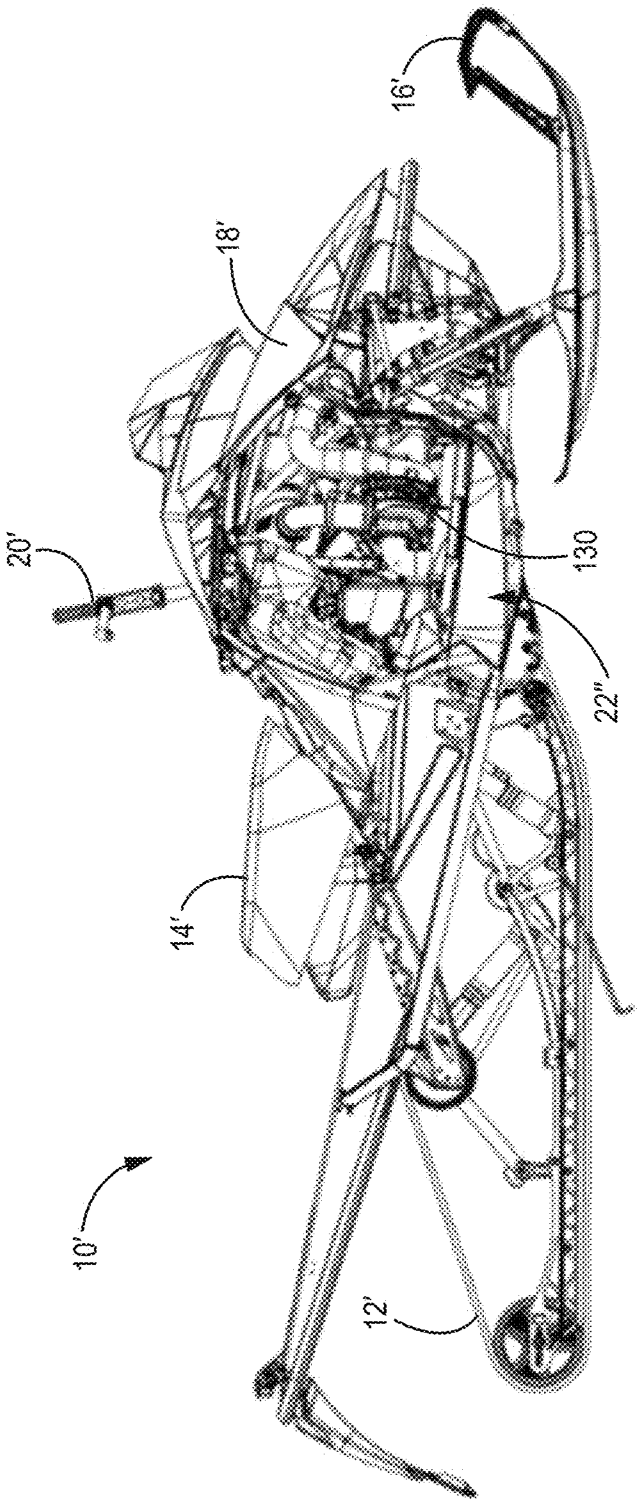
FIGS. 11A-11B are side views of a snow vehicle including a turbocharger according to one embodiment.
Figure 11B:
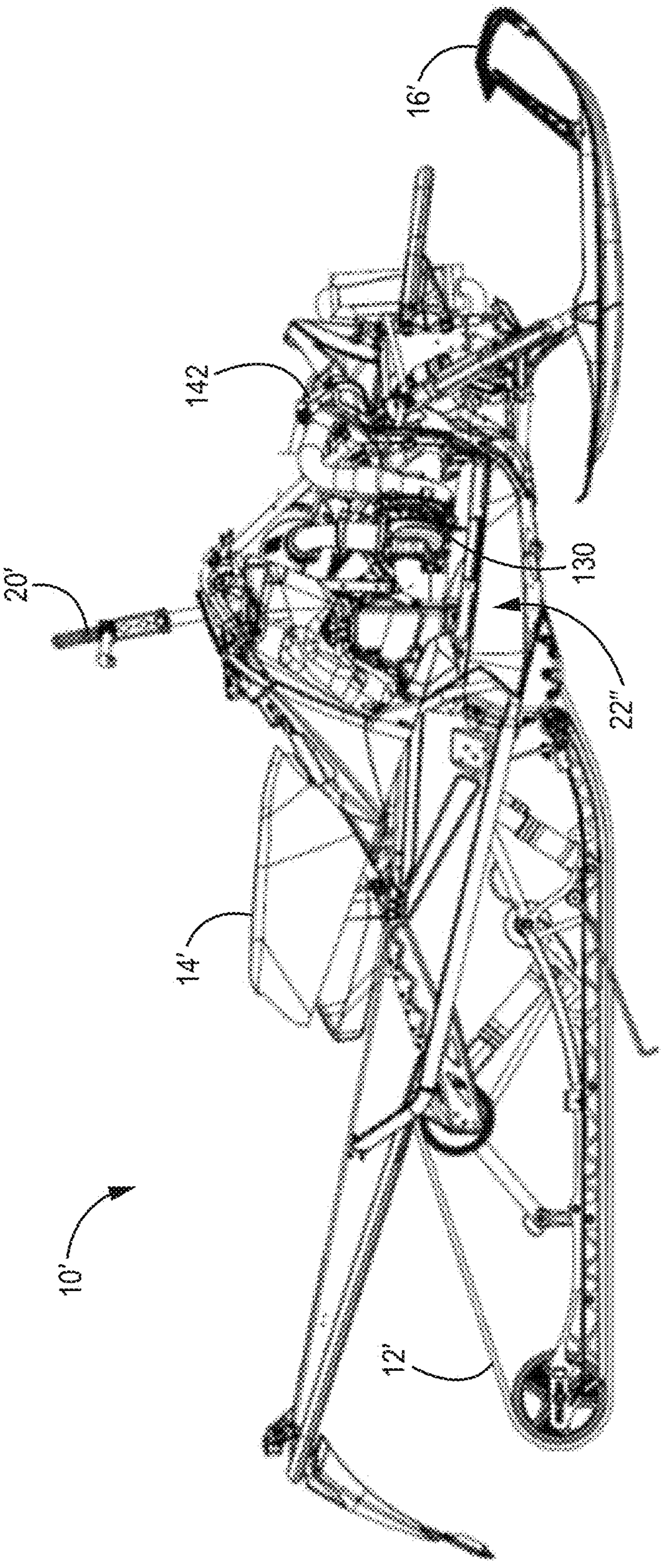

Referring now to FIGS. 11A-11B, an embodiment of a snowmobile 10' is illustrated that employs a turbocharger 130 configured to provide compressed air to the cylinders, wherein a second oiling system (i.e., closed-looped oiling system) is utilized to provide pressurized oil to the turbocharger 130. In particular, FIGS. 11A and 11B are side views of snowmobile 10' that illustrates a possible position of turbocharger 130 relative to engine 22". In the embodiment shown in FIGS. 11A and 11B, snowmobile 10' includes track 12', seat 14', one or more skis 16', hood 18', handlebars 20' and engine 22" (partially obscured by hood 18). As discussed in more detail below, engine 22" includes a first oiling system and a second oiling system. The first oiling system is a total loss oiling system utilized to lubricate engine 22". The second oiling system is a pressurized, closed-loop oiling system utilized to provide lubrication to one or more accessories associated with engine 22", including at least turbocharger 130. The second oiling system includes at least one pump (not visible in this view), mechanically coupled to the engine 22" to provide the desired oil pressure—for example greater than that provided in the first oiling system. Utilizing a second oiling system, distinct from the first oiling system, allows engine 22" to make use of accessories—such as turbocharger 130—that requires a higher oil pressures than that made available in a typical two-stroke engine relying on a total loss oiling system.

As discussed in more detail below, turbocharger 130 is connected to receive exhaust from engine 22", wherein mechanical energy is extracted from the flow of the exhaust and utilized to drive a compressor that provides compressed air for mixture with the fuel provided to the cylinders. In the embodiment shown in FIGS. 11A-11B, the compressed air is cooled by intercooler 142 prior to mixing with fuel. In one embodiment, intercooler 142 may be an air-to-air intercooler or a water-to-air intercooler.

In the embodiment shown in FIGS. 11A and 11B, turbocharger 130 is positioned adjacent to engine 22", with intercooler 142 positioned in front of engine 22". In other embodiments, the location of intercooler 142 relative to engine 22" may be modified. For example, in some embodiments, intercooler 142 may be positioned behind engine 22" or above engine 22". Air compressed by turbocharger 130 is provided to intercooler 142, to cool the compressed air prior to provision to air intake ports (not shown in this view). The second oiling system is connected to provide lubrication to turbocharger 130. As a closed-loop oiling system, oil provided to turbocharger 130 is returned to the oil tank (e.g., oil tank 42 shown in FIG. 11C or oil tank 42" shown in FIG. 12).

Figure 12:
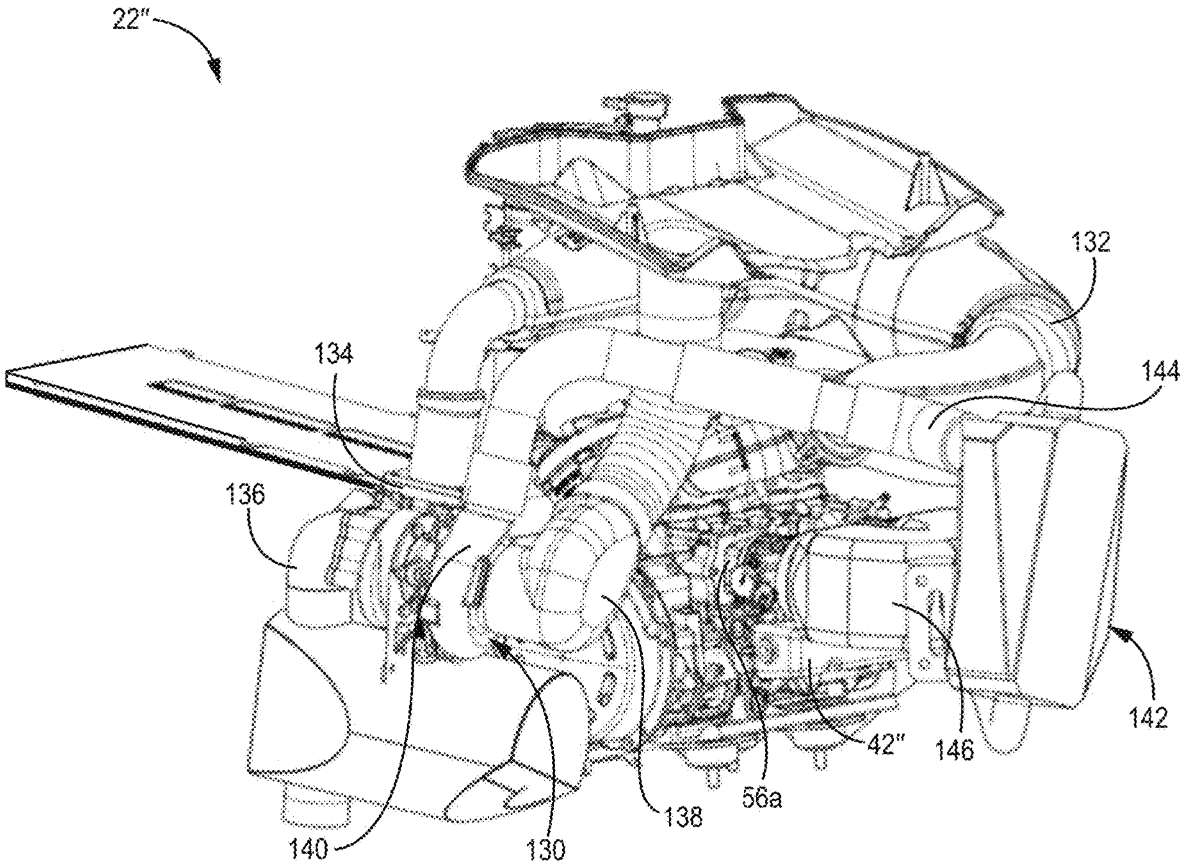
FIG. 12 is a perspective view of a two-stroke engine including a turbocharger connected to receive oil from the closed-loop oiling system according to one embodiment.

FIG. 12 is a perspective view illustrating the relative positions of turbocharger 130, intercooler 142, oil tank 42" and an oil pump (obscured by oil tank 42") according to some embodiments. Turbocharger 130 is connected to receive oil from the closed-loop oiling system (i.e., second oiling system 32 shown in FIG. 2), which includes an oil pump (e.g., similar to oil pump 44 shown in FIG. 3 and/or oil pump 44' shown in FIG. 10) and oil tank 42" (wherein the oil pump is obscured by oil tank 42"). In some embodiments, the turbocharger 130 is utilized in conjunction with another accessory such as the one described with respect to FIG. 10. In some embodiments, the turbocharger 130 is used without the additional accessory described with respect to FIG. 10. In some embodiments, however, the turbocharger 130 can be used in conjunction with one or more additional accessories, such as the HPDI system previously described. In some embodiments, turbocharger 130 includes exhaust inlet port 134, exhaust outlet port 136, air inlet port 138, and compressed air outlet port 140. In general, a turbocharger operates by receiving exhaust provided by engine 22" (see exhaust path 132). The exhaust is provided to exhaust inlet port 134. A turbine located within the turbocharger 130 is utilized to extract energy (e.g., mechanical power) from the received exhaust. The mechanical energy extracted by the turbine (not shown) is utilized to provide power to a compressor (not shown), which compresses air received at air inlet port 138 to provide compressed air at compressed air outlet port 140. The compressed air is provided to the air intake ports (of which, air intake port **58*a* is visible) of two-stroke engine 22"**.

In some embodiments, such as that shown in FIG. 12, compressed air is provided to an intercooler 142 to cool the compressed air prior to being provided to air intake port. In the embodiment shown in FIG. 12, intercooler is connected to receive compressed air from turbocharger 130 via air intake port 144. Intercooler cools the received compressed air, and outputs the cooled, compressed air to air intake ports via output port 146. Air output port 146 may be integrally formed with intercooler 142, or may be attached to intercooler 142. In some embodiments, such as that shown in FIG. 12, intercooler 142 is an air-to water intercooler utilizing a liquid coolant to remove heat from the compressed air. In some embodiments, the turbocharger is utilized without an intercooler 142.

Figure 15:
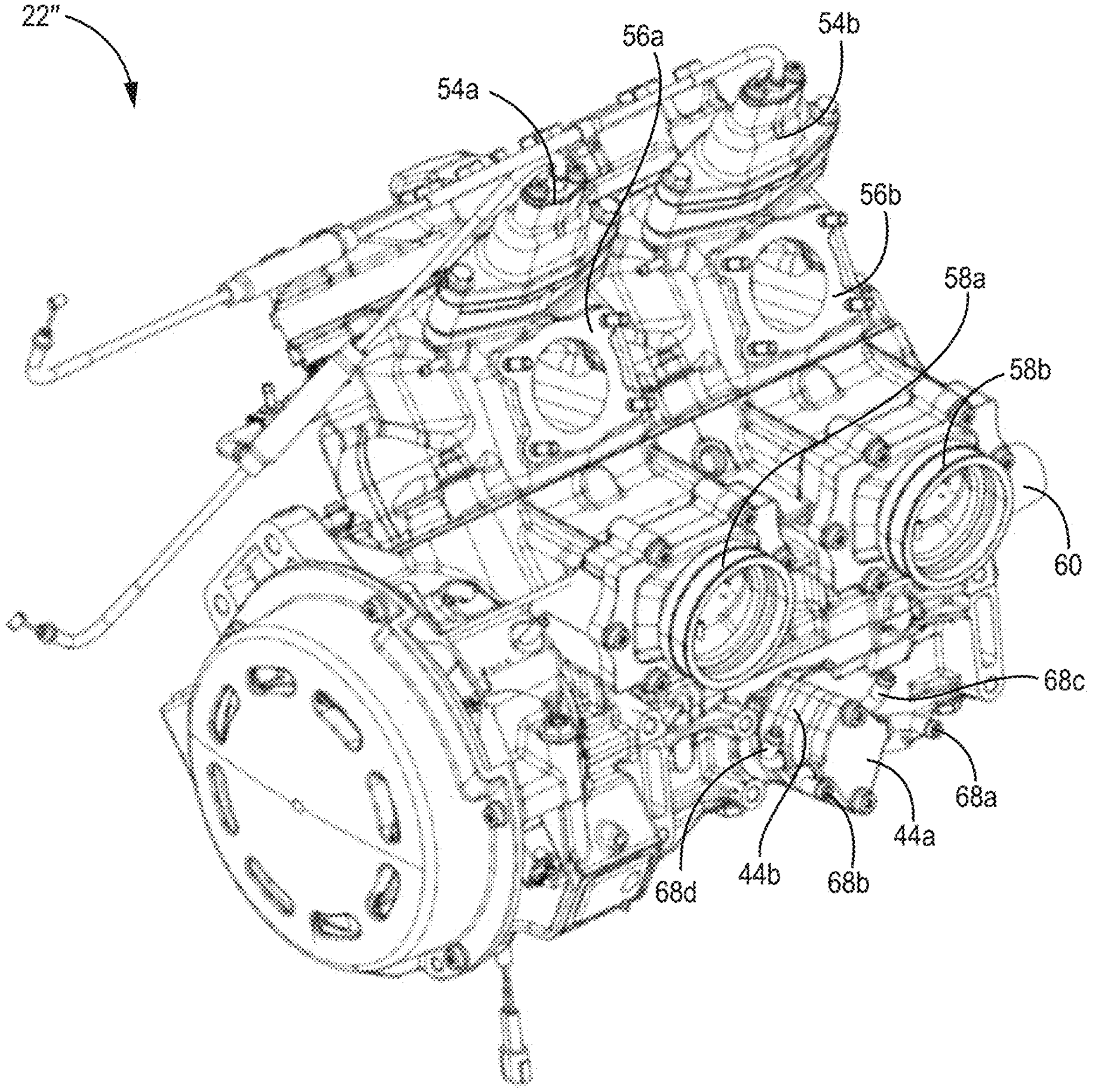
FIG. 15 is a perspective view of a two-stroke engine including a pair of oil pumps configured in a stacked configuration according to one embodiment.

Oil provided to turbocharger 130 is returned to oil tank 42". In some embodiments, because turbocharger 130 is located above and oil tank 42", pressurized oil provided to turbocharger 130 is returned to oil tank 42" by way of gravity. In particular, in some embodiments, the oil outlet port of turbocharger 130 (shown in FIG. 13B as oil outlet port 150) is positioned above (i.e., at a higher elevation) oil tank 42", and in addition oil tank 42" is positioned above the inlet to the oil pump, such that gravity is utilized to move oil from the oil outlet of turbocharger 130, to oil tank 42", and to the inlet of the oil pump. However, in some embodiments, due to the inclination of the snowmobile on various terrain or other anomalies that may prevent oil from draining back into oil tank 42", a scavenge pump (and in some embodiments a sump) may be relied upon to return oil to oil tank 42" as part of the closed-loop pressurized oiling system (as shown in FIG. 15). In addition, in some embodiments, a pressure regulator may be connected between the oil pump and turbocharger 130 to regulate the pressure of oil provided to turbocharger 130. The regulator may return excess oil to oil tank 42" (or any other desirable part of the system) in order to maintain a desired oil pressure. In other embodiments, the pressure regulator is incorporated as part of the oil pump.

In some embodiments, turbocharger 130 requires an oil pressure greater than that provided to the engine as part of the total loss oiling system. In some embodiments, oil pressure provided to the turbocharger 130 is greater than 10 PSI. In some embodiments, oil pressure provided to turbocharger 130 is greater than 20 PSI. In some embodiments, oil pressure provided to turbocharger 130 is greater than 40 PSI.

Figure 13A:
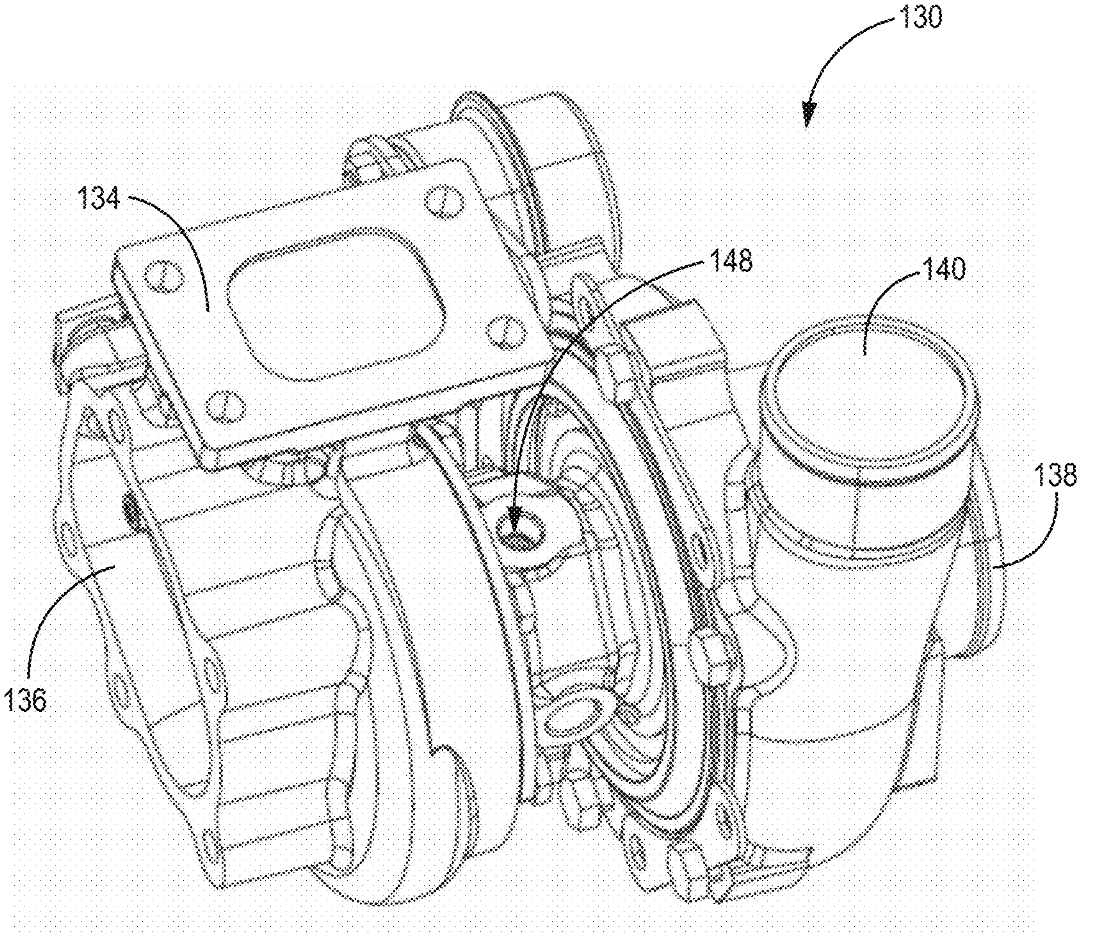
FIGS. 13A and 13B are perspective views of a turbocharger according to one embodiment.
Figure 13B:
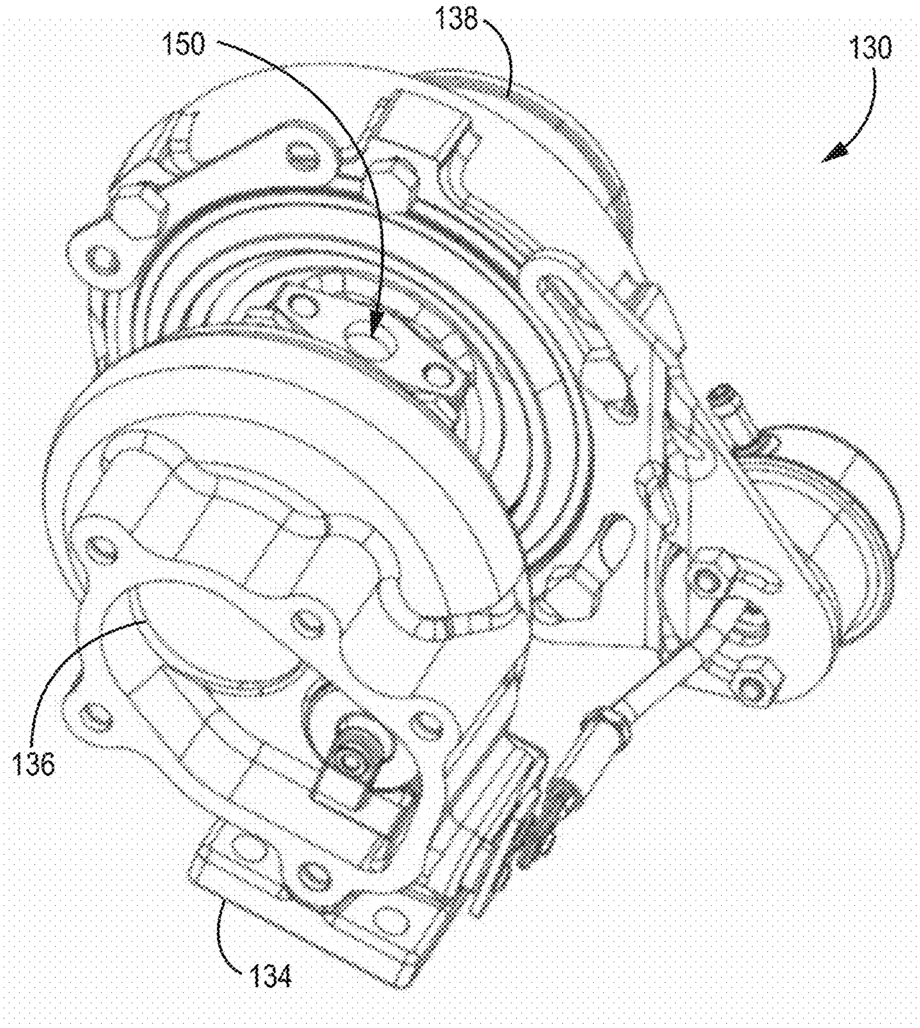

Referring now to FIGS. 13A and 13B, perspective views of a turbocharger 130 are shown according to some embodiments. Turbocharger 130 once again includes exhaust inlet port 134, exhaust outlet port 136, air inlet port 138, and compressed air outlet port 140. FIG. 13A illustrates the location of oil inlet port 148 connected to receive pressurized oil from the oil pump (e.g., oil pump 44 as shown in FIG. 3 or oil pump 44' shown in FIG. 10). In this embodiment, oil inlet port 148 is located on a top side of turbocharger 130. Oil provided at oil inlet port 148 may be provided at a pressure regulated by the oil pump and/or pressure regulator located internal to the oil pump or connected between the oil pump and oil inlet port 148. Oil provided at oil inlet port 148 is utilized to lubricate components of turbocharger 130, such as bearings. After being used to lubricate turbocharger, the oil exits turbocharger 130 via oil outlet port 150 and is returned to oil tank 42" (as shown in FIG. 12). FIG. 13B illustrates the location of oil outlet port 150 connected to return oil to oil tank 42". In some embodiments, oil outlet port 150 is located on the bottom of turbocharger 130. In some embodiments, oil tank 42" is located below oil outlet port 150, such that oil exiting turbocharger 130 via oil outlet port 150 is returned to oil tank 42" as a result of gravity. In some embodiments, a scavenge pump (and in some embodiments a sump) is utilized to aid the return of oil to oil tank 42" as part of the closed loop pressurized oiling system.

Figure 14A:
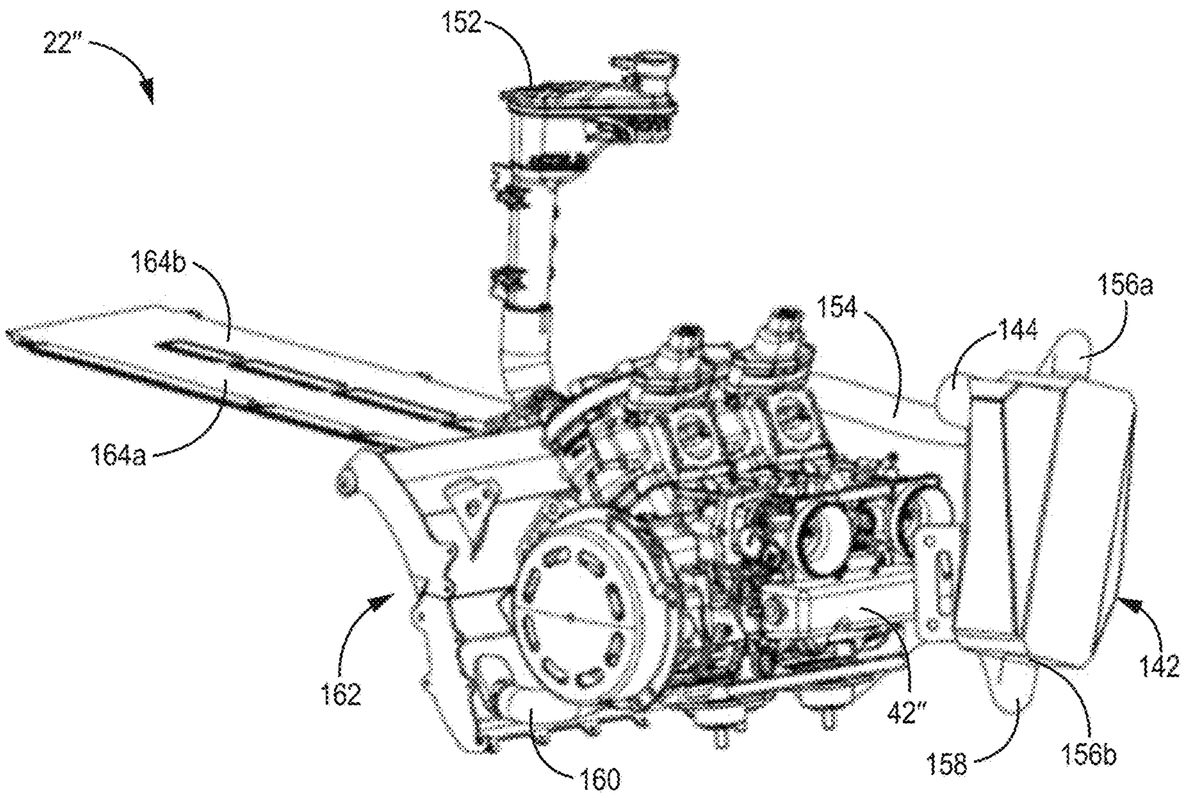
FIGS. 14A-14D are perspective views of a cooling circuit utilized in conjunction with a turbocharger and charge air cooler according to one embodiment.
Figure 14B:
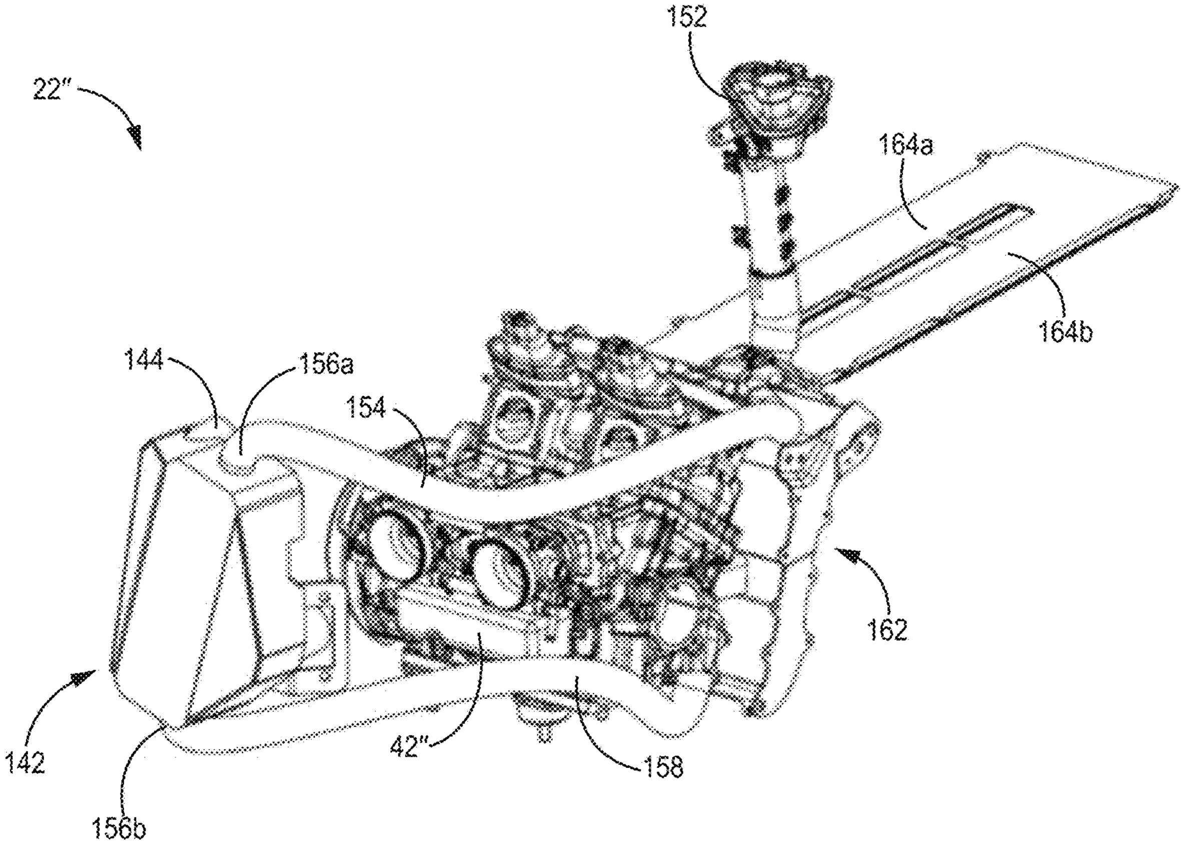
Figure 14C:
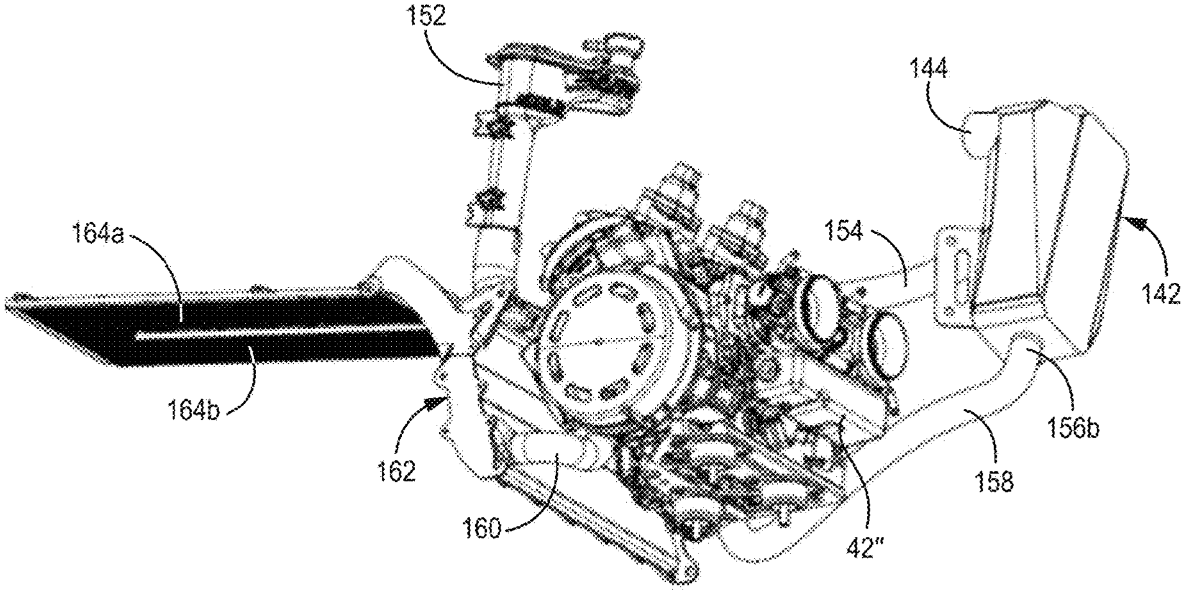
Figure 14D:
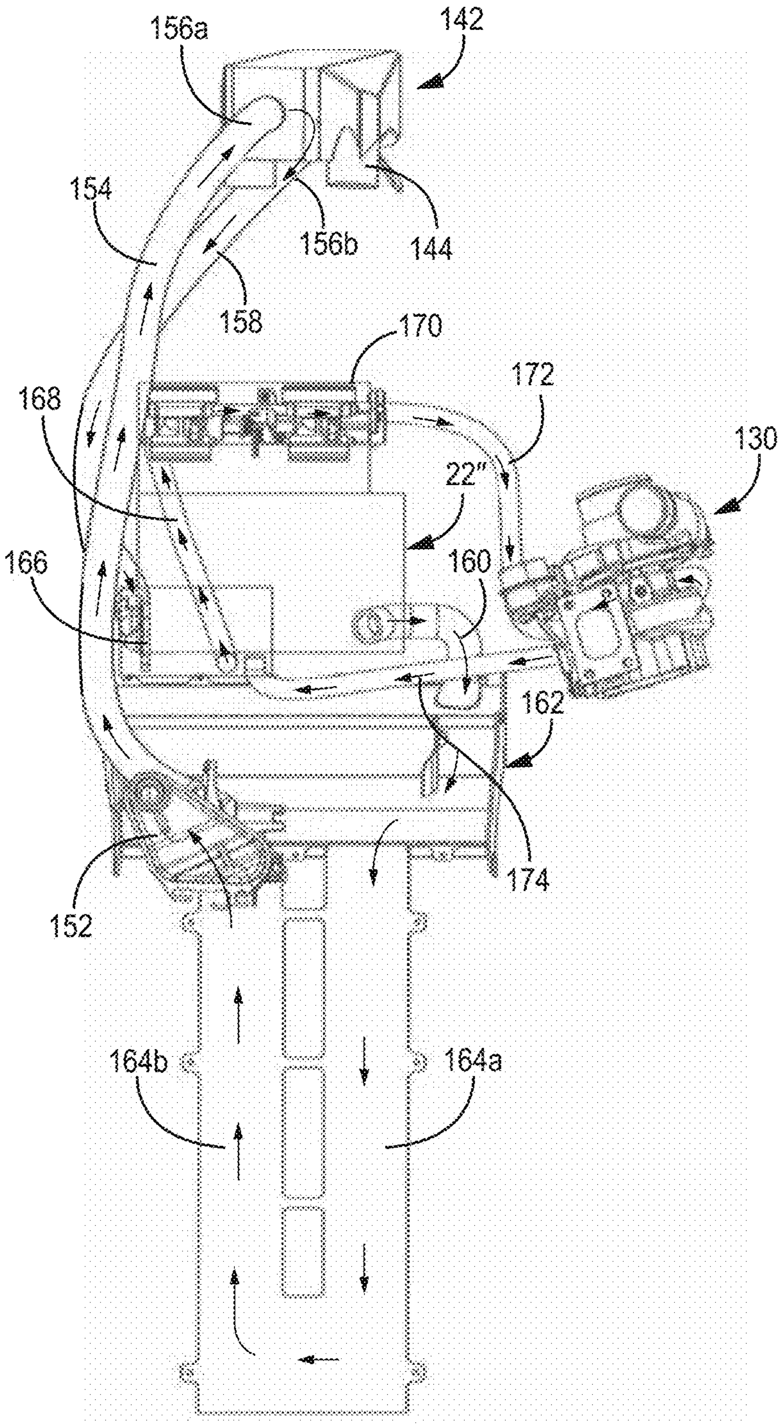

Referring now to FIGS. 14A-14D, a coolant system is illustrated according to some embodiments. FIGS. 14A-14C are perspective views illustrating the connections of the coolant system and location relative to engine 22", and FIG. 14D is a top view that illustrates the flow of coolant through the coolant system according to some embodiments. In the embodiment shown in FIGS. 14A-14C, turbocharger 130 has been removed from the view to better illustrate coolant system. An embodiment illustrating the connection of the turbocharger 130 to the coolant system is illustrated in FIG. 14D.

In the embodiment shown in FIGS. 14A-14C, the coolant system includes coolant tank 152, which in some embodiments includes a cap, hose/tube 154, 158, and 160, heat exchanger 162. In at least some embodiments, the heat exchanger 162 includes cooling channel(s) 164*a*, 164*b*. In some embodiments, coolant is utilized to extract heat from the compressed air provided to intercooler 142. Coolant is stored in coolant tank 152, in conjunction with the rest of the system, and provided to intercooler 142 via hose/tube 154. Intercooler 142 includes a coolant inlet port 156*a* for receiving coolant, which is then directed through intercooler 142 to extract heat from the compressed air provided by turbocharger 130 (not shown in this view). Coolant exits intercooler 142 via coolant output port 156*b*, and is provided to a water pump (not shown in this view, but shown in FIG. 14D as water pump 166). The water pump pumps the coolant received from intercooler 142 through engine 22", and then through various components to remove/extract heat from the coolant before the process is repeated. In addition, coolant may in some embodiments be provided to other accessories such as turbocharger 130 and/or other accessories to provide heat removal. In some embodiments, coolant output port 156*b* of intercooler 142 is elevated relative to water pump 166 to allow coolant pumped through intercooler 142 to be provided via gravity to water pump 166. In some embodiments, coolants is provided by heat exchangers 162 (e.g., through or cooling channels 164*a*, 164*b*)—at which point the coolant is at a lowest temperature within the cooling circuit—is provided first to intercooler 142, and then to engine 22". A benefit of this approach is that, in some embodiments, it maximizes the cooling effect of intercooler 142 (e.g., maximum cooling of the compressed air provided by turbocharger 130 to intercooler 142). In other embodiments, coolant may be pumped separately to intercooler 142 and engine 22", in parallel fashion rather than being provided first to one component and then to another.

Referring to FIG. 14D, a coolant flow path according to one or more embodiments is illustrated. As illustrated in FIG. 14D, the coolant flow path is a closed-loop system in which coolant is circulated to transfer thermal energy as required. Coolant is added to the system via the cap associated with coolant tank 152. In some embodiments, the coolant flow path comprises one or more coolant loops. In some embodiments, water pump 166 provides coolant to the one or more coolant loops. However, in other embodiments, additional water pumps may be utilized to separately provide coolant to each coolant loop. In some embodiments the first coolant loop includes the intercooler 142 and engine 22", and a second coolant loop that includes throttle bodies 170 and turbocharger 130. The first coolant loop provides coolant from heat exchanger 162 via hose/tube 154 to intercooler 142. The relative temperature of coolant provided from heat exchanger 162 to intercooler 142 is lower than elsewhere in the cooling circuit. The coolant (relatively low temperature) flows through intercooler 142 from coolant inlet port 156*a* to coolant output port 156*b*. The coolant flows from intercooler 142 to water pump 166 via hose/tube 158. The coolant provided from intercooler 142 extracts thermal energy from the intercooler to cool the compressed air provided to the engine 22". Thus, the temperature of the coolant leaving intercooler 142 via hose/tube 158 may be higher than the temperature of the coolant provided to intercooler 142. Subsequently, the coolant is provided to water pump 166 (which may also contain a cavity, reservoir, etc. for coolant), which pumps the coolant through the cooling circuit(s). In some embodiments, the coolant is directed to the engine 22" and then the coolant returns to the heat exchanger 162 via hose/tube 160. In general, coolant exiting the engine 22" via hose/tube 160 is at a temperature higher than that provided to intercooler 142.

In some embodiments, another or second coolant loop includes throttle body 170 and engine accessory—such as turbocharger 130. Water pump 166 pumps coolant to throttle body 170 via tube/hose 168, and then via tube hose 172 to turbocharger 130. However, in some embodiments the coolant may be pumped through turbocharger 130 and then through throttle body 170. In some embodiments, coolant is used to heat the throttle body (or throttle bodies) 170 in order to prevent freezing/icing in snow vehicle applications. Coolant provided to turbocharger 130 is returned to water pump/reservoir 166 via tube hose 174. In some embodiments, the two or more coolant flow paths are not separate paths, but instead result in the coolant from the two or more coolants paths mixing in the engine 22", water pump 166, and heat exchanger(s) 162.

To dissipate heat from the coolant, the coolant is provided to heat exchanger 162 and cooling channels 164*a* and 164*b*. These components are designed to extract heat from the coolant flowing through them, such that the coolant can be returned at a sufficiently low temperature to provide cooling. In the embodiment shown in FIG. 14D, coolant (now relatively cool) exits the heat exchanger 162 and is provided via hose/tube 154 to intercooler 142.

The embodiment of the cooling circuit shown in FIG. 14D provides coolant to intercooler 142, and coolant exiting intercooler 142 is provided to water pump 166. In this way, coolant provided to intercooler 142 is likely to be a temperature that is low relative to the temperature of the coolant in other parts of the cooling circuit. This assures that the temperature of the coolant provided to the intercooler is low relative to other parts of the cooling circuit, to provide maximum cooling of the compressed air provided by the turbocharger 130 to the intercooler 142. In other embodiments, the order in which coolant is pumped to intercooler 142, turbocharger 130, throttle body 170, and/or engine 22" may be varied. In still other embodiments, the air-to-water intercooler shown in FIG. 14D is implemented as an air-to-air intercooler, in which intercooler 142 would not be included as part of the coolant circuit.

In some embodiments, the intercooler 142 is located forwardly of the engine 22"; in some embodiments, however, the intercooler 142 can be located above, below, behind, or to a side of the engine 22". In some embodiments, multiple intercoolers are utilized, for example one on each side of the engine 22".

Referring now to FIG. 15, a perspective view of a two-stroke engine 22''' is shown that illustrates a stacked configuration of first and second oil pumps 44*a* and 44*b*. First oil pump 44*a* includes inlet/outlet ports 68*a* and 68*b*, and second oil pump 44*b* includes inlet/outlet ports 68*c* and 68*d*. In the embodiment shown in FIG. 15, the size of oil pumps 44*a* and 44*b* are approximately the same, as are the size of inlet/outlet ports 68*a*-68*d*. However, in other embodiments the first and second oil pumps 44*a* and 44*b* may be sized differently, according to the respective roles of each. Similarly, the size of inlet/outlet ports 68*a*-68*d* may be sized differently based on the application.

As illustrated in FIG. 15, oil pumps 44*a* and 44*b* are located adjacent to one another, in a stacked configuration along the axis of the shaft driving oil pumps 44*a* and 44*b* (e.g., perpendicular to the axis defined through the crankshaft 60). Both pumps 44*a* and 44*b* are therefore driven by the same shaft mechanically coupled to crankshaft 60 (not visible in this view). In some embodiments, first oil pump 44*a* is a pressurized oil pump that provides pressurized oil to one or more accessories, and second oil pump 44*b* is a scavenge pump that aids in returning oil from the one or more accessories to oil tank 42 (not shown in this view). In some embodiments, first oil pump 44*a* is a scavenge oil pump that aids in returning oil from the one or more accessories to oil tank 42 (not shown in this view), and second oil pump 44*b* is a pressurized oil pump that provides pressurized oil to one or more accessories.

Referring now to FIGS. 16A-16F, block diagrams of a pressurized oiling system (or closed loop-oiling system, such as that described in FIG. 2) according to various embodiments. It should be noted that a vehicle will, in at least some embodiments, also include a first oiling distribution system, such as a total-loss oiling system, that is utilized to lubricate the engine. The pressurized oiling system is separate from the first or total loss oiling system.

Figure 16A:
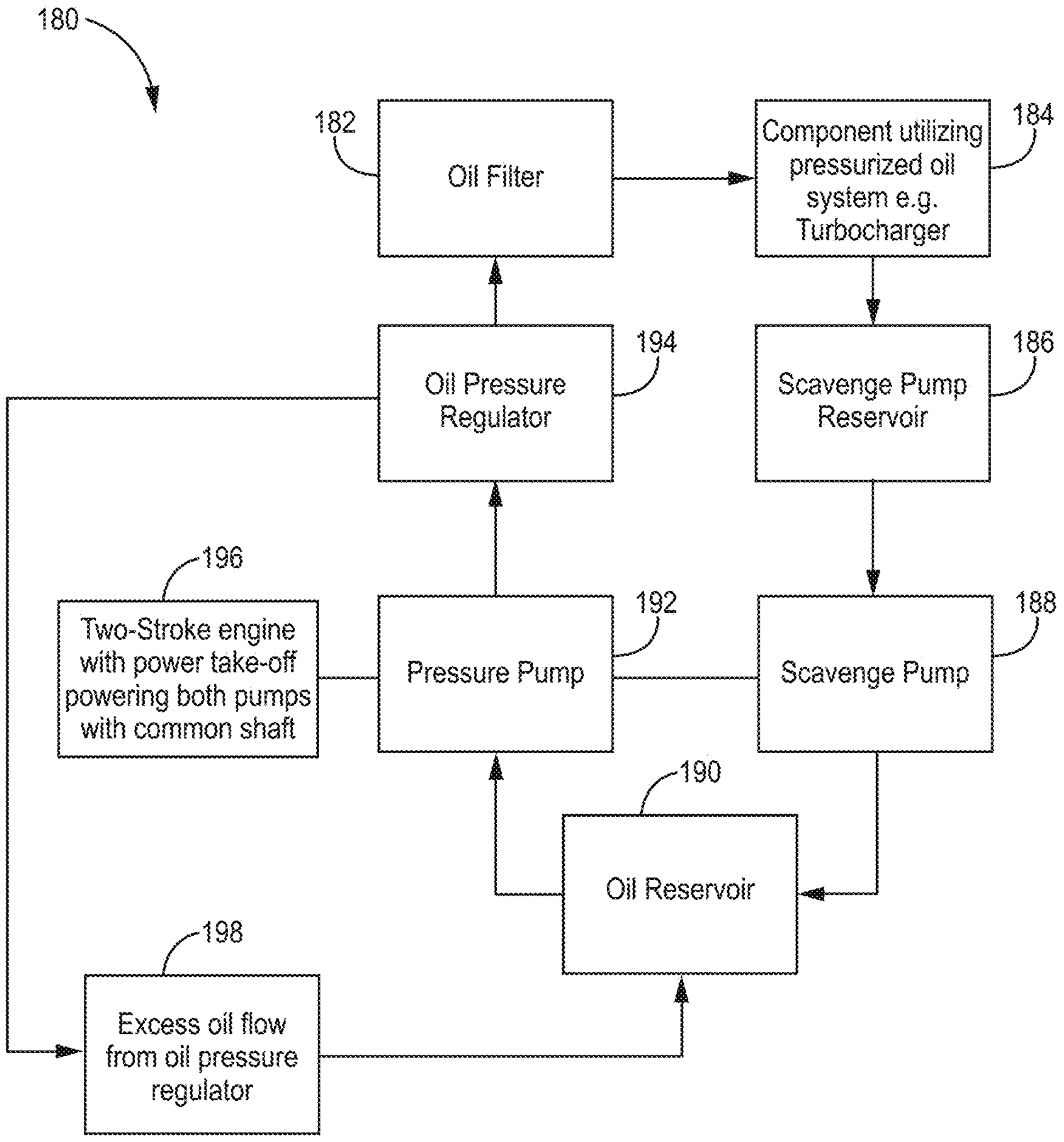
FIG. 16A-16F are block diagrams of a closed-loop oiling system according to various embodiments.

In particular, FIG. 16A illustrates a pressurized oiling system 180 that includes oil filter 182, accessory 184, scavenge pump reservoir 186, scavenge pump 188, oil reservoir 190, pressure pump 192, oil pressure regulator 194, and two-stroke engine 196. As shown in FIG. 16A, in some embodiments, pressure pump 192 and scavenge pump 188 are mechanically coupled to two-stroke engine 196, for example via a common shaft driving both pumps. Mechanical power developed by two-stroke engine 196 is provided to pressure pump 192 and scavenge pump 188. For example, pressure pump 192 and scavenge pump 188 may be located adjacent one another in a stacked configuration, such as that shown in FIG. 15. Pressure pump 192 is fluidly connected to pump oil from oil reservoir 190 to oil pressure regulator 194. Oil pressure regulator 194 maintains the oil provided by pressure pump 192 at a desired pressure. In the embodiment shown in FIG. 16A, if the pressure exceeds a desired pressure, excess oil is directed back to oil reservoir 190 via excess oil path 198. Oil filter 182 filters pressurized oil provided by oil pressure regulator 194 and provides filtered oil to accessory 184. For example, as discussed above, accessories requiring pressurized oil may include turbochargers, HPDI pressure pump assembly, etc. As provided above, accessories may include any devices requiring pressurized oil for lubrication. Pressurized oil provided to accessory 184 for lubrication is returned to scavenge pump reservoir 186. Scavenge pump 188 pumps oil collected in scavenge pump reservoir 186 to oil reservoir 190. In some embodiments, the pressurized oiling system(s) described herein can also include an oil cooler in any suitable location in the circuit.

Figure 16B:
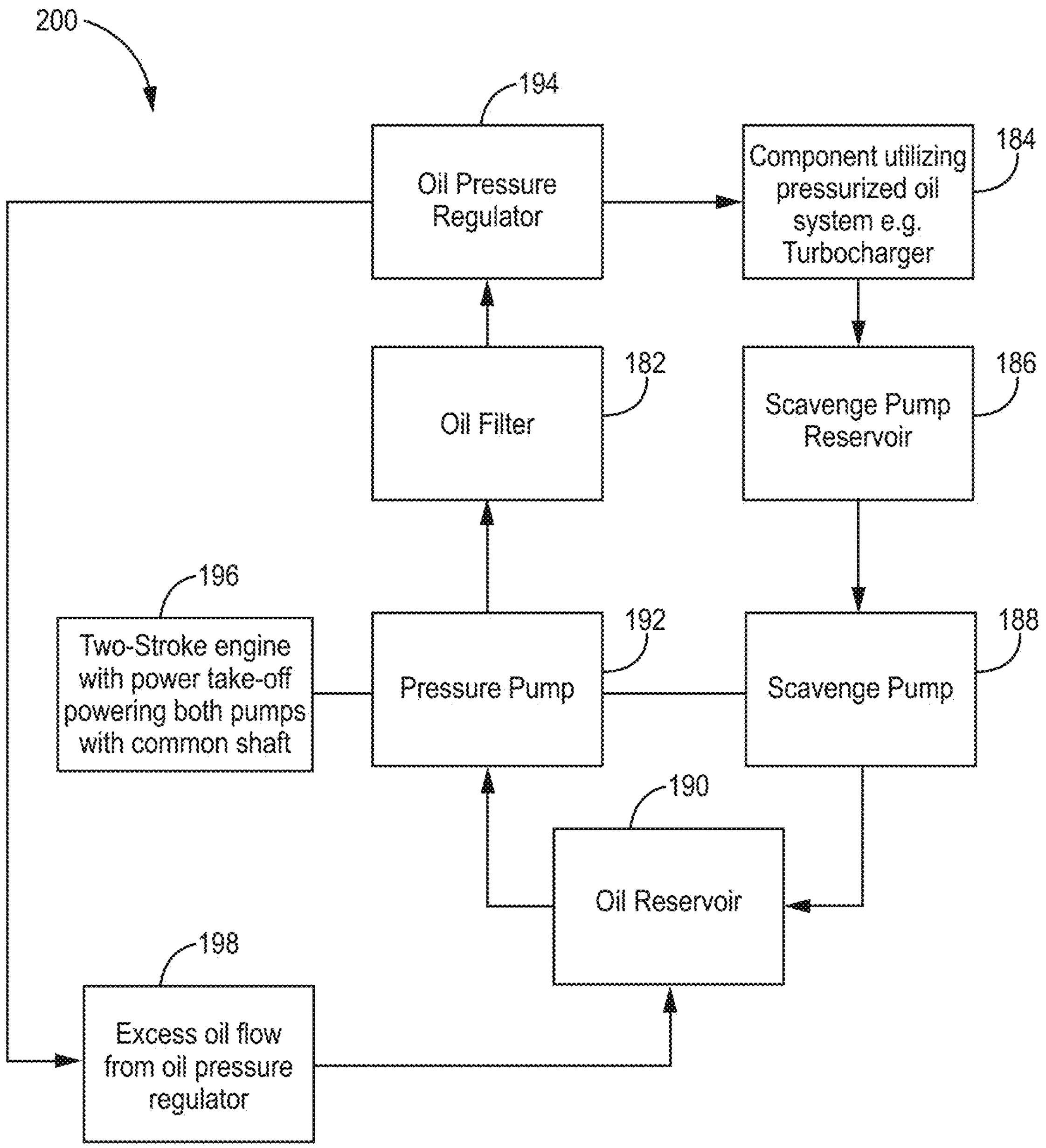

FIG. 16B illustrates a pressurized oiling system 200 that includes the same components described with respect to FIG. 16A. In the embodiment illustrated in FIG. 16B, the position of oil filter 182 and oil pressure regulator 194 in the oil flow diagram are switched. As a result, pressurized oil pumped by pressure pump 192 is provided to oil filter 182 and then to oil pressure regulator 194. In the event pressurized oil provided to oil pressure regulator 194 exceeds the desired pressure, overflow oil is directed back to oil reservoir 190 via excess oil path 198.

Figure 16C:
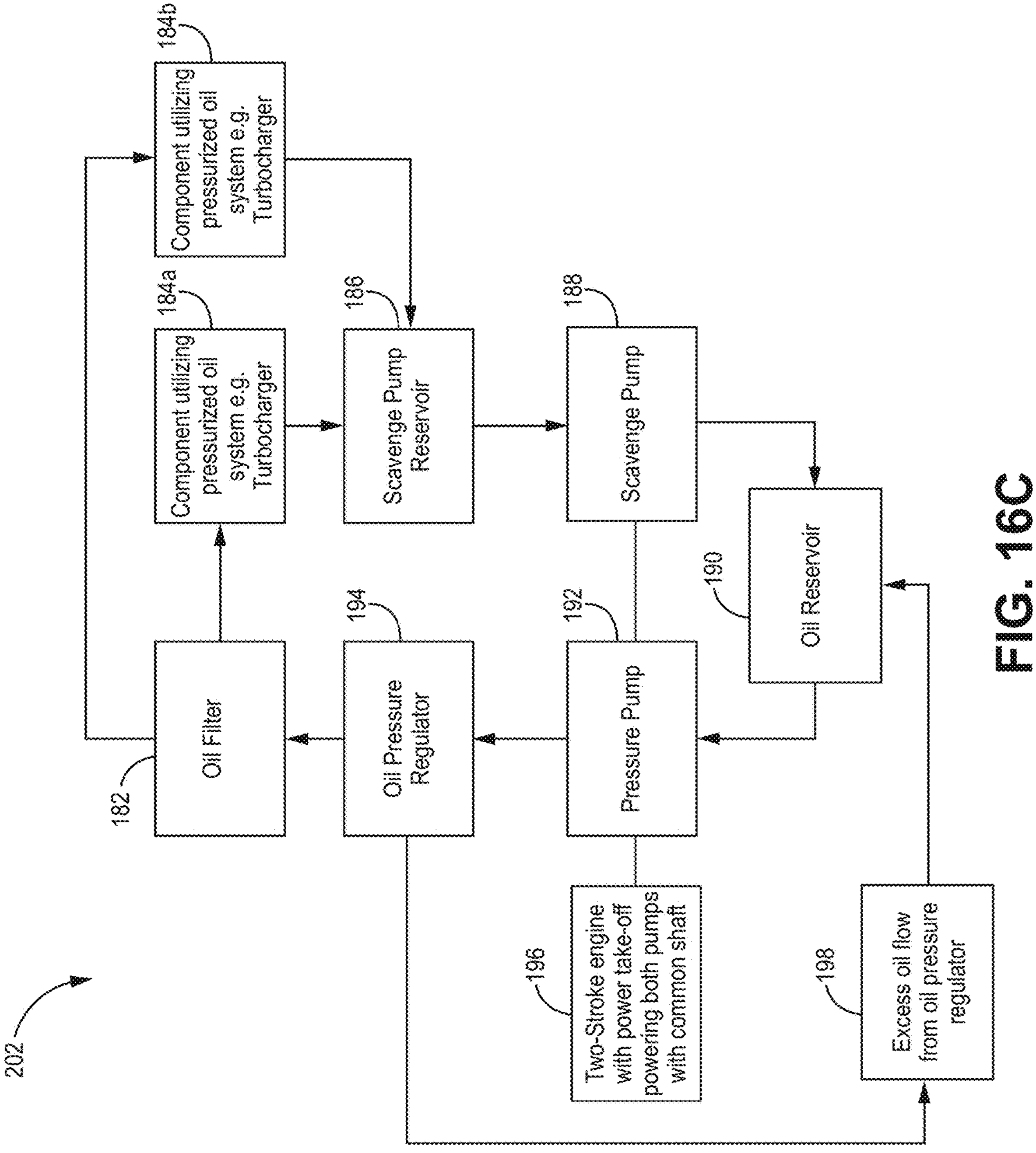

FIG. 16C illustrates a pressurized oiling system 202 that includes the same components described with respect to FIG. 16A. However, in the embodiment shown in FIG. 16C, instead of a single accessory, two or more accessories 184*a* and 184*b* are connected in parallel to receive pressurized oil. In particular, pressurized oil pumped from pressure pump 192 is provided to oil pressure regulator 194 and oil filter 182, wherein the first accessory 184*a* and the second accessory 184*b* are connected in a parallel configuration to receive pressurized oil from the oil pressure regulator 194 and oil filter 182. In one embodiment, pressurized oil provided to first and second accessories 184*a* and 184*b* is provided at a single pressure to both accessories. In some embodiments, however, oil can be provided at different pressures to first and second accessories 184*a* and 184*b*, for example via an additional pressure regulator or, in some embodiments, where the first and second accessories are in series. Oil collected from first and second accessories 184*a* and 184*b* are collected in scavenge pump reservoir 186, and pumped by scavenge pump 188 to oil reservoir 190.

Figure 16D:
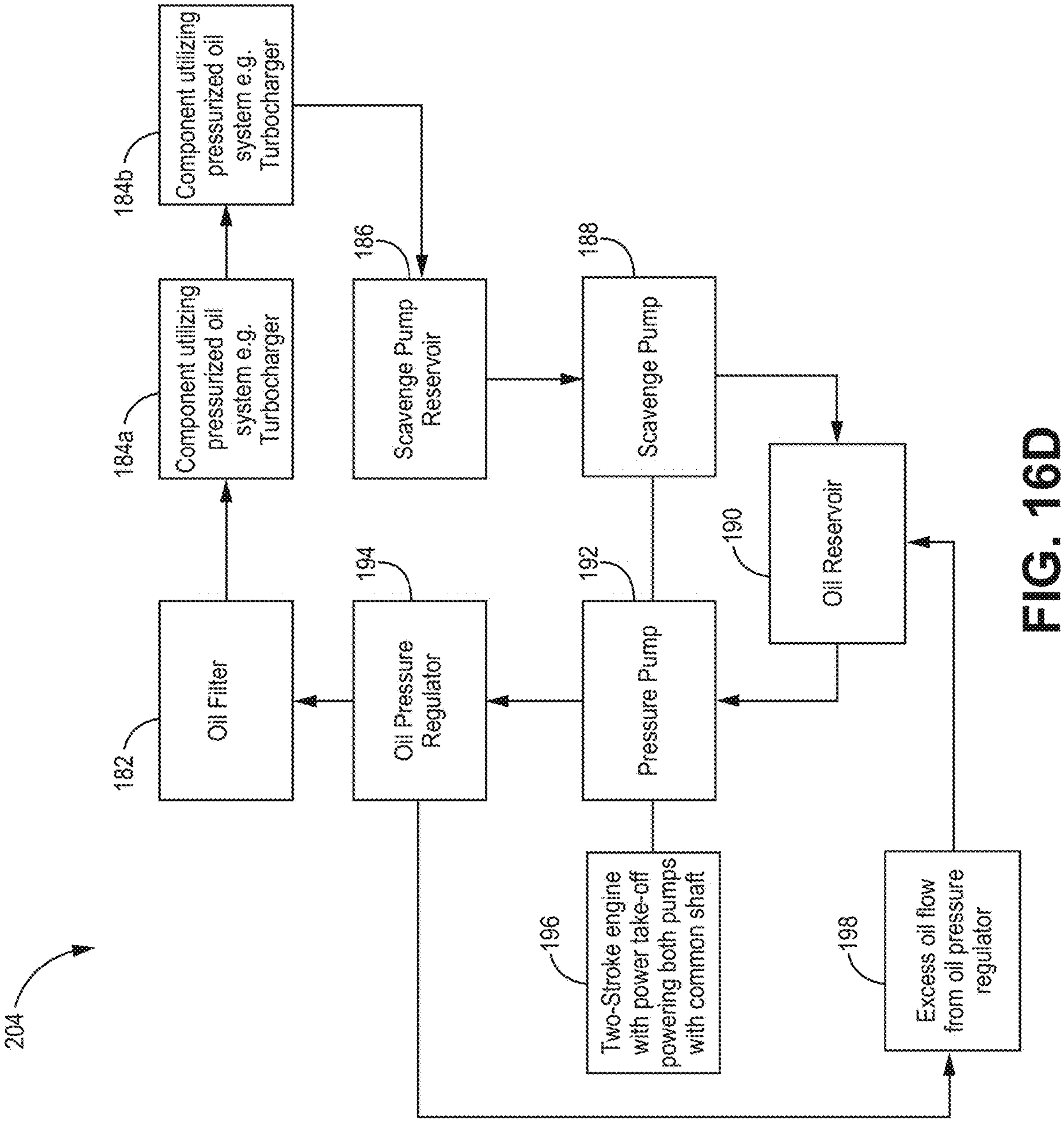

FIG. 16D illustrates a pressurized oiling system 204 that includes the same components described with respect to FIG. 16C. However, in the embodiment shown in FIG. 16D, first and second accessories 184*a* and 184*b* are connected in a serial configuration, rather than in the parallel configuration as shown in FIG. 16C. That is, pressurized oil from oil filter 182 is provided to first accessory 184*a*, and oil discharged from first accessory 184*a* is provided to second accessory 184*b*. Oil discharged from second accessory 184*b* is returned to scavenge pump reservoir 186, where it is pumped by scavenge pump 188 to oil reservoir 190. As a result of first and second accessories 184*a* and 184*b* being connected in series to receive pressurized oil, the oil pressure provided to accessory 184*a* may differ from the oil pressure provided to accessory 184*b*. In some embodiments, the accessory requiring higher pressure oil may be connected first in series to receive pressurized oil from oil filter 182.

Figure 16E:
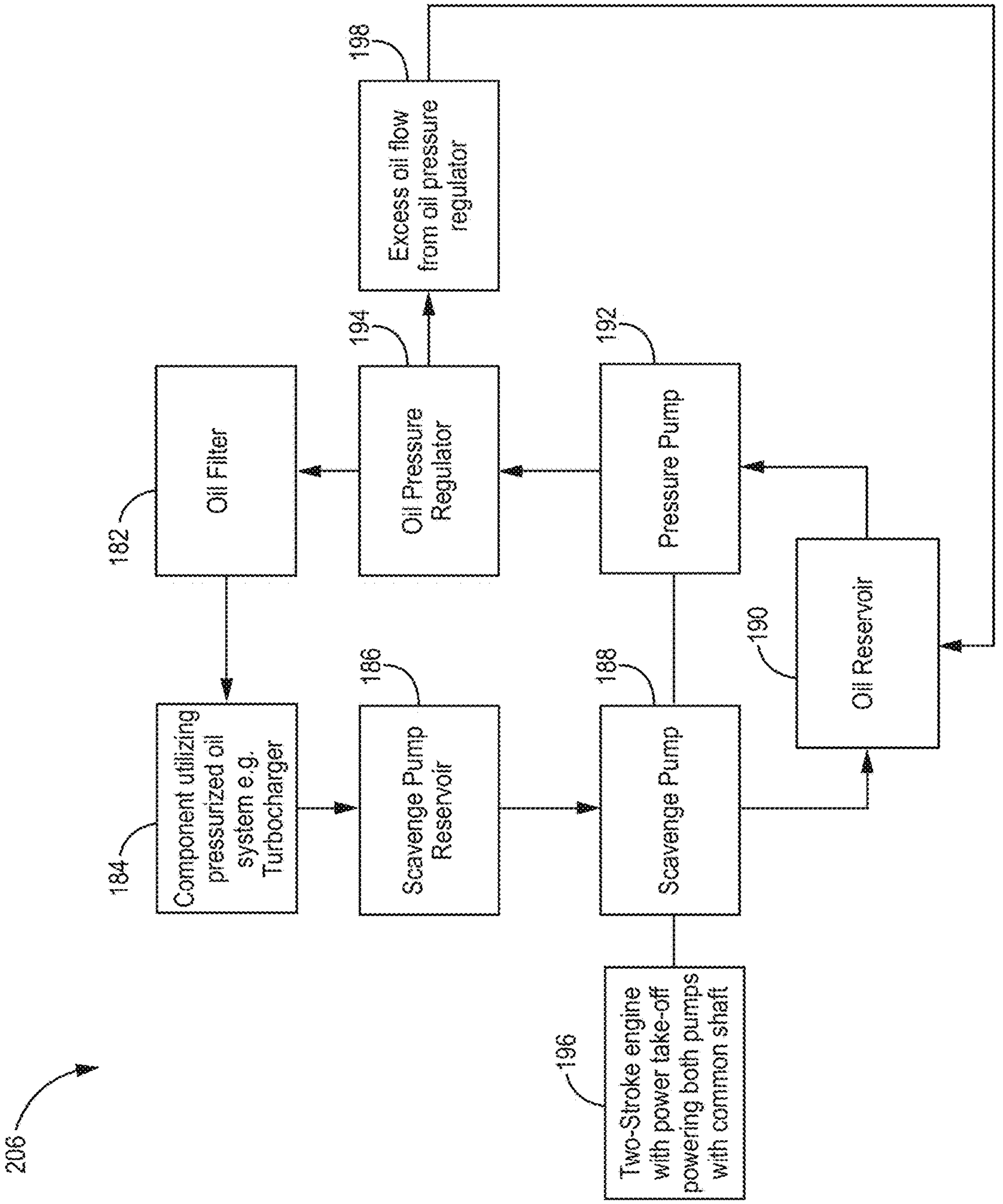

FIG. 16E illustrates a closed-loop oiling system 206 that includes the same components described with respect to FIG. 16A. However, in the embodiment shown in FIG. 16E, the position of scavenge pump 188 and pressure pump 192—relative to two-stroke engine 196—are exchanged. In particular, assuming scavenge pump 188 and pressure pump 192 are connected in a stacked configuration, scavenge pump 188 is located between two-stroke engine 196 and pressure pump 192. Depending on the physical size of scavenge pump 188 and pressure pump 192, it may be advantageous to locate either scavenge pump 188 or pressure pump 192 closer to two-stroke engine 196.

Figure 16F:
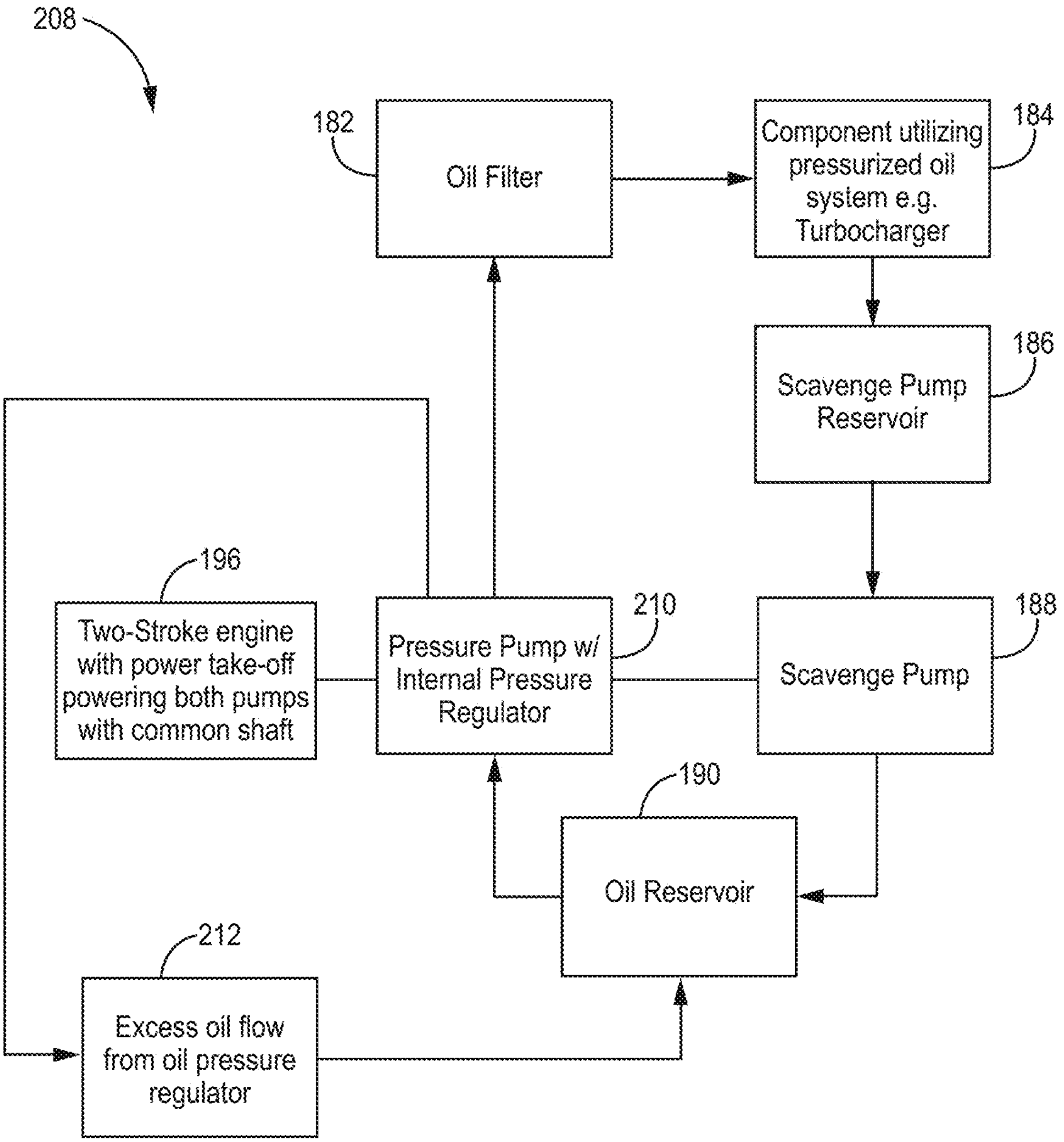

FIG. 16F illustrates a pressurized oiling system 208 that includes oil filter 182, accessory 184, scavenge pump reservoir 186, scavenge pump 188, oil reservoir 190, pressure pump 210 including an internal regulator, and two-stroke engine 196. In the embodiment shown in FIG. 16F, pressure pump 210 and scavenge pump 188 are mechanically coupled to two-stroke engine 196, for example via a common shaft driving both pumps. Mechanical power developed by two-stroke engine 196 is provided to pressure pump 210 and scavenge pump 188. For example, pressure pump 210 and scavenge pump 188 may be located adjacent one another in a stacked configuration, such as that shown in FIG. 15. Pressure pump 210 is fluidly connected to pump oil from oil reservoir 190 to accessory 184. In contrast with the embodiment shown in FIG. 16A, pressure pump 210 includes an internal oil pressure regulator that maintains the oil provided by the pump at a desired pressure. In the embodiment shown in FIG. 16F, if the pressure exceeds a desired pressure, excess oil is directed back to oil reservoir 190 via excess oil path 212. Oil filter 182 filters pressurized oil provided by oil pressure regulator 194, and provides filtered oil to accessory 184. For example, as discussed above, accessories requiring pressurized oil may include turbochargers, HPDI pressure pump assembly, etc. As provided above, accessories may include any devices requiring pressurized oil for lubrication. Pressurized oil provided to accessory 184 for lubrication is returned to scavenge pump reservoir 186. Scavenge pump 188 pumps oil collected in scavenge pump reservoir 186 to oil reservoir 190.

The oil distribution system described herein allows for the availability of pressurized oil to one or more accessories in a two-stroke engine environment. To provide pressurized oil, the system comprises a first oiling system and a second oiling system distinct from the first oiling system. The first oiling system may be a typical total-loss system that distributes oil from a first oil tank to the two-stroke engine at a first oil pressure. The second oiling system includes a pump mechanically coupled to the crankshaft of the two-stroke engine to distribute oil from a second oil tank to an accessory at a second oil pressure, wherein the second oil pressure is greater than the first oil pressure. In this way, the second oiling system powered by the two-stroke engine provides pressurized oil.

Although shown in relation to a snowmobile, the oiling systems, cooling systems, etc. described herein can also be used with ATVs, outboard engines, unmanned aerial vehicles, airplanes, personal watercraft, side-by-side off-road vehicles, etc.

Figure 17A:
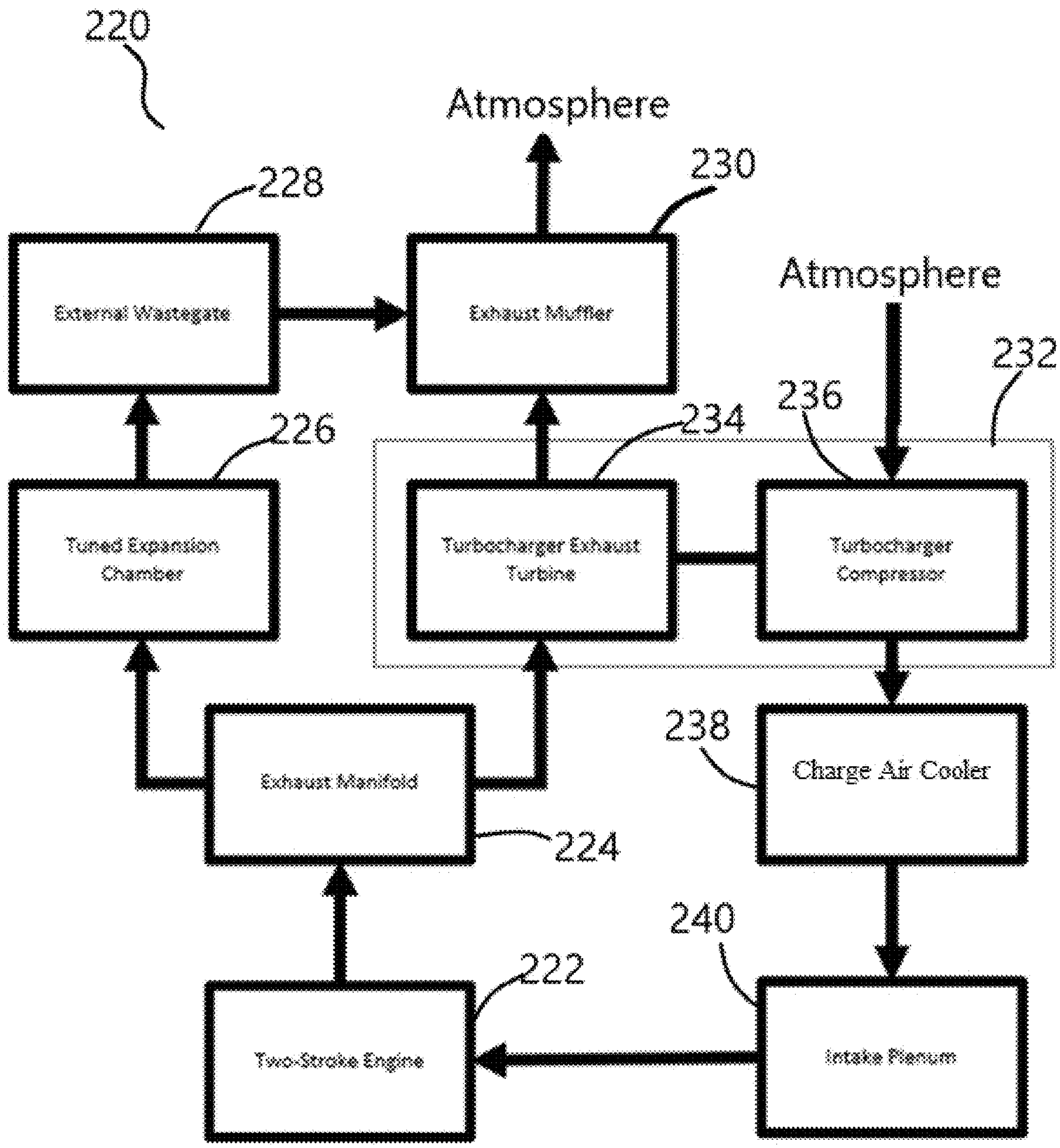
FIGS. 17A-17D are block diagrams of the two-stroke engine and parallel path exhaust system according to some embodiments.
Figure 17B:
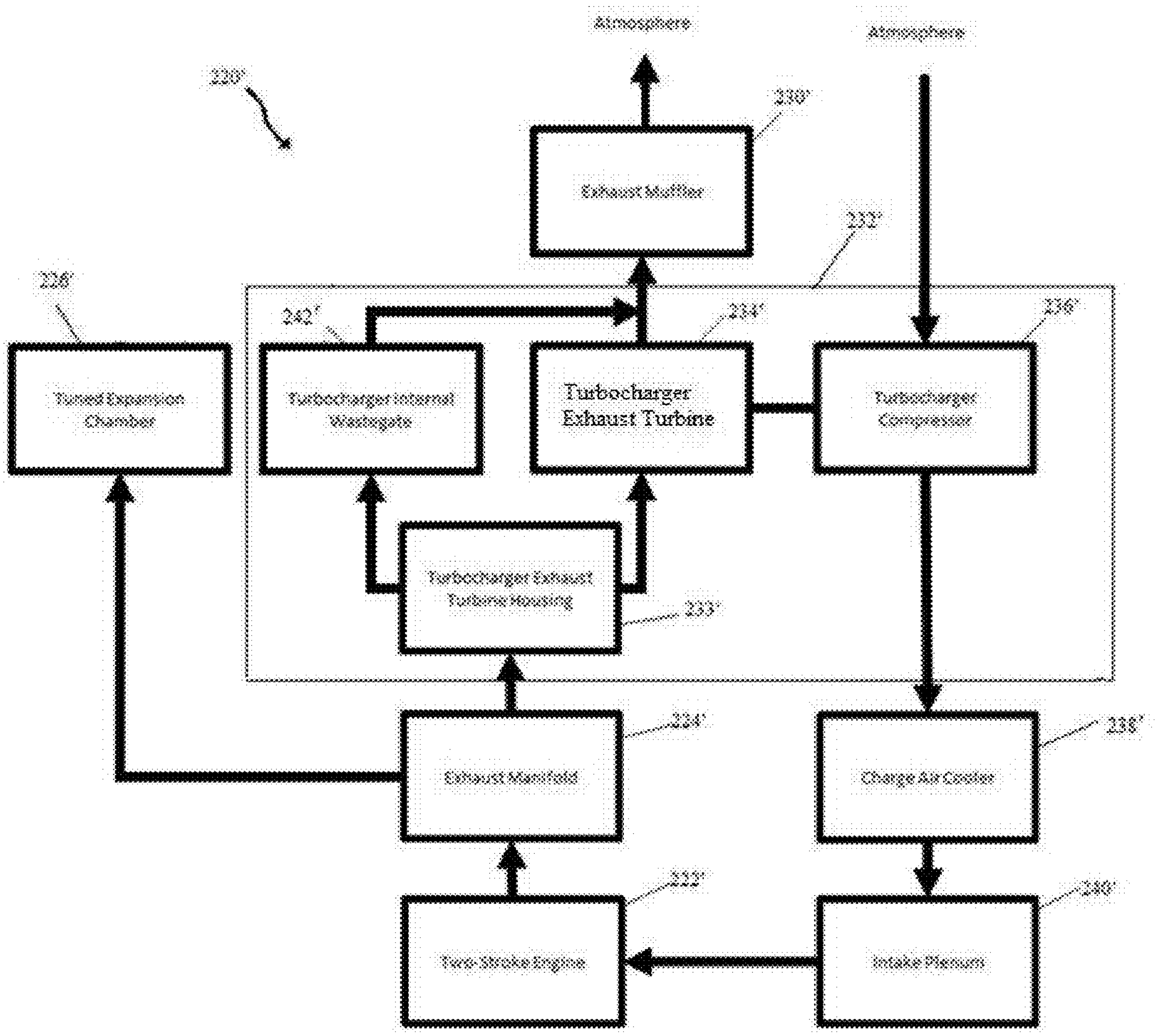
Figure 17C:
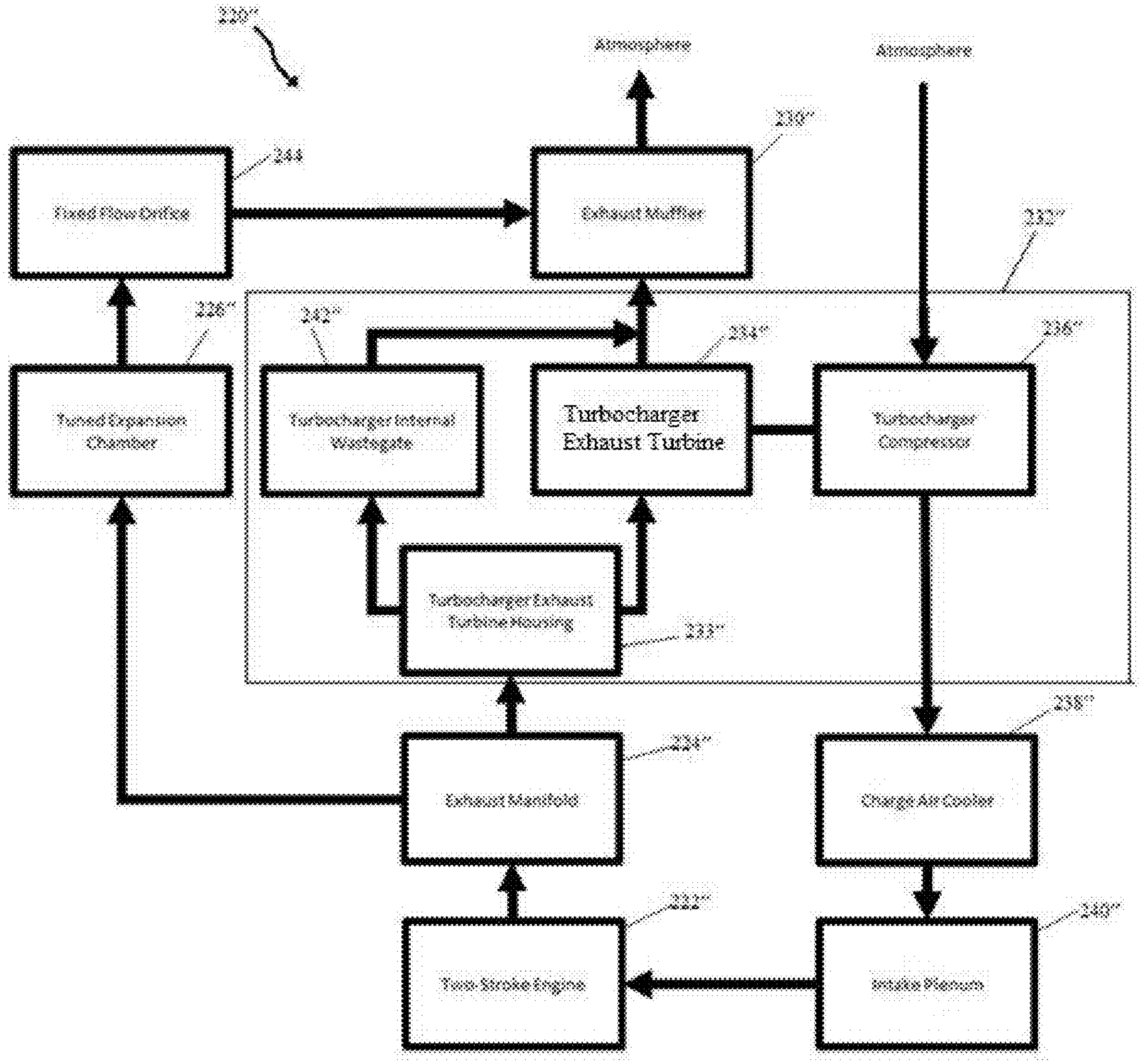
Figure 17D:
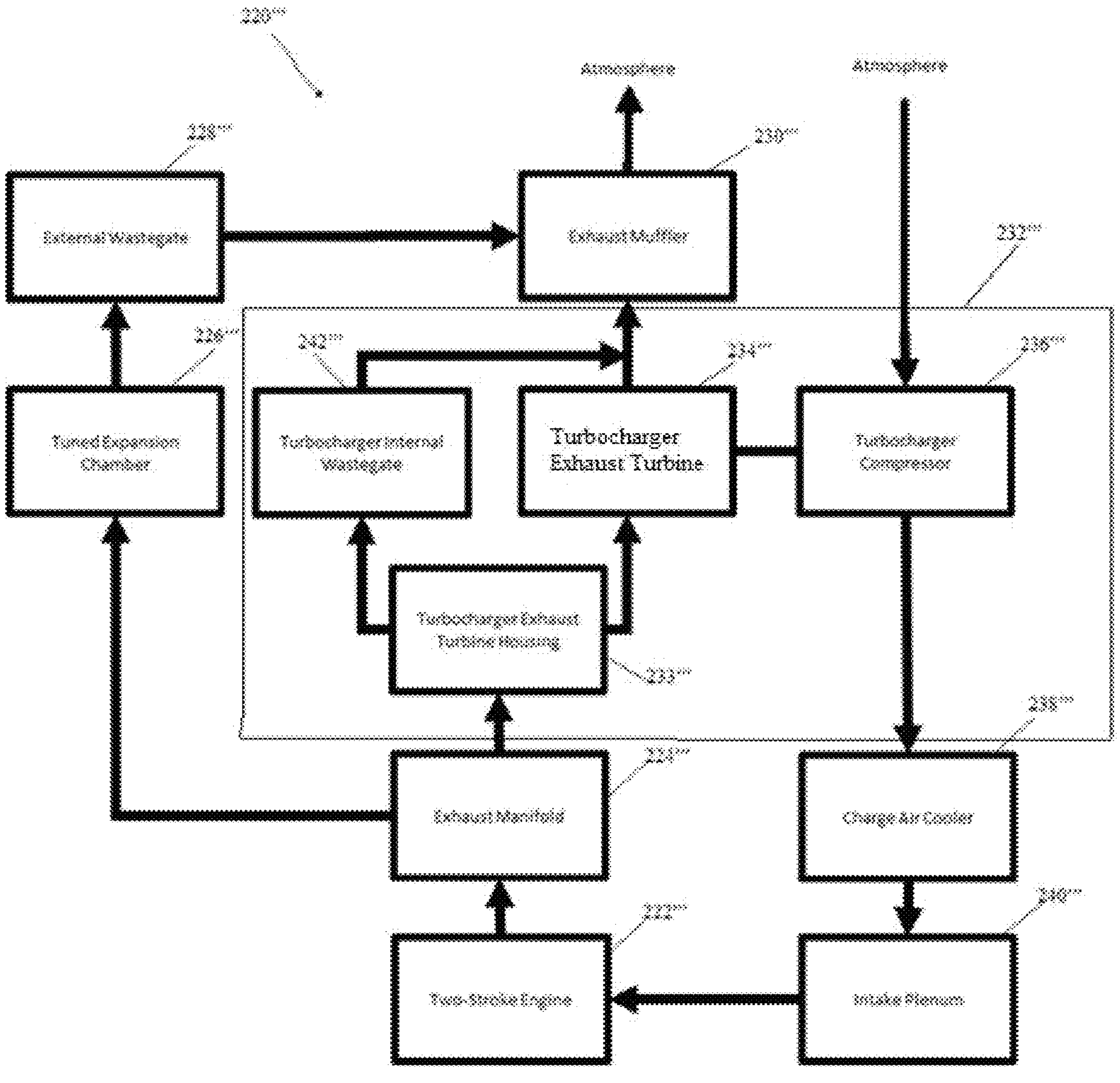

Referring now to FIGS. 17A-17D, block diagrams of engine systems utilizing a parallel-path exhaust are provided according to some embodiments. In general, the embodiment shown in FIG. 17A illustrates an engine system 220 that utilizes an external wastegate 228, the embodiment shown in FIG. 17B illustrates an engine system 220' that utilizes a turbocharger internal wastegate 242', the embodiment shown in FIG. 17C illustrates an engine system 220" that includes a turbocharger internal wastegate 242" and a fixed flow orifice 244 from the turned expansion chamber to the exhaust muffler, and FIG. 17D illustrates an engine system 220'" that includes both a turbocharger internal wastegate 242'" and an external wastegate 228".

In some embodiments, such as that shown in FIG. 17A, engine system 220 includes exhaust manifold 224, tuned expansion chamber 226, external wastegate 228, exhaust muffler 230, turbocharger 232, which includes exhaust turbine 234 and compressor 236, charge air cooler 238 and intake plenum 240. Compressed air provided by turbocharger compressor 236 is cooled by charge air cooler 238. In some embodiments, as described with respect to FIGS. 14A-14D previously, charge air cooler 238 is connected to a coolant circuit that includes both the charge air cooler 238 and two-stroke engine 222. In some embodiments, charge air cooler 238 is connected to receive coolant from the heat exchanger, and coolant exiting charge air cooler 238 is provided to two-stroke engine 222. That is, in some embodiments, the charge air cooler 238 and two-stroke engine 222 are connected in series to form the coolant circuit, and coolant is provided first to the charge air cooler 238. In other embodiments, other configurations of coolant circuits may be utilized to cool the charge air cooler 238 and two-stroke engine 222.

Exhaust generated by two-stroke engine 222 is provided to exhaust manifold 224. For example, in embodiments in which two-stroke engine 222 includes first and second cylinders, exhaust manifold would include first and second inlets connected to receive exhaust from the first and second cylinders, respectively. In other embodiments, exhaust manifold may include fewer or additional inlets for receiving exhaust generated by the two-stroke engine 222. Exhaust manifold 224 bifurcates the exhaust received from two-stroke engine 222 into first and second parallel paths. In some embodiments the first parallel path includes tuned expansion chamber 226 and external wastegate 228, and the second parallel path includes turbocharger 232 (specifically exhaust turbine 234). Exhaust provided to the first parallel path and the second parallel path is provided to exhaust muffler 230, which discharges the exhaust to atmosphere. The mass/volume of exhaust provided to the first and second parallel paths may be equal or unequal. In some embodiments, a wastegate is utilized to control the flow of exhaust provided to the turbocharger 232. In some embodiments the wastegate is external—as shown in FIG. 17A which includes external wastegate 228—and located on the parallel path that includes tuned expansion chamber 226. In some embodiments, the wastegate is internal to the turbocharger and is therefore located on the parallel path that includes the turbocharger (as shown in FIG. 17B, which includes internal wastegate 242').

Tuned expansion chamber 226—sometimes referred to as a tuned pipe—is utilized to improve the efficiency of two-stroke engines. Specifically, high-pressure gas exiting a combustion cylinder flows in the form of a wavefront as exhaust gas is pushed into the expansion chamber. The change in cross-section of the expansion chamber results in a portion of the wavefront being reflected back toward the exhaust manifold 224 and the respective combustion cylinder. The cross-section and length of the tuned expansion chamber 226 is designed to generate reflections that arrive at the inlet of exhaust manifold 224 to push any escaped fuel/air mixture back into the combustion cylinder prior to the next combustion cycle, thereby improving the efficiency of the two-stroke engine. In some embodiments, the temperature of exhaust within the tuned expansion chamber 226 effects the reflections generated by tuned expansion chamber 226. As described in more detail below, external wastage 228 can be utilized to control the temperature within the tuned expansion chamber 226, and can therefore be utilized to control the performance of the tuned expansion chamber 226.

In some embodiments, external wastegate 228 regulates the exhaust gas within the tuned expansion chamber 226 and therefore also regulates the mass and/or volume of exhaust flowing through the turbocharger 232. For example, in some embodiments external wastegate 228 is actuated (e.g., opened or closed) in response to exhaust pressure exerted on the external wastegate. In some embodiments, an increase in exhaust pressure causes a valve on the external wastegate 228 to open, while a decrease in exhaust pressure causes the valve on the external wastegate 228 to close. In some embodiments, the valve associated with external wastegate 228 is actuated in response to the outlet pressure of the turbocharger compressor 236, referred to as the “turbo boost pressure”. In other embodiments, actuation of external wastegate 228 may be controlled by an engine control unit (ECU) (not shown) based on one or more measured inputs, including one or more of exhaust pressure, exhaust temperature, exhaust flow through the turbocharger, turbo boost pressure, etc. For example, in some embodiments external wastegate 228 is controlled (i.e., actuated) based on exhaust temperature within the tuned expansion chamber 226, wherein temperature is increased by opening (partially or completely) the external wastegate 228 and decreased by closing (partially or completely) the external wastegate 228. In some embodiments, external wastegate 228 is controlled based on the desired flow of exhaust through turbocharger 232, wherein external wastegate 228 is closed (partially or completely) to increase the flow of exhaust through turbocharger 232 and opened (partially or completely) to decrease the flow of exhaust through turbocharger 232. In some embodiments, a combination of inputs (e.g., temperature within tuned expansion chamber, flow of exhaust through the turbocharger, etc.) are utilized to determine the actuation of external wastegate 228.

Exhaust exiting external wastegate 228 is provided to exhaust muffler 230. In some embodiments, exhaust provided by external wastegate 228 (i.e., the first parallel path) is re-combined with exhaust from the turbocharger 232 (i.e., the second parallel path) prior to provision to exhaust muffler 230. In other embodiments, exhaust muffler 230 is connected individually to both the external wastegate 228 and turbocharger 232 (i.e., first and second parallel paths).

As shown in FIGS. 17A and 17B, turbocharger 232 includes exhaust turbine 234 and compressor 236. During operation, exhaust gas provided by exhaust manifold 224 to the second parallel path is provided to exhaust turbine 234, which extracts energy from the exhaust gas and utilizes the extracted energy to drive compressor 236. Exhaust utilized by exhaust turbine 234 exits and is provided to exhaust muffler 230. In some embodiments, the pipe utilized to communicate exhaust from exhaust turbine 234 to exhaust muffler 230 is configured to receive exhaust from external wastegate 228, such that only a single exhaust carrying pipe is provided to exhaust muffler 230. In other embodiments, the exhaust pipe utilized to communicate exhaust from exhaust turbine 234 to exhaust muffler 230 is connected directly to exhaust muffler 230. In some embodiments, locating turbocharger 232 in close proximity to exhaust manifold 224 increases the responsiveness of the turbocharger.

Compressor 236 compresses atmospheric air and provides the compressed air to charge air cooler 238, which acts to cool the air prior to the compressed air being provided to the engine for combustion. Compressed, cooled air is provided to intake plenum 240, which provides the cooled, compressed air to the respective combustion chambers for combustion. Reducing the temperature of the compressed air increases the energy density of the air supplied to two-stroke engine 222. A benefit of utilizing a first and second parallel exhaust path is that the benefits of a tuned expansion chamber are retained while also allowing turbocharger to be located in relatively close proximity to the two-stroke engine 222, which increases the responsiveness of the turbocharger to operating changes of the two-stroke engine.

In another embodiment, illustrated in FIG. 17B, rather than utilize an external wastegate connected to the outlet of the tuned expansion chamber 226 to control the flow of exhaust through the turbocharger 232, an internal wastegate 242' is provided in parallel with turbocharger exhaust turbine 234'. In some embodiments, turbocharger exhaust turbine housing 233' bifurcates the flow of exhaust into two parts, one provided to turbocharger internal wastegate 242' and one provided to turbocharger exhaust turbine housing 234'. Internal wastegate 242' controls the flow of exhaust through the exhaust turbine 234' by providing an alternate path for exhaust to bypass the exhaust turbine 234'. In some embodiments, the presence of internal wastegate 242' negates the necessity for an external wastegate, and the tuned expansion chamber 226' is closed (i.e., does not include an outlet to exhaust muffler 230', as shown in FIG. 17B).

As described with respect to external wastegate 228 shown in FIG. 17A, in some embodiments internal wastegate 242' is actuated (e.g., opened or closed) in response to exhaust pressure exerted on the internal wastegate 242'. In some embodiments, an increase in exhaust pressure causes a valve on the internal wastegate 242' to open, while a decrease in exhaust pressure causes the valve on the internal wastegate 242' to close. In other embodiments, the valve associated with internal wastegate 242' is actuated in response to the outlet pressure of the turbocharger compressor 236' (i.e., turbo boost pressure). In some embodiments, actuation of internal wastegate 242' may be controlled by an engine control unit (ECU) (not shown) based on one or more measured inputs, including one or more of exhaust pressure, exhaust temperature, exhaust flow through the turbocharger, turbo boost pressure, etc. For example, in some embodiments internal wastegate 242' is controlled (i.e., actuated) based on exhaust temperature within the tuned expansion chamber 226, wherein temperature is decreased by opening (partially or completely) the internal wastegate 242' and increased by closing (partially or completely) the internal wastegate 242'. In some embodiments, internal wastegate 242' is controlled based on the desired flow of exhaust through turbocharger exhaust turbine 234', wherein internal wastegate 242' is closed (partially or completely) to increase the flow of exhaust through turbocharger exhaust turbine 234' and opened (partially or completely) to decrease the flow of exhaust through turbocharger exhaust turbine 234'. In some embodiments, a combination of inputs (e.g., temperature within tuned expansion chamber, flow of exhaust through the turbocharger, etc.) are utilized to determine the actuation of internal wastegate 242'.

In other embodiments (shown in FIGS. 17C and 17D) both an internal wastegate and some sort of output from the tuned expansion chamber to the exhaust muffler is utilized in conjunction with one another. For example, in some embodiments such as that shown in FIG. 17C, a fixed flow orifice 244" provides exhaust from tuned expansion chamber 226" to exhaust muffler 230". In this embodiment, the flow of exhaust provided by fixed flow orifice 244" to exhaust muffler 230" is relatively fixed due to the fixed size of the orifice. In some embodiments, utilizing a fixed flow orifice 244" allows exhaust to flow through tuned expansion chamber to regulate (e.g., raise) exhaust temperatures in the tuned expansion chamber 226". In this embodiment, turbocharger internal wastegate 242" is utilized to selectively control the flow of exhaust through turbocharger exhaust turbine 234". Control of the turbocharger internal wastegate 242" may utilize one or more of the inputs described with respect to FIGS. 17A and/or 17B. For example, in some embodiments actuation of turbocharger internal wastegate 242" is based on the turbo boost pressure.

In some embodiments, rather than a fixed flow orifice, an external wastegate 228'" is utilized in conjunction with turbocharger internal wastegate 242'" to selectively regulate the flow of exhaust from tuned expansion chamber 226''' to exhaust muffler 230'''. In addition, in some embodiments, turbocharger internal wastegate 242''' selectively regulates the flow of exhaust through turbocharger exhaust turbine 234''. In some embodiments, the external wastegate 228''' is actuated based on one or more inputs (e.g., temperature within the tuned expansion chamber, exhaust pressure within tuned expansion chamber, etc.) and the internal wastegate 242''' is actuated based on one or more inputs, which may be the same or different than those utilized to actuate external wastegate 228''' (e.g., exhaust pressure within the turbocharger, etc.). Once again, tuned expansion chamber 226''' has a cross-section and/or length designed to generate a reflected wavefront time to arrive at the inlet port of exhaust manifold 224''' to push any escaped fuel/air mixture back into the cylinder prior to the next combustion cycle. In some embodiments, external wastegate 228''' is actuated based on temperature measured within the tuned expansion chamber 226''' and turbocharger internal wastegate 242''' is actuated based on the flow of exhaust provided to the turbocharger exhaust turbine 234''' and/or on the turbo boost pressure. In some embodiments, one or both of the internal wastegate 242''' and external wastegate 242''' are regulated by an ECU and the characteristics of each can be regulated based on pressure, flow, temperature, engine RPM, load, and the state (e.g., open/closed/partially open) of the other of the internal and external wastegate.

In some embodiments, the exhaust manifold (e.g. exhaust manifold 224) bifurcates the flow of exhaust. In some embodiments, exhaust manifold may not be utilized to bifurcate the exhaust. In some embodiments, exhaust manifold may have a single outlet for providing exhaust to expansion chamber 226 and expansion chamber 226 includes an additional outlet for providing a parallel path of exhaust to a turbocharger.

Figure 20A:
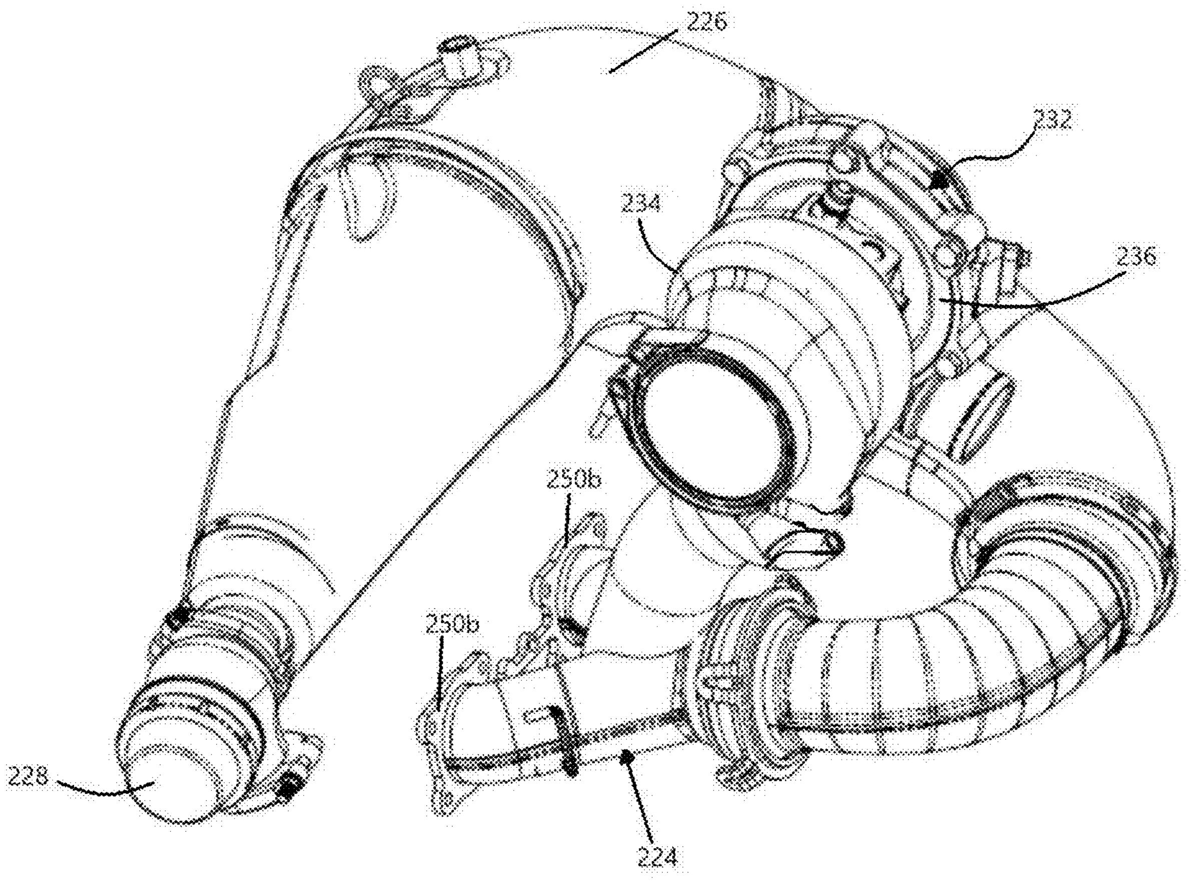
FIGS. 20A-20B are perspective and exploded views, respectively, of the parallel path exhaust system with charge air cooler and exhaust muffler removed for clarity according to some embodiments.
Figure 20B:
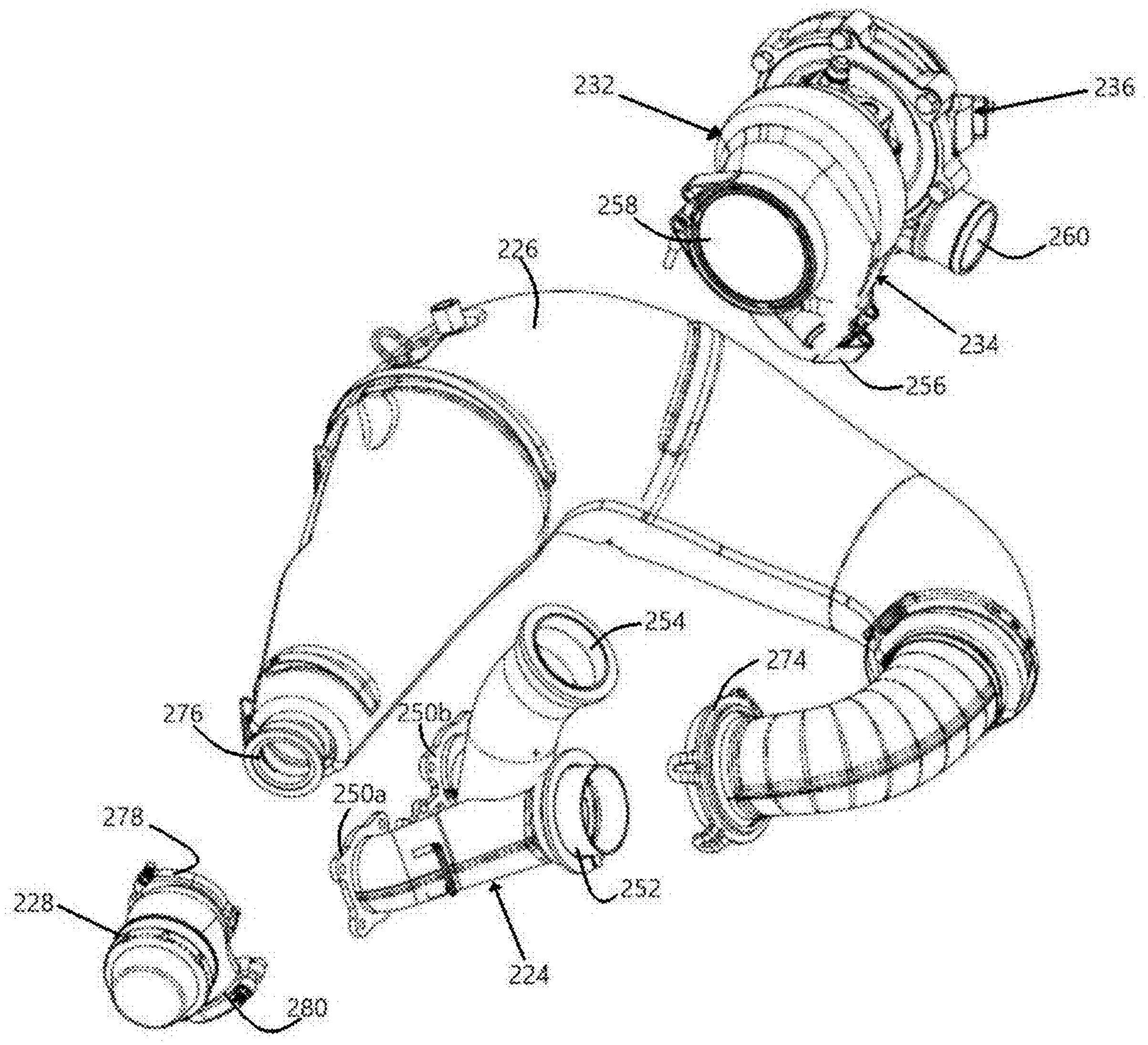

Referring now to FIGS. 18A-20B, various views of an engine system 220 utilizing a parallel-path exhaust path are shown. In particular, FIGS. 18A-18D illustrate the engine system 220 utilizing a parallel-path exhaust path. FIGS. 19A-19B illustrate the parallel-path exhaust path with the two-stroke engine 222 removed for clarity. FIGS. 20A-20B illustrate the parallel-path exhaust path with two-stroke engine, exhaust muffler, and charge air cooler removed for clarity.

In some embodiments, two-stroke engine 222 includes first and second cylinders. Compressed air provided by the turbocharger 232 and cooled by charge air cooler 238 is provided to the respective cylinders by intake plenum 240. Exhaust generated by the first and second cylinders of two-stroke engine 222 is provided to exhaust manifold 224. Various geometries of exhaust manifold may be utilized, as described in more detail below. In general, exhaust manifold 224 bifurcates the exhaust provided by two-stroke engine 222 into first and second parallel paths. In some embodiments, the mass and/or volume of exhaust provided to the first and second parallel paths may be equal or unequal, and may change based on the operating condition of the two-stroke engine. In some embodiments, a first parallel path includes tuned expansion chamber 226, and a second parallel path includes turbocharger 232. As discussed above, turbocharger 232 includes an exhaust turbine 234 and a compressor 236. Exhaust turbine 234 extracts energy from the exhaust and utilizes the extracted energy to drive compressor 236.

Figure 24A:
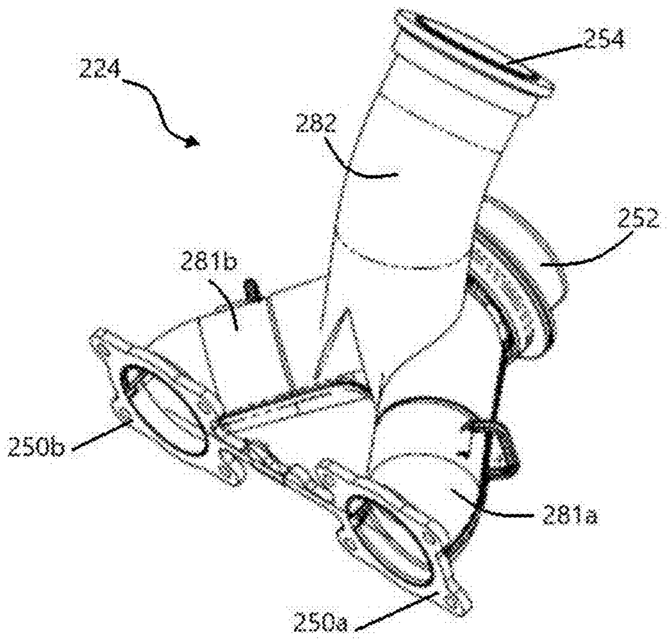
FIGS. 24A-24D are perspective, top, side, and front views of an exhaust manifold utilized to bifurcate the exhaust into first and second paths for the parallel path exhaust system according to various embodiments.
Figure 24B:
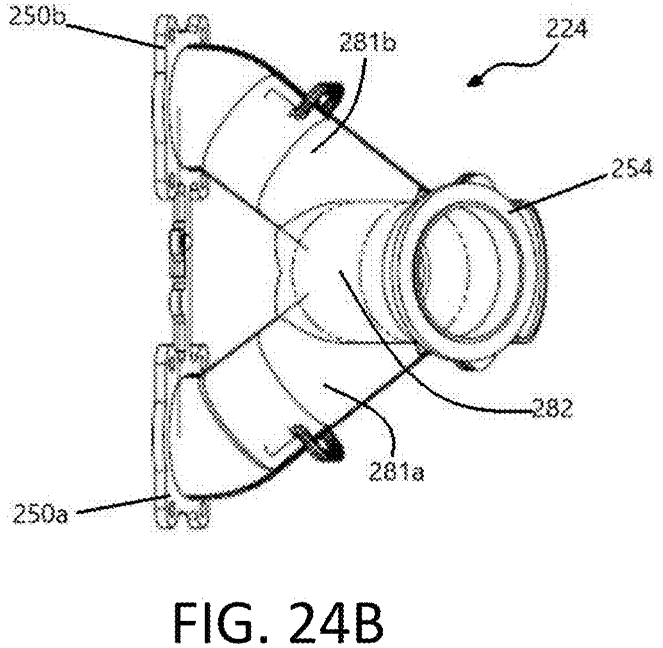
Figure 24C:
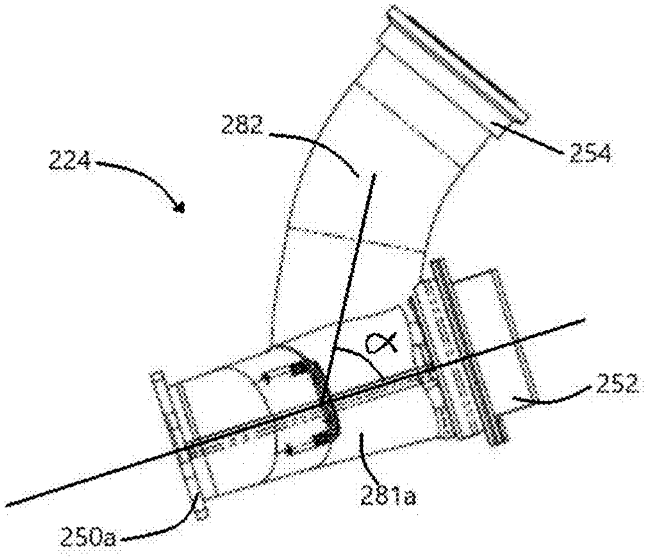
Figure 24D:
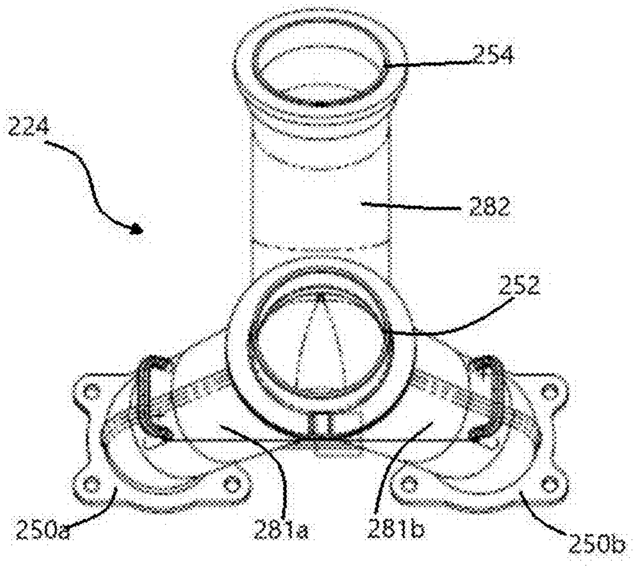

As shown in more detail in FIGS. 19B, 20B and 24A-24D, exhaust manifold 224 includes first and second inlets 250*a*, 250*b* connected to receive exhaust from first and second combustion cylinders, respectively. In addition, exhaust manifold 224 includes first outlet 252 and second outlet 254, wherein first outlet 252 provides exhaust to the first parallel path (e.g., to tuned expansion chamber 226) and second outlet 254 provides exhaust to the second parallel path (e.g., to turbocharger 234). In some embodiments, first and second inlets 250*a*, 250*b* are located on the same horizontal plane, offset horizontally from one another along the plane as shown in FIG. 24D. In some embodiments, first outlet 252 and second outlet 254 are located on the same vertical plane, offset from one another in a vertical direction as shown in FIG. 24D. In some embodiments, first and second inlets 250*a*, 250*b* and first outlet 252 are located on approximately the same plane. That is, exhaust flowing into first and second inlets 250*a* and 250*b* continues along the defined plane to first outlet 252. In some embodiments, second outlet 254 is oriented at an angle relative to the plane that includes first and second inlets 250*a*, 250*b* and first outlet 252. For example, in the embodiment shown in FIG. 24C, this angle is represented by angle $\alpha$. In some embodiments, angle $\alpha$ is less than ninety degrees. In some embodiments, angle $\alpha$ is approximately forty-five degrees. In other embodiments, such as those described with respect to FIGS. 25A-25D, 26A-26D, and 27A-27D, exhaust manifold 224 may utilize various other geometries to bifurcate the exhaust as required by the application.

Figure 21A:
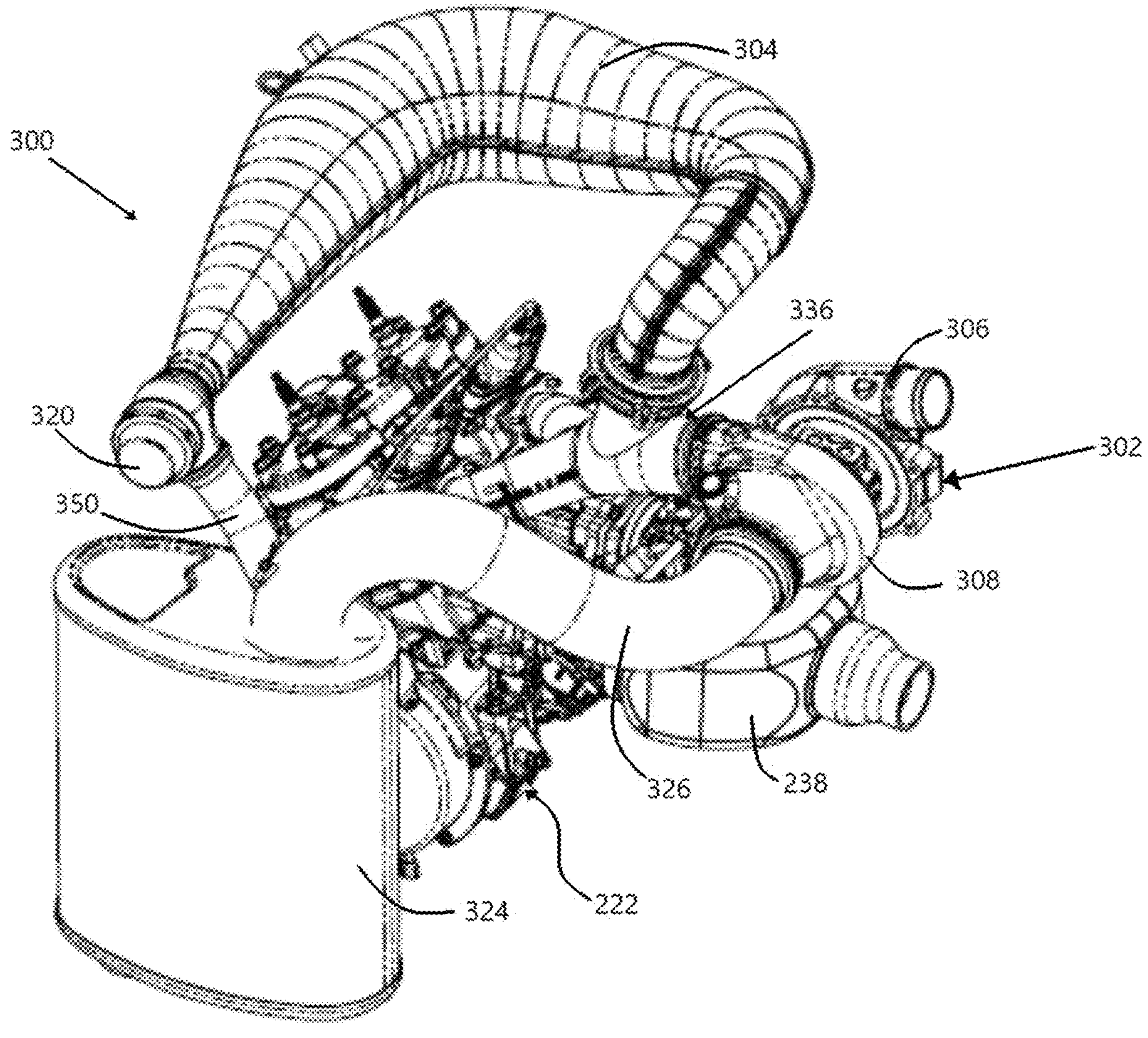
FIGS. 21A-21C are perspective, side, and top views, respectively, of the parallel path exhaust system utilized in conjunction with a two-stroke engine and turbocharger according to some embodiments.
Figure 21B:
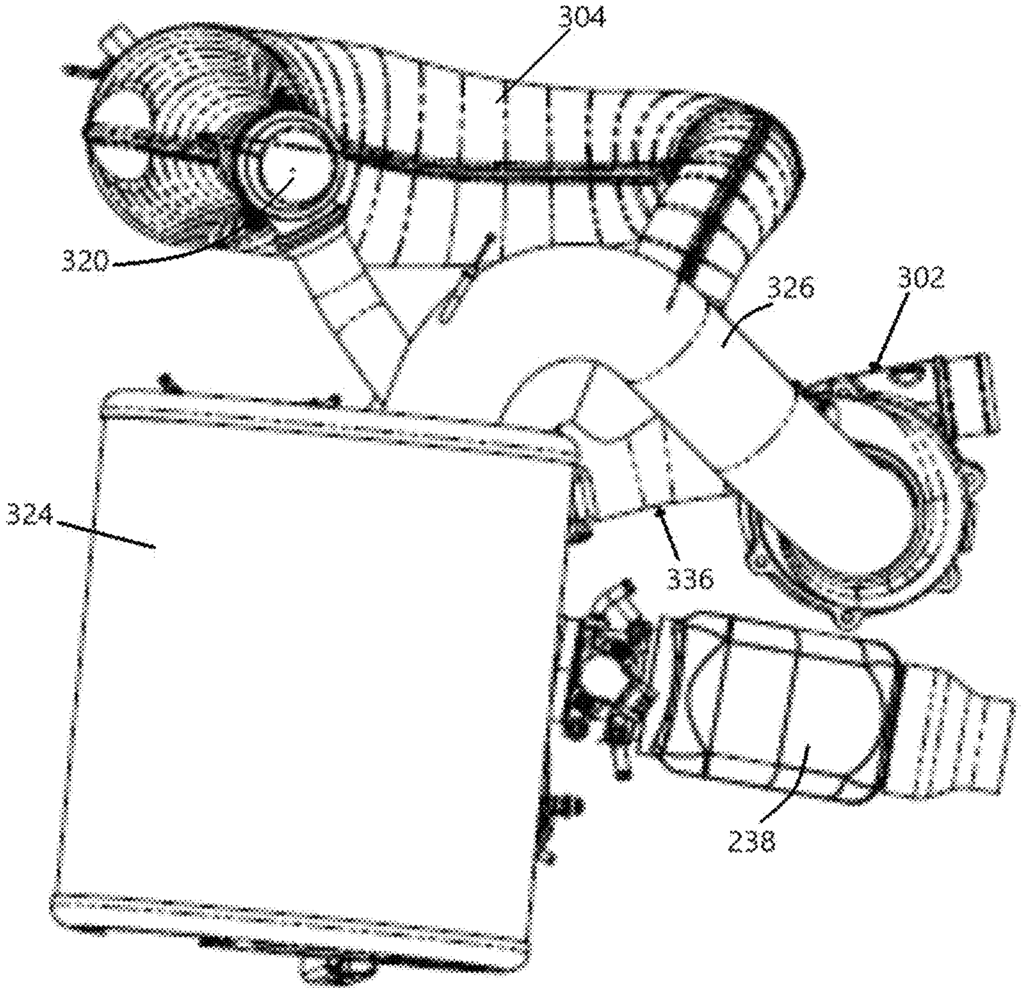
Figure 21C:
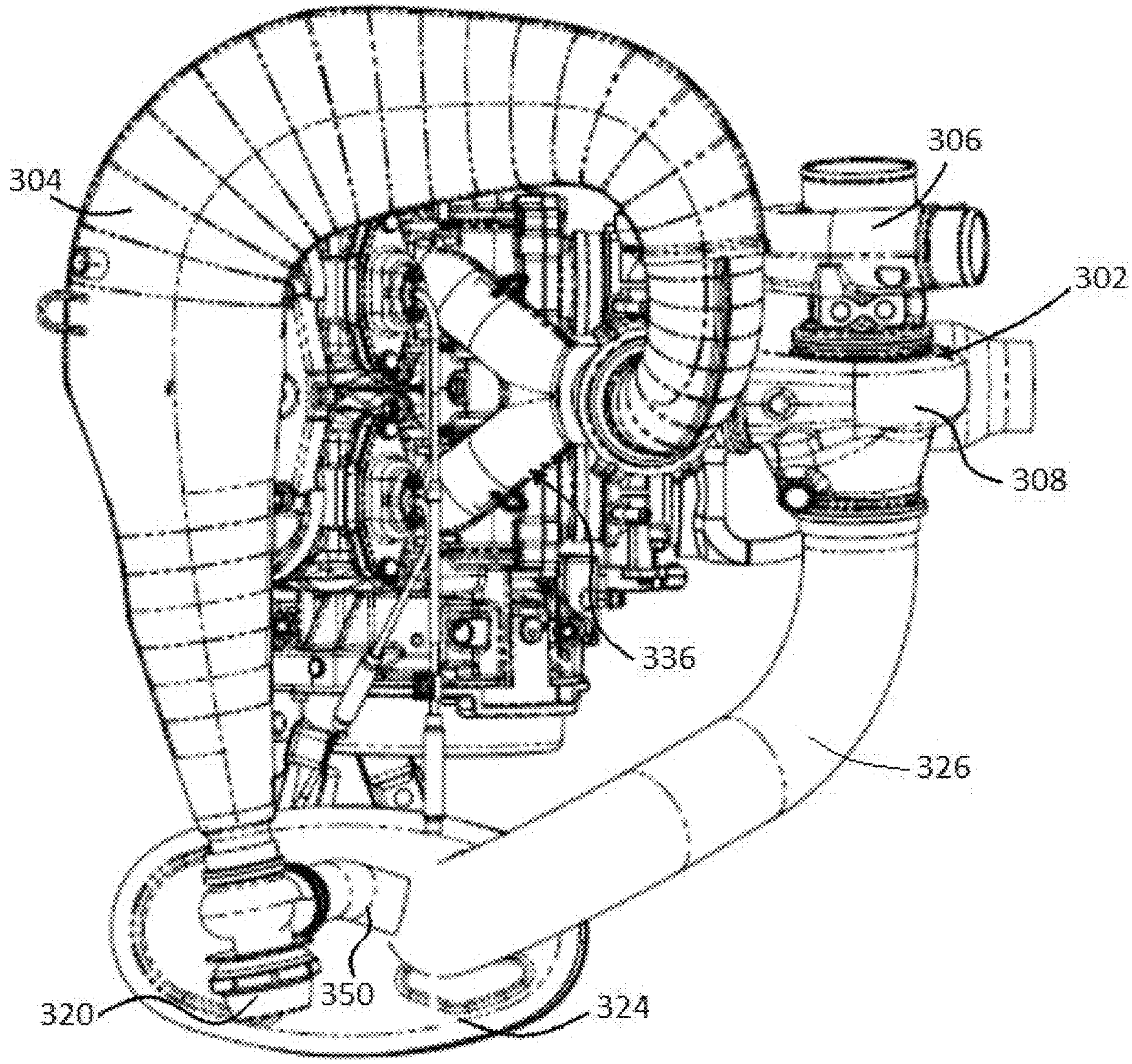

In some embodiments, such as those shown in FIGS. 18A-20B, turbocharger 232 is connected to second outlet 254 (e.g., second parallel path). In other embodiments, such as those shown in FIGS. 21A-21C, the turbocharger is connected to the first outlet (e.g., the first parallel path). The determination of whether turbocharger 232 is connected to the first outlet 252 or second outlet 254 may be based on space constraints or may be based on the flow characteristics associated with the first outlet 252 and second outlet 254. In addition, exhaust manifold 224 may utilize various geometries for bifurcating exhaust into first and second parallel paths, respectively. For example, in some embodiments first and second inlets 250*a*, 250*b* and first outlet 252 form a Y-shape, in which first and second inlets 250*a*, 250*b* are on the same plane as first outlet 252. In this embodiment, second outlet 254 is located at an angle relative to the Y-shaped geometry defined by the first and second inlets 250*a*, 250*b* and first outlet 252. In some embodiments, this angle is less than ninety degrees. In some embodiments, this angle is approximately forty-five degrees. In other embodiments, described in more detail below, both first outlet 252 and second outlet 254 are located at defined angles relative to the horizontal plane defined by first and second inlets 250*a*, 250*b*.

In some embodiments, tuned expansion chamber 226 includes expansion chamber inlet 274 and expansion chamber outlet 276. In some embodiments, expansion chamber inlet 274 is connected to first outlet 252 of exhaust manifold 224 to receive exhaust from both the first and second cylinders. The length and cross-sectional geometry of tuned expansion chamber 226 is selected to reflect wavefronts associated with the received exhaust back toward the first and second inlets 250*a*, 250*b* with an arrival timed to push any air/gas mixture drawn out of the engine back into the cylinder prior to the port closing before the next combustion cycle. In the embodiment shown in FIGS. 18A-20B, tuned expansion chamber 226 is coupled to first outlet 252. In some embodiments, expansion chamber outlet 276 is coupled to external wastegate 228 via wastegate inlet 278, which in turn is coupled via wastegate outlet 280 to exhaust pipe inlet 282 associated with exhaust pipe 264. As described above, external wastegate 228 regulates the exhaust gas within the tuned expansion chamber 226 and therefore regulates the flow of exhaust through the turbocharger 232. More specifically, external wastegate 228 regulates the mass and/or volume of exhaust provided to turbocharger 232 (specifically exhaust turbine 234). In some embodiments, exhaust from external wastegate 228 is provided directly to a separate exhaust inlet on exhaust muffler 230. In some embodiments, exhaust from external wastegate 228 (i.e., first parallel path) is combined with exhaust from the turbocharger 232 (i.e., second parallel path) for provision to exhaust muffler 230 via a single exhaust inlet.

Exhaust turbine 234 associated with turbocharger 232 includes an exhaust inlet 256 and exhaust outlet 258. In some embodiments, exhaust inlet 256 is coupled to second outlet 254 of exhaust manifold 224 to provide exhaust to exhaust turbine 234. In some embodiments, exhaust outlet 258 is coupled via exhaust pipe 264 to exhaust muffler 230. In some embodiments, compressor 236 associated with turbocharger 232 is located adjacent to exhaust turbine 234. In some embodiments, compressor 236 includes an air inlet 262 and a compressed air outlet 260. Compressor draws atmospheric air through air inlet 262, compresses the air, and provides the compressed air to charge air cooler 238 via air outlet 260 and hose/tube 266. As discussed above, the compressed air is cooled by charge air cooler 238 to increase the density of the air, which provides the cooled, condensed air to intake plenum 240 via coupling 268. Air intake plenum 240 is connected to air intake manifold 270, which provides compressed air to first and second combustion cylinders via first and second air intakes 272*a* and 272*b*.

Figure 18A:
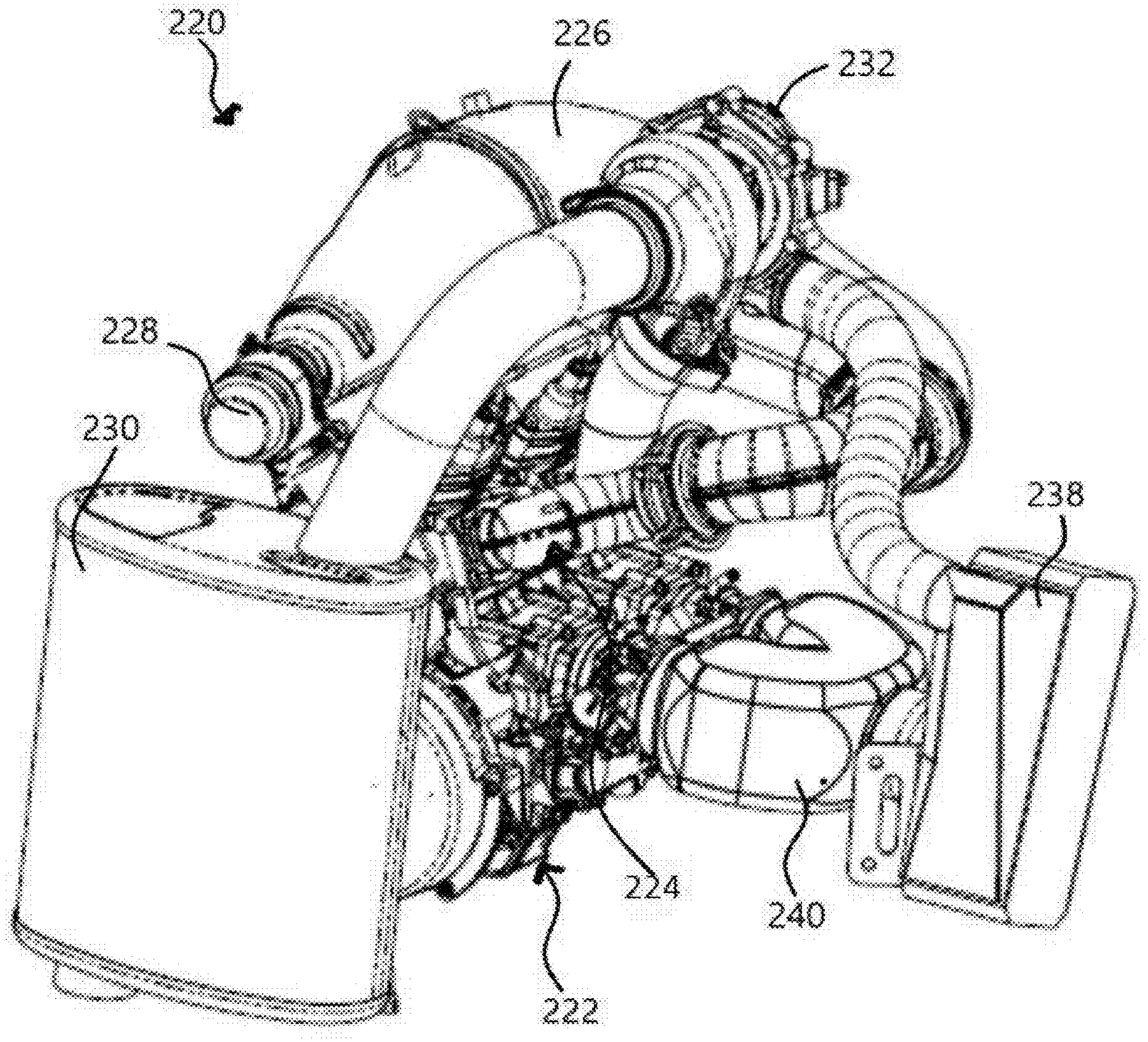
FIGS. 18A-18D show various views of a parallel path exhaust system utilized in conjunction with a two-stroke engine and turbocharger according to some embodiments.
Figure 18B:
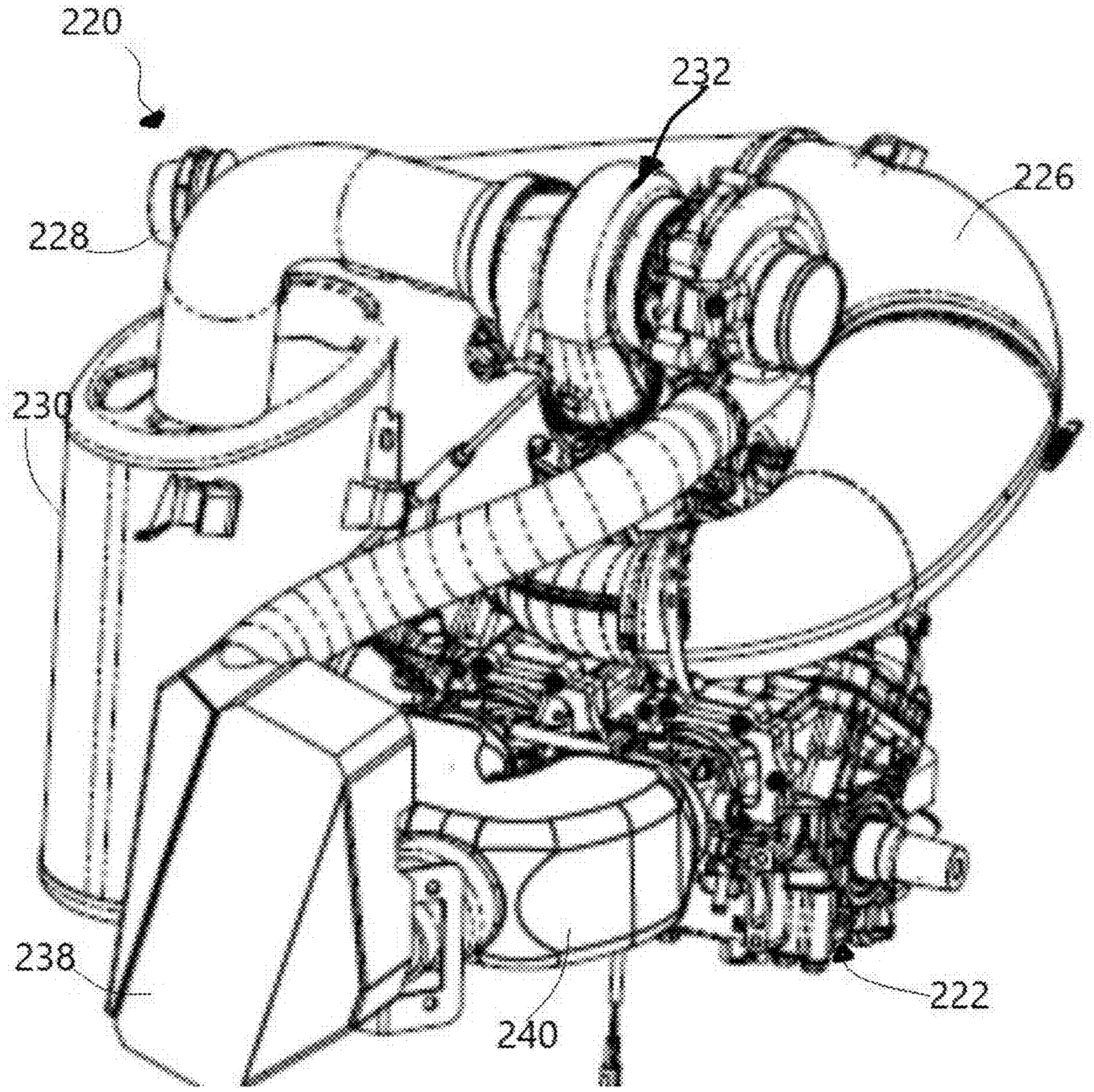
Figure 18C:
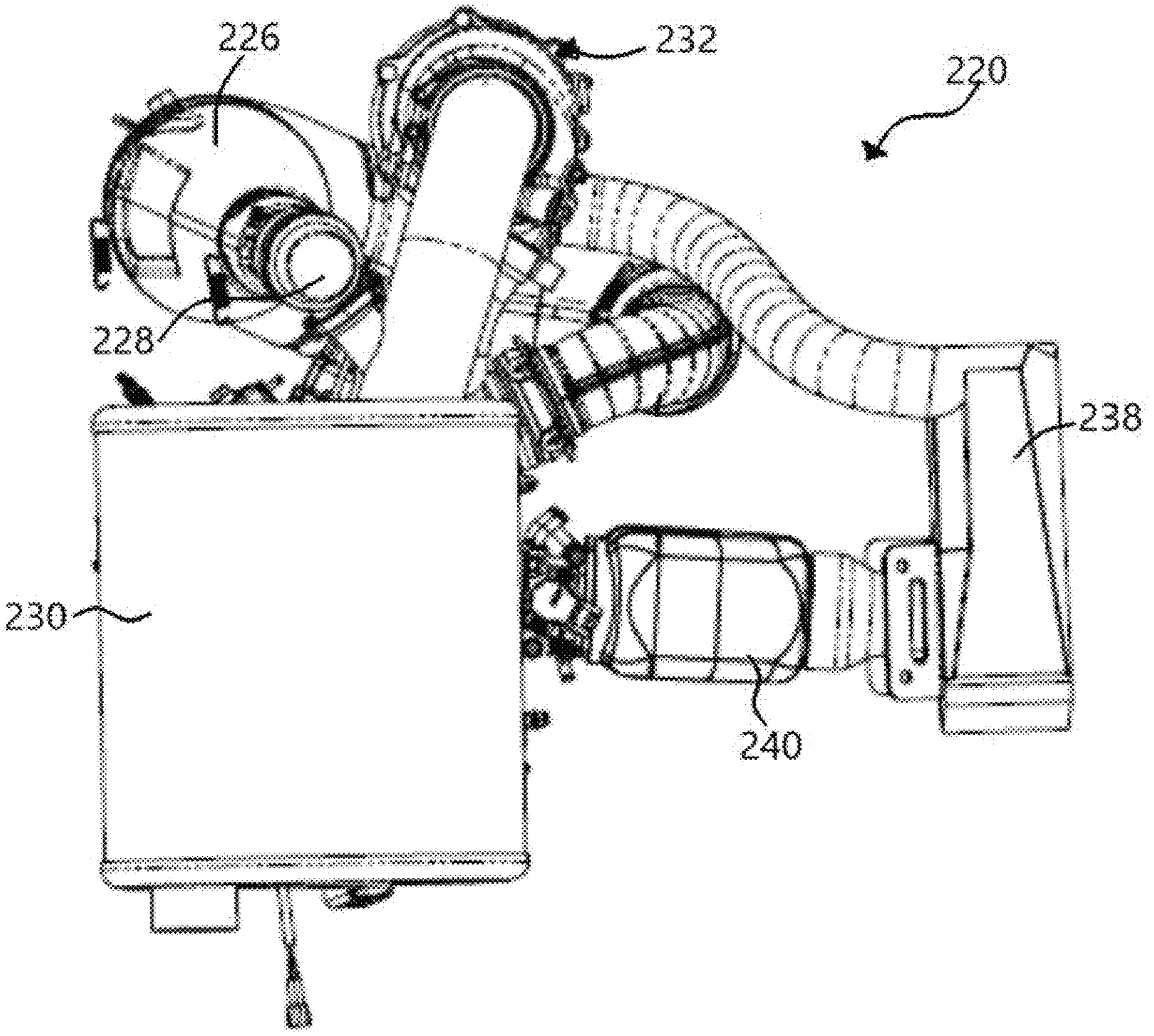
Figure 18D:
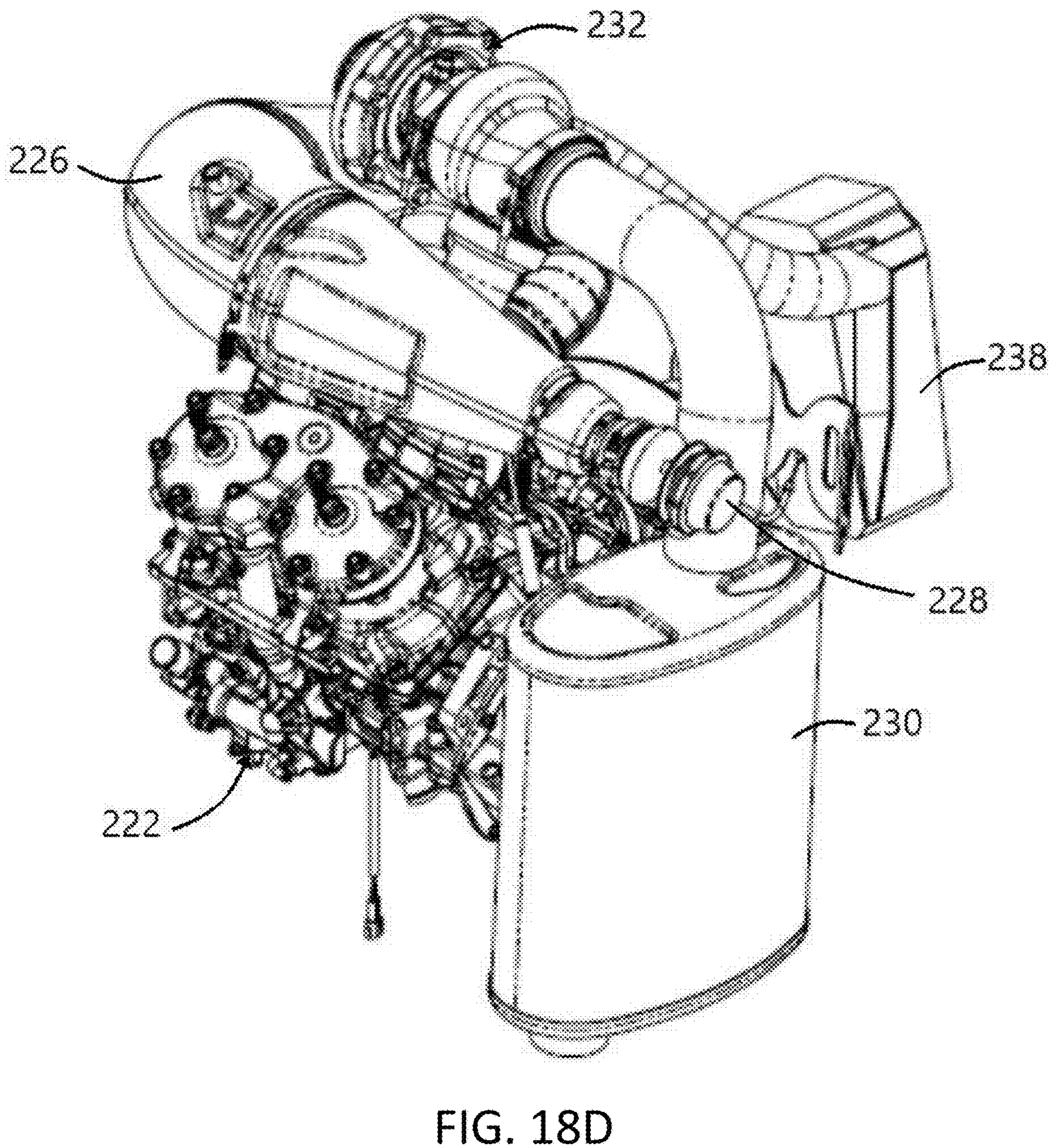
Figure 19A:
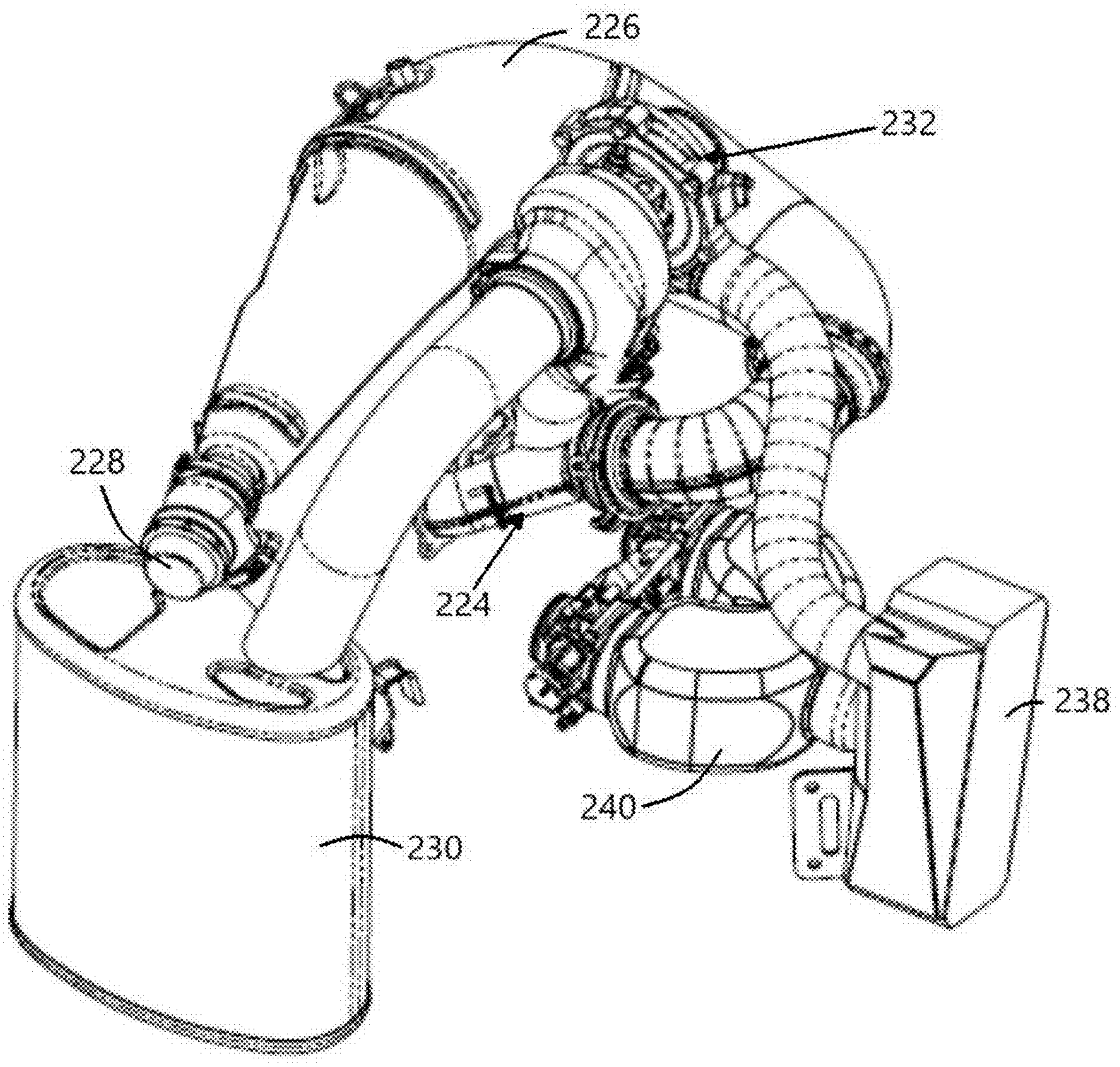
FIGS. 19A-19B are perspective and exploded views, respectively, of a parallel path exhaust system with two-stroke engine removed for clarity according to some embodiments.
Figure 19B:
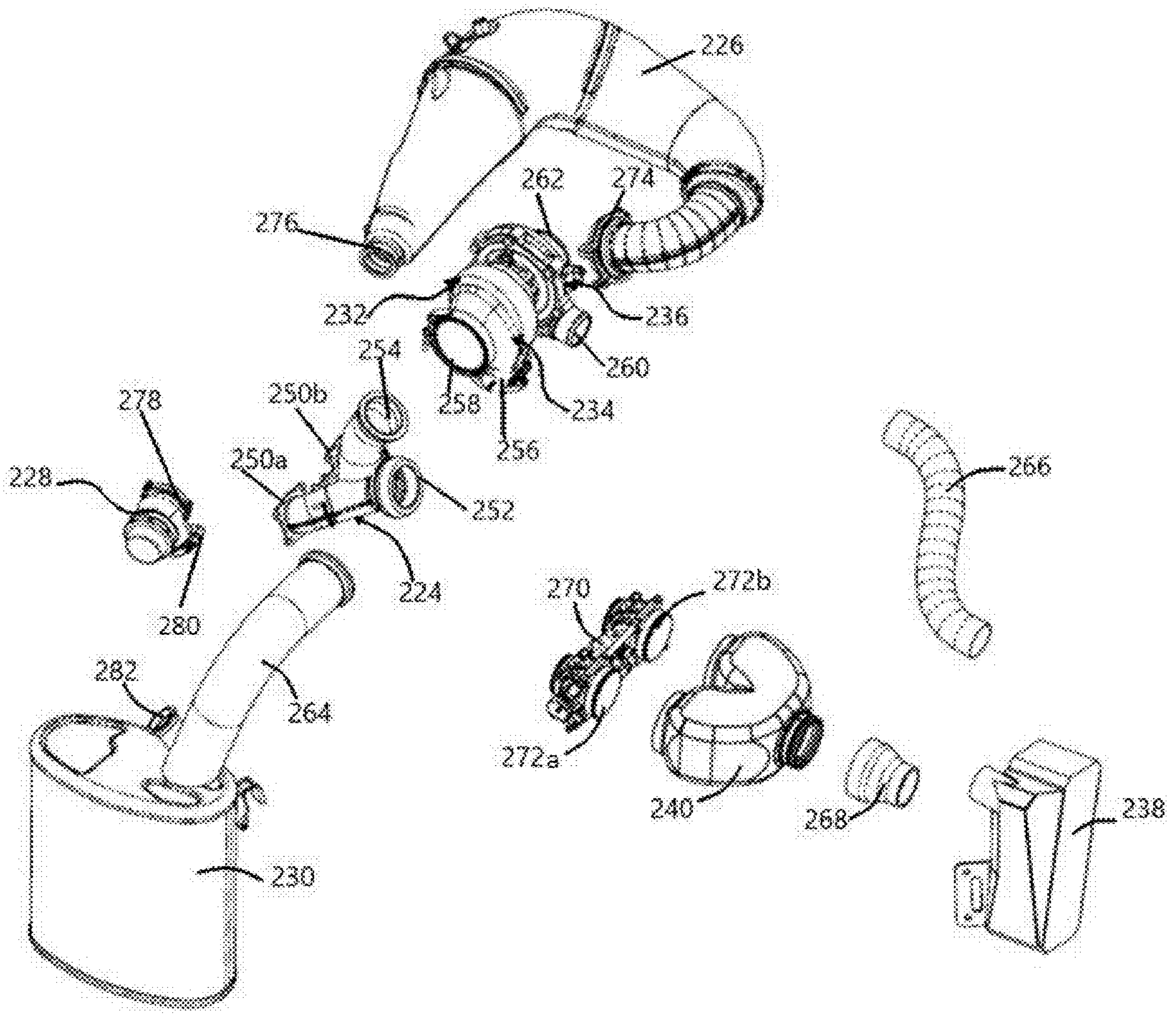

As shown in FIG. 18A, the length of the flow path of exhaust from the first and second cylinders of engine 222 to turbocharger 232 is significantly less than the length of tuned expansion chamber 226. A benefit of locating turbocharger 232 proximal to engine 222 (in particular, in proximity to the exhaust ports associated with the cylinders) is improved responsiveness of turbocharger 232 to changes in requested or commanded engine output. That is, the proximate location of turbocharger relative to engine 222 decreases the time required for exhaust generated by engine 222 to be provided to turbocharger 232, and therefore decreases the time required for the turbocharger to respond to changes in requested or commanded engine output. As shown in the side view illustrated in FIG. 18C, connecting turbocharger 232 to the second parallel path (i.e., to the second outlet 254 associated with exhaust manifold 224) results in turbocharger 232 being located on a horizontal plane that is above tuned expansion chamber 226. As discussed in more detail below, in other embodiments turbocharger 232 may alternatively be connected to the first parallel path and tuned expansion chamber 226 to the second parallel path, which modifies the location of the turbocharger 232 relative to the tuned expansion chamber 226.

Referring now to FIGS. 21A-21B and 22A-22C, a parallel-path exhaust system 300 is illustrated in which turbocharger 302 is connected to the first outlet 342 of exhaust manifold 336 and tuned expansion chamber 304 is connected to the second outlet 340 of exhaust manifold 336. In this embodiment, first outlet 342 is located on the same vertical plane as second outlet 340, wherein first outlet is located below second outlet 340. This is in contrast with the embodiment illustrated with respect to FIGS. 17A-20B in which tuned expansion chamber was connected to the first outlet 252 and the turbocharger connected to the second outlet 254. As a result of turbocharger 302 being connected to first outlet 342 and tuned expansion chamber 304 being connected to second outlet 340, the relative locations of the turbocharger 302 and tuned expansion chamber 304 are modified as compared with previous embodiments. In particular, in some embodiments, turbocharger 302 may be located at a vertical location lower than that shown in previous embodiments. In some embodiments, this may lower the center of gravity associated with the parallel-path exhaust system 300. In addition, the flow of exhaust from the exhaust manifold 336 into the turbocharger 302 and/or tuned expansion chamber 304 may be varied as a result of the locations of each as well as with respect to the geometry of the exhaust manifold 336.

In general, exhaust generated by two-stroke engine 222 is provided via first and second cylinders to exhaust manifold 336, which bifurcates the flow of exhaust into first and second parallel paths. In this embodiment, the first parallel path includes turbocharger 302 and the second parallel path includes tuned expansion chamber 304 and external wastegate 320. Turbocharger 302 extracts energy from the received exhaust and utilizes the extracted mechanical energy to drive a compressor that provides compressed air to intake plenum 240. Exhaust exits turbocharger 302 and is provided via exhaust pipe 326 to exhaust muffler 324. Tuned expansion chamber 304 receives exhaust from exhaust manifold 336, wherein external wastegate 320 regulates the exhaust gas within the tuned expansion chamber 304 and therefore regulates the flow of exhaust through the turbocharger 302. More specifically, external wastegate 320 regulates the mass and/or volume of exhaust provided to turbocharger 302 (specifically exhaust turbine 308). Exhaust output from external wastegate 320 is provided to exhaust muffler 324.

Figure 22A:
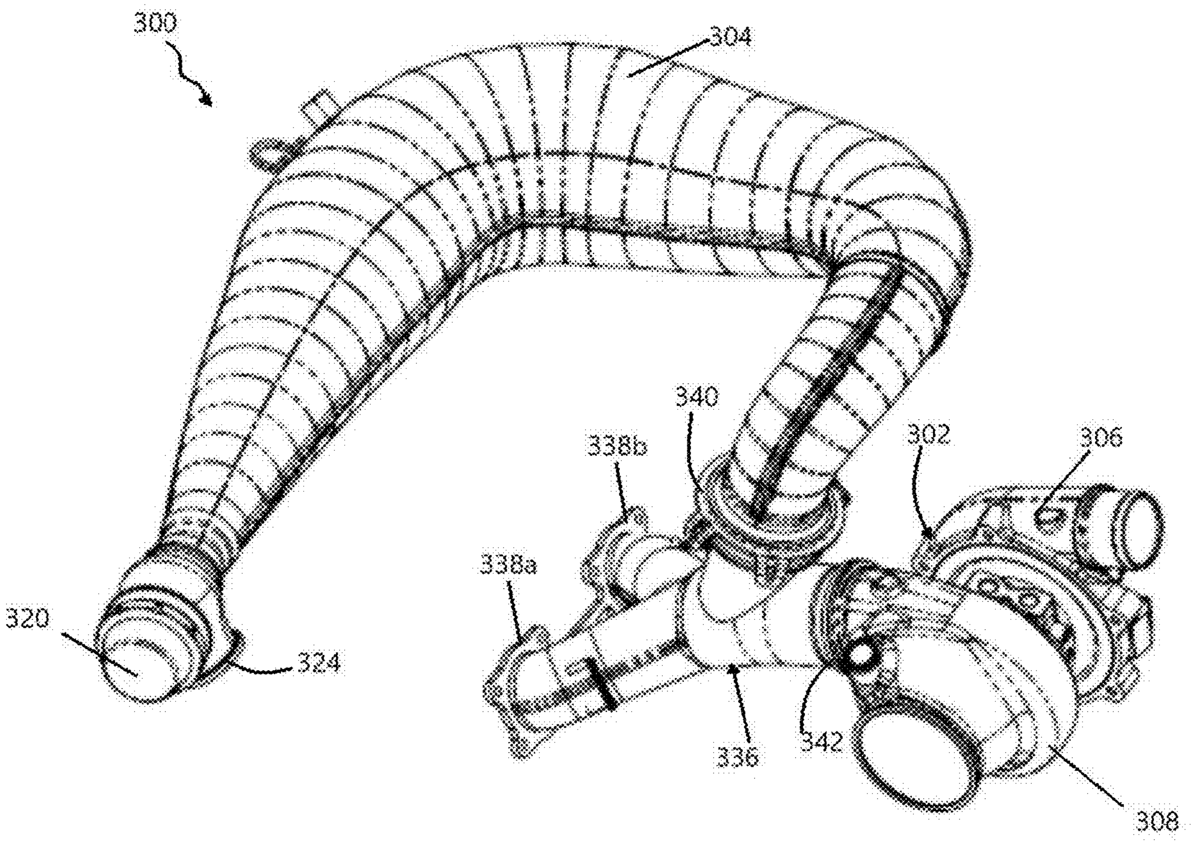
FIGS. 22A-22C show various views of a parallel-path exhaust system with two-stroke engine, charge air cooler, and exhaust muffler removed for clarity according to some embodiments.
Figure 22B:
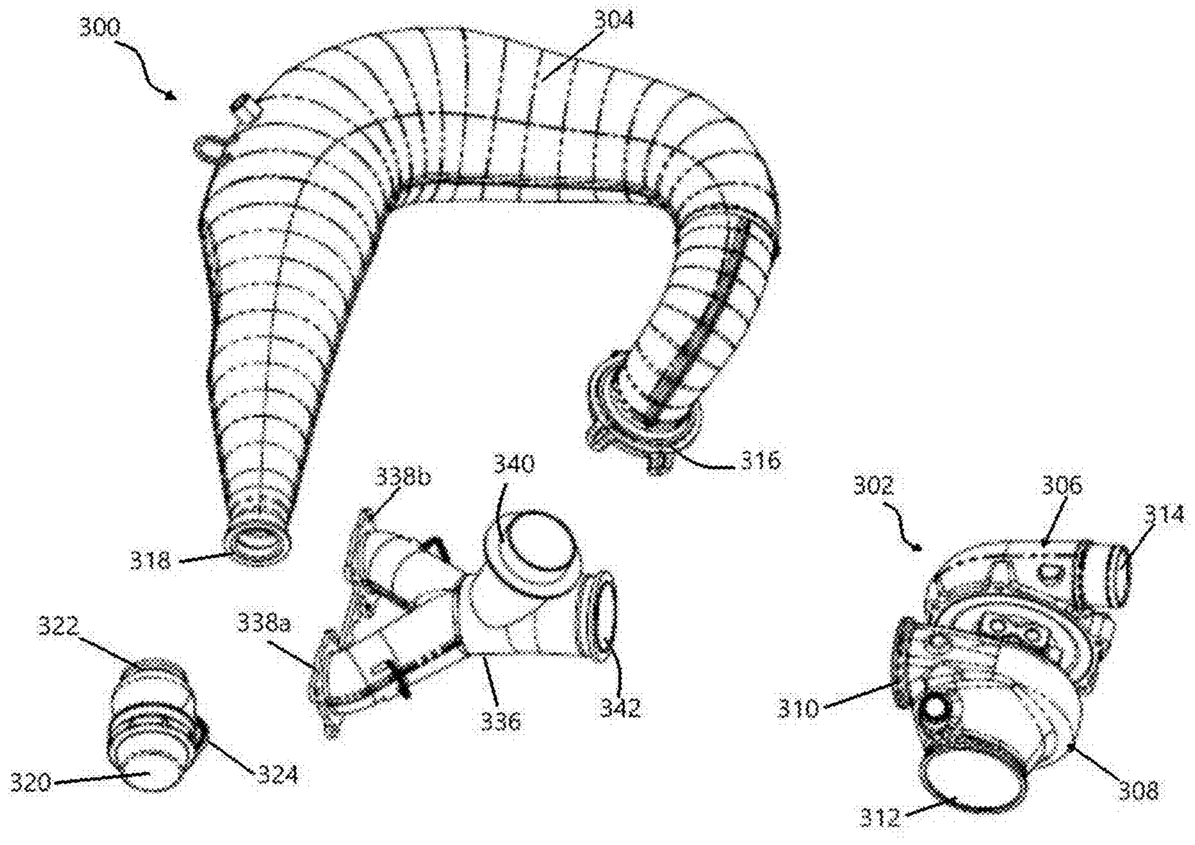
Figure 22C:
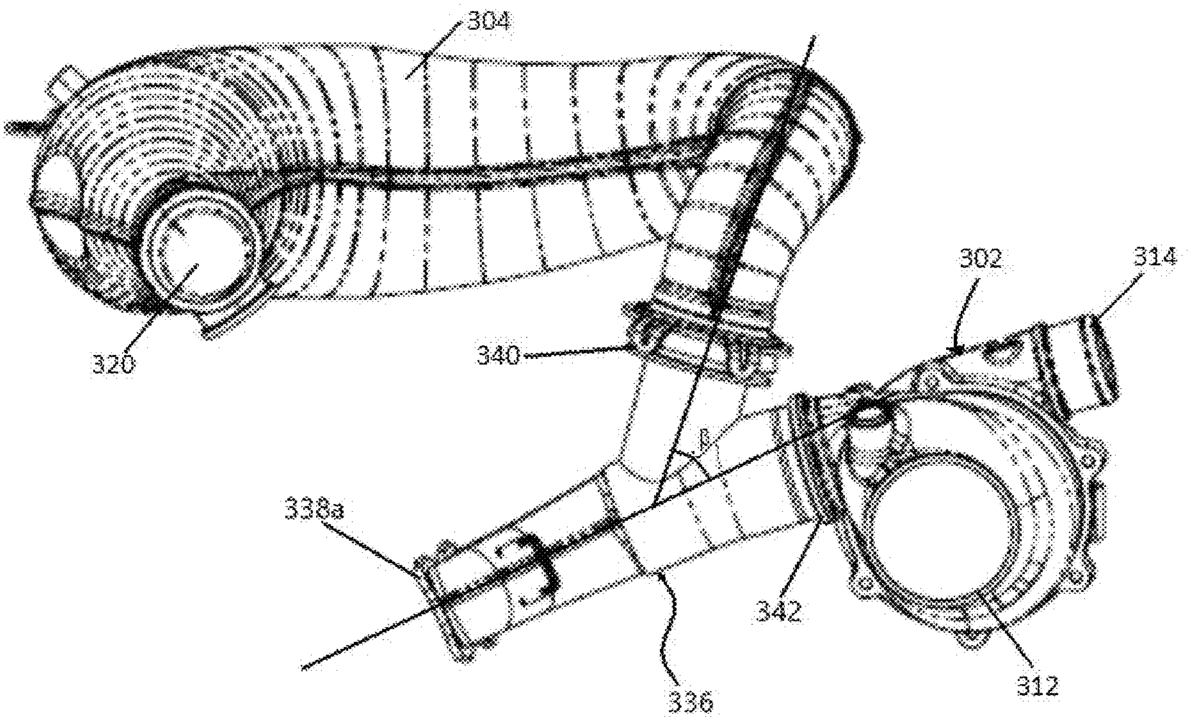

In the embodiment shown in FIGS. 22A-22C, exhaust manifold 336 includes first and second exhaust inlets 338*a*, 338*b* connected to receive exhaust from first and second cylinders, respectively. In addition, exhaust manifold 336 includes first outlet 342 and second outlet 340, wherein first outlet 342 provides exhaust to the first parallel path and second outlet 340 provides exhaust to the second parallel path. In the embodiment shown in FIGS. 21A-21C, turbocharger 302 is connected to first outlet 342, and tuned expansion chamber 304 is connected to second outlet 340. In some embodiments, first and second exhaust inlets 338*a*, 338*b* and first outlet 342 are located on the same plane, meaning that exhaust flowing into first and second exhaust inlets 338*a*, 338*b* flows into first outlet 342 without requiring a change in direction. In this embodiment, second outlet 340 is located at an angle β (shown in FIG. 22C) relative to the Y-shaped geometry defined by the first and second inlets 338*a*, 338*b* and first outlet 342. In some embodiments, this angle β is less than ninety degrees. In some embodiments, the angle β is approximately forty-five degrees. As a result, exhaust flowing into first and second exhaust inlets 338*a*, 338*b* is required to change direction to enter tuned expansion chamber 304. In some embodiments, the length and/or cross-sectional geometry of tuned expansion chamber 304 takes into account the geometry of exhaust manifold 224 to ensure tuned expansion chamber 304 provides the desired benefits to the efficiency of the two-stroke engine.

In some embodiments, tuned expansion chamber 304 includes expansion chamber inlet 316 and expansion chamber outlet 318, wherein outlet 318 is coupled to external wastegate 320. In turn, external wastegate includes wastegate inlet 322 and wastegate outlet 324. In some embodiment, wastegate outlet 324 is coupled either to the exhaust stream provided by turbocharger 302 or directly to the exhaust muffler (not shown). In some embodiments, turbocharger 302 utilizes an internal wastegate to regulate the flow of exhaust provided to the turbocharger 302. The internal wastegate may be utilized in conjunction with or in place of an external wastegate.

Similarly, as described above, turbocharger 302 includes exhaust turbine 308 and compressor 306. Exhaust turbine 308 includes a turbine inlet 310 coupled to receive exhaust from first outlet 342 associated with exhaust manifold 336. Exhaust turbine 308 extracts mechanical energy from the received exhaust, which then exits via turbine outlet 312 and is communicated to the exhaust muffler. Mechanical energy extracted by exhaust turbine 308 drives the compressor 306 to provide compressed air at compressor outlet 314. As described above, the compressed air is provided to the two-stroke engine. In some embodiments, the compressed air is provided to the two-stroke engine via a charge air cooler, as shown with respect to FIGS. 17A-18D.

Figure 23:
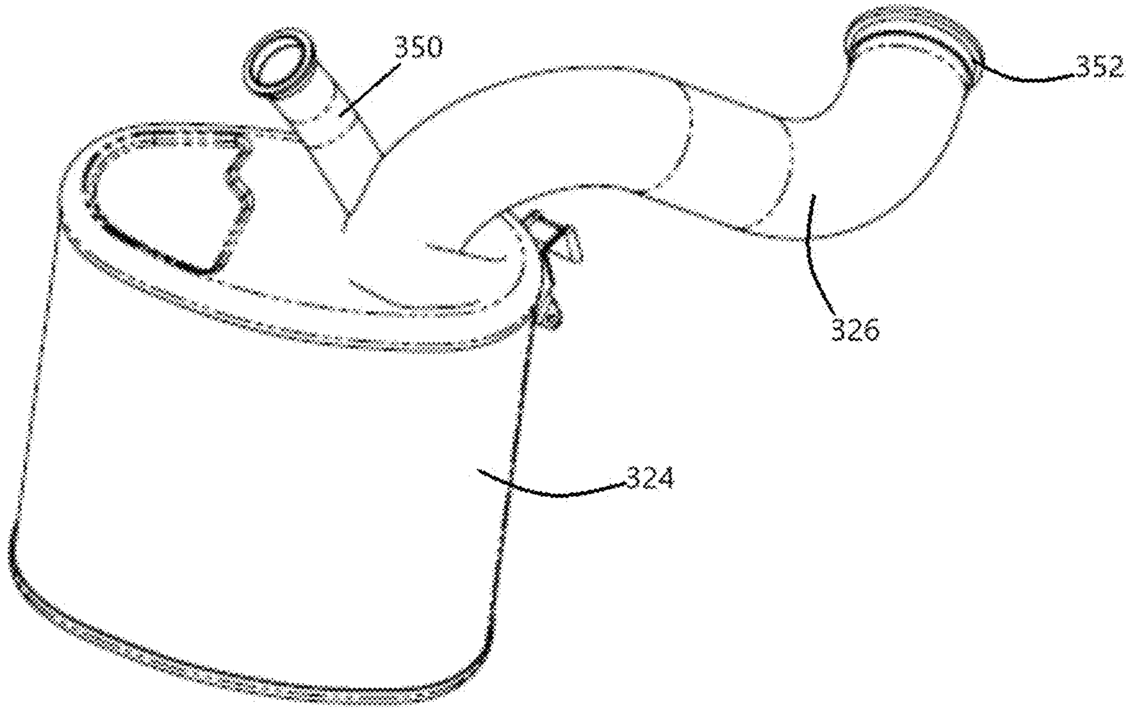
FIG. 23 is a perspective view of an exhaust muffler according to some embodiments.

Referring now to FIG. 23, exhaust muffler 324 is shown, which includes exhaust pipe 326 and wastegate exhaust pipe 350. In some embodiments, wastegate exhaust pipe 350 connects to exhaust pipe 326 to provide exhaust exiting wastegate 320 to exhaust pipe 326, which is then connected to exhaust muffler 324. In some embodiments, the exhaust pipe (e.g., exhaust pipe 326) connecting the turbocharger to the exhaust muffler 324 is larger in diameter than the diameter of wastegate exhaust pipe 350. In some embodiments, the mass of exhaust flowing through the turbocharger exceeds—during normal operation—the mass of exhaust expelled by the external wastegate. In other embodiments, wastegate exhaust pipe 350 may be connected directly to exhaust muffler 324. In some embodiments, exhaust muffler 324 includes a first inlet for receiving exhaust from wastegate exhaust pipe 350 and a second inlet for receiving exhaust from exhaust pipe 326.

Figure 25B:
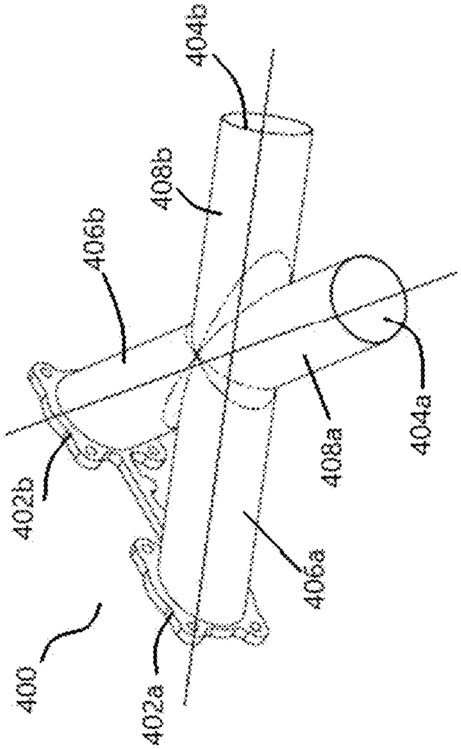
FIGS. 25A-25D are top, perspective, side, and front views of an exhaust manifold utilized to bifurcate the exhaust into first and second paths for the parallel path exhaust system according to various embodiments.
Figure 25D:
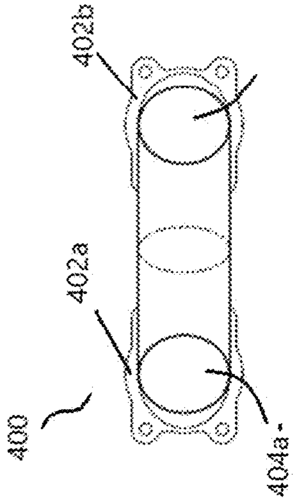
Figure 25A:
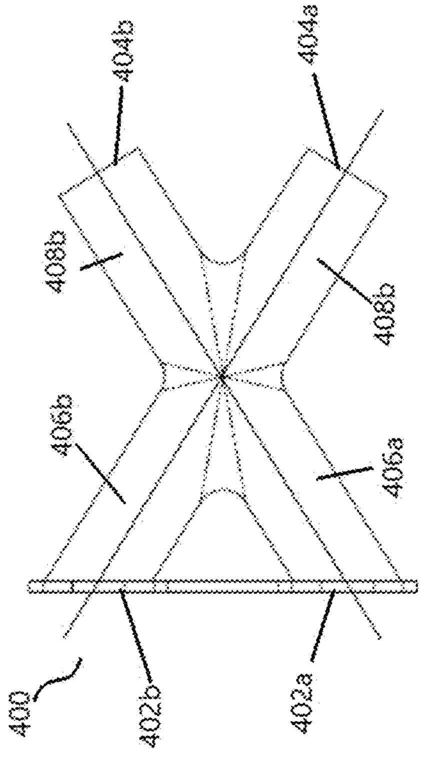
Figure 25C:
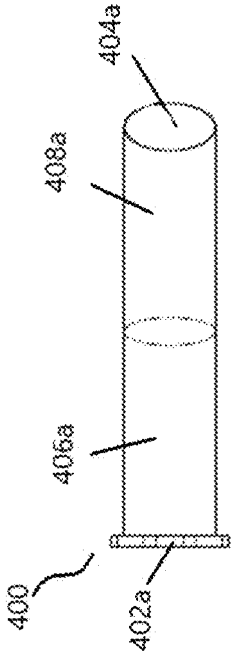

Referring now to FIGS. 25A-25D, an exhaust manifold 400 is illustrated according to some embodiments, wherein exhaust manifold 400 includes first and second exhaust inlets 402*a* and 402*b*, first and second outlets 404*a* and 404*b*, first and second inlet pipes 406*a*, 406*b*, and first and second outlet pipes 408*a*, 408*b*. FIG. 25A is a top view, FIG. 25B is a perspective view, FIG. 25C is a side view, and FIG. 25D is a front view.

As shown in FIG. 25C, both first and second inlets 402*a*, 402*b* and first and second outlets 404*a*, 404*b* are located on the same plane. The top view of exhaust manifold 400 illustrates the X-shaped geometry of the exhaust manifold 400. Exhaust is received at first exhaust inlet 402*a* and second exhaust inlet 402*b*. First and second inlet pipes 406*a* and 406*b* are connected to first and second exhaust inlets 402*a*, 402*b*, respectively, at a proximal end and connected to one another at a distal end. The connection of first and second inlet pipes 406*a* and 406*b* at the distal end allows exhaust from each pipe to mix, wherein the mixed exhaust is bifurcated and provided as an output to first and second outlet pipes 408*a* and 408*b*. A portion of the exhaust provided by first and second inlets 402*a*, 402*b* is provided to first outlet 404*a* via first outlet pipe 408*a*, while a portion of the exhaust provided by first and second inlets 402*a*, 402*b* is provided to second outlet 404*b* via second outlet pipe 408*b*. In some embodiments, the diameter of the first and second inlet pipes 406*a* and 406*b* are equal to one another. In some embodiments, the diameter of the first and second outlet pipes 408*a* and 408*b* are equal to one another. In other embodiments, the diameter of the first and second outlet pipes 408*a* and 408*b* are of different diameter to allow a greater mass of exhaust to flow through one of the outlet pipes as compared with the other outlet pipe. In some embodiments, first inlet pipe 406*a* and second outlet pipe 408*b* are approximately aligned with one another, such that first inlet pipe 406*a* and second outlet pipe 408*b* share an axis. Likewise, in some embodiments, second inlet pipe 406*b* and first outlet pipe 408*a* are approximately aligned with one another, such that second inlet pipe 406*b* shares an axis with first outlet pipe 408*b*.

Figure 26A:
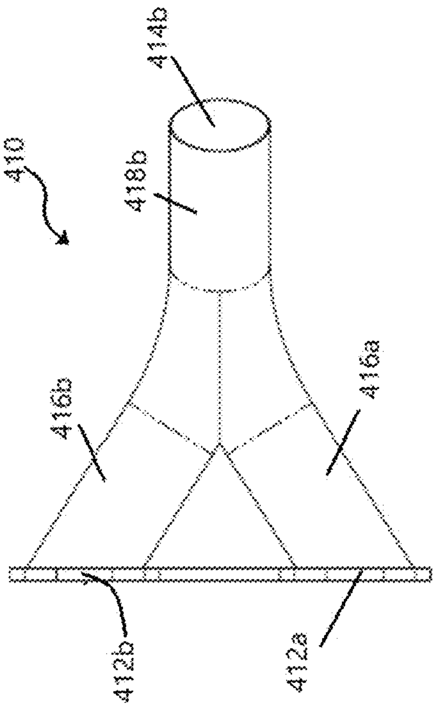
FIGS. 26A-26D are top, perspective, side, and front views of an exhaust manifold utilized to bifurcate the exhaust into first and second paths for the parallel path exhaust system according to various embodiments.
Figure 26B:
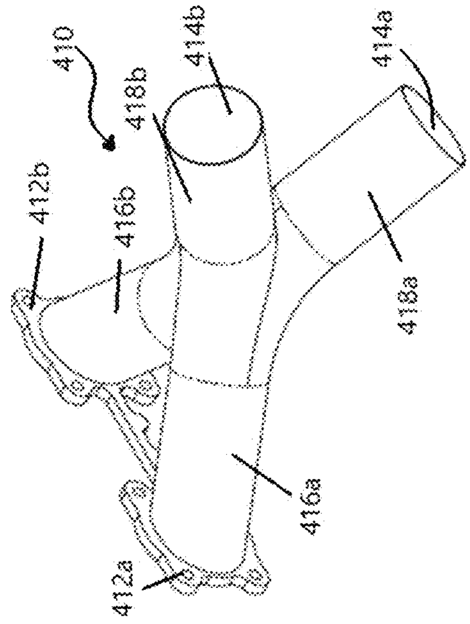
Figure 26C:
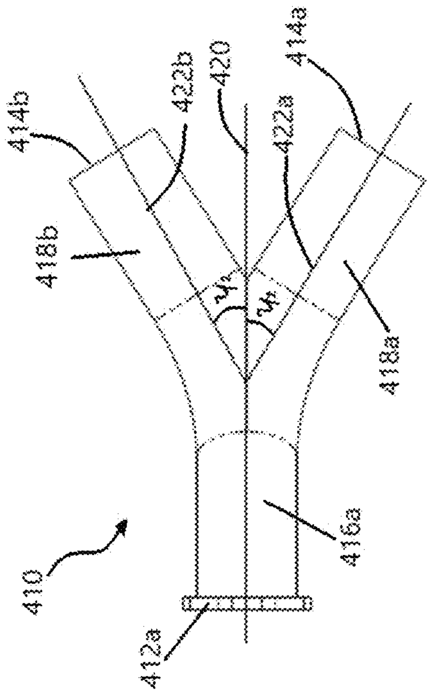
Figure 26D:
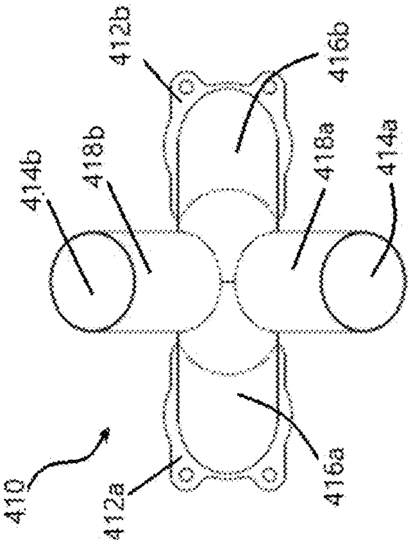

Referring now to FIGS. 26A-26D, an exhaust manifold 410 is illustrated according to some embodiments, wherein exhaust manifold 410 includes first and second exhaust inlets 412*a* and 412*b*, first and second outlets 414*a* and 414*b*, first and second inlet pipes 416*a*, 416*b*, and first and second outlet pipes 418*a*, 418*b*. FIG. 26A is a top view, FIG. 26B is a perspective view, FIG. 26C is a side view, and FIG. 26D is a front view.

In the embodiment shown in FIGS. 26A-26D, first and second inlets 412*a* and 412*b* are located on the same horizontal plane, and first and second outlets 414*a* and 414*b* are located on the same vertical plane, wherein first outlet 414*a* is located below second outlet 414*b*. In contrast with the embodiment shown in FIG. 24C, in which first outlet 252 is aligned on the same plane as first and second inlets 250*a* and 250*b*, in the embodiment shown in FIGS. 26A-26D first and second outlets 414*a* and 414*b* are offset from the plane defined by first and second inlets 412*a* and 412*b*. For example, as shown in FIG. 26C, a horizontal plane 420 is provided that includes both first and second inlets 412*a*, 412*b*. A first axis 422*a* is drawn through the center of first outlet pipe 418*a* and second axis is drawn through the center of second outlet pipe 418*b*. The angle between first axis 422*a* and the horizontal plane 420 is illustrated by angle $\gamma_1$ and the angle between second axis 422*b* and the horizontal plane 420 is illustrated by angle $\gamma_2$. In some embodiments, $\gamma_1$ is approximately equal to $\gamma_2$. In other embodiments, these angles may be modified to selectively control the flow of exhaust provided to first and second outlets 414*a* and 414*b*.

Figure 27B:
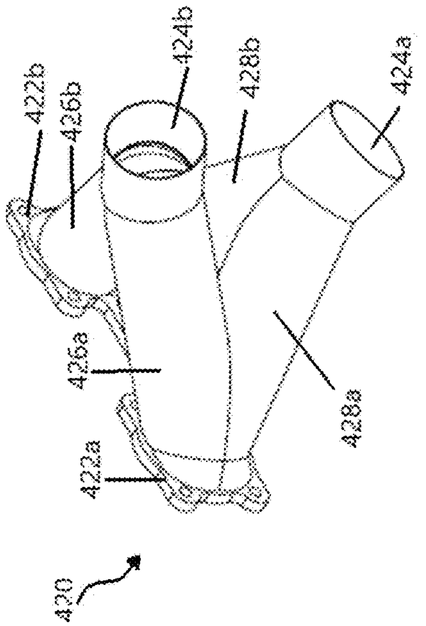
FIGS. 27A-27D are top, perspective, side, and front views of an exhaust manifold utilized to bifurcate the exhaust into first and second paths for the parallel path exhaust system according to various embodiments.
Figure 27D:
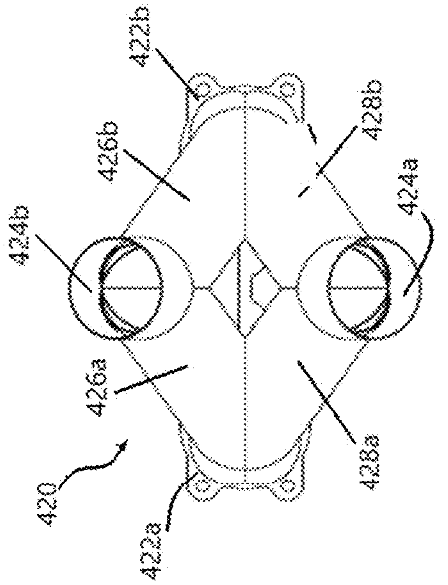
Figure 27A:
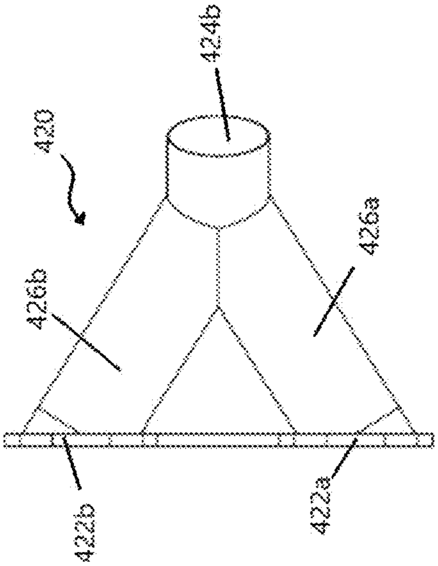

Referring now to FIGS. 27A-27D, an exhaust manifold 420 is illustrated according to some embodiments, wherein exhaust manifold 420 includes first and second exhaust inlets 422*a* and 422*b*, and first and second outlets 424*a* and 424*b*. In contrast with embodiments shown in FIGS. 25A-25D and 26A-26D in which each exhaust inlet is connected to a separate inlet pipe, the embodiment shown in FIGS. 27A-27D illustrates bifurcation of the exhaust at each inlet into first and second flows. For example, as shown in FIG. 27B, first inlet 422*a* is coupled to first upper inlet pipe 426*a* and first lower inlet pipe 428*a*. In this way, exhaust provided from a first cylinder to first inlet 422*a* is immediately bifurcated into first and second exhaust flows. Likewise, second inlet 422*b* is coupled to second upper inlet pipe 426*b* and second lower inlet pipe 428*b*, such that exhaust provided from a second cylinder to second inlet 422*b* is immediately bifurcated into first and second exhaust flows. Exhaust provided to first upper inlet pipe 426*a* and second upper inlet pipe 426*b* is combined and provided as an output to second outlet 424*b*. Likewise, exhaust provided to first lower inlet pipe 428*a* and second lower inlet pipe 428*b* is combined and provided as an output to first outlet 424*a*. In some embodiments, the diameter of first and second upper inlet pipes 426*a* and 426*b* are equal. In some embodiments, the diameter of first and second lower inlet pipes 428*a* and 428*b* are equal. In some embodiments, the diameter of first and second upper inlet pipes 426*a*, 426*b* is approximately equal to the first and second lower inlet pipes 428*a*, 428*b*. In other embodiments, the diameter of first and second upper inlet pipes 426*a*, 426*b* is greater than or less than the diameter of first and second lower inlet pipes 428*a*, 428*b*, depending on the flow requirements of the first and second parallel exhaust path.

Figure 27C:
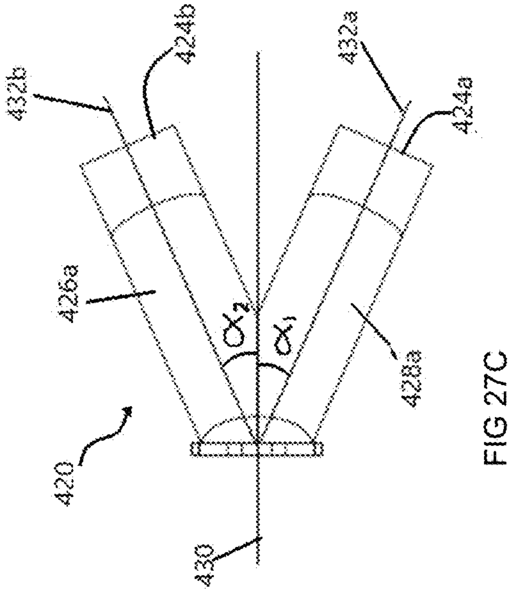

In some embodiments, first and second inlets 422*a* and 422*b* are located on the same horizontal plane, and first and second outlets 424*a* and 424*b* are located on the same vertical plane, wherein first outlet 424*a* is located below second outlet 424*b*. As shown in FIG. 27C, a horizontal plane 430 is provided that includes both first and second, inlets 422*a*, 422*b*. A first plane 432*a* is defined to include first and second inlets 422*a*, 422*b* and first outlet 424*a*. A second plane 432*b* is defined to include first and second inlets 422*a*, 422*b* and first outlet 424*b*. A first angle defined between horizontal plane 430 and plane 432*a* is provided as $\alpha_1$ and a second angle defined between horizontal plane 430 and plane 432*b* is provided as $\alpha_2$. In some embodiments, $\alpha_1$ is approximately equal to $\alpha_2$ other embodiments, these angles may be modified to selectively control the flow of exhaust provided to first and second outlets 424*a* and 424*b*.

Figure 28A:
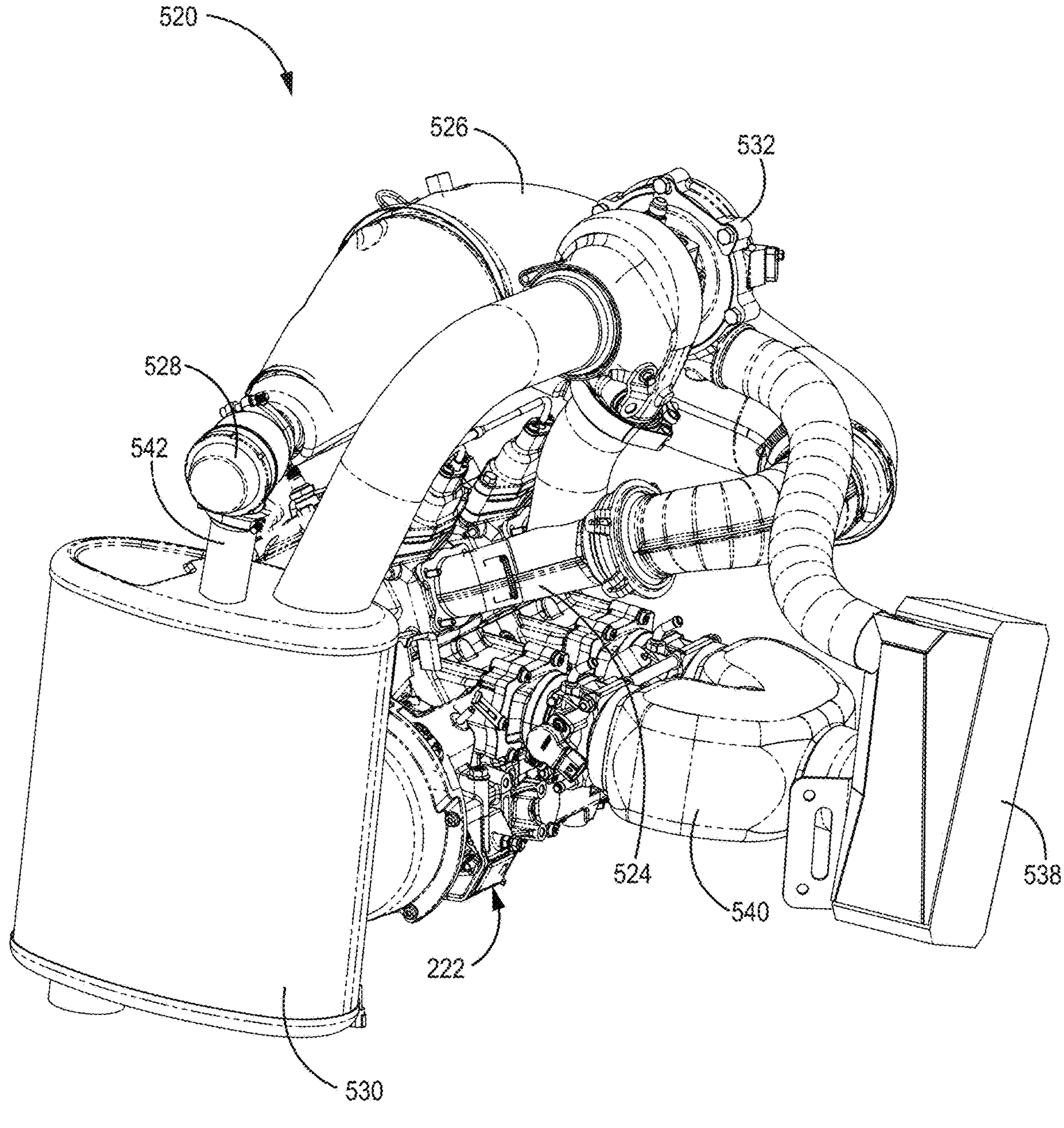
FIGS. 28A and 28B are perspective and exploded views, respectively, of a parallel path exhaust system, with the two-stroke engine removed in FIG. 28B for clarity according to some embodiments.
Figure 28B:
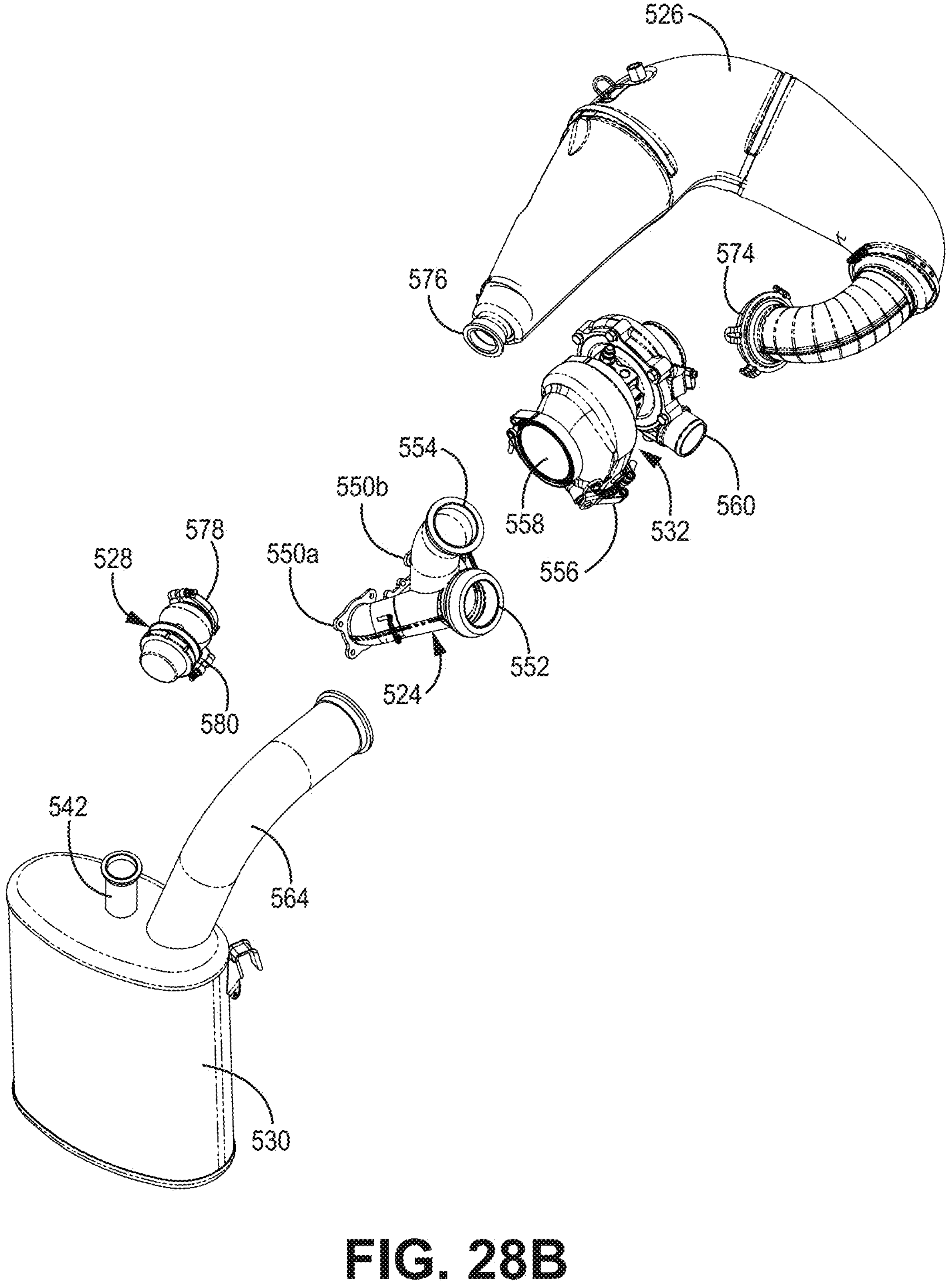

Referring now to FIGS. 28A-28B, a parallel-path exhaust system 520 utilized in conjunction with a two-stroke engine 222 are shown. In some embodiments, two-stroke engine 222 includes first and second cylinders. Compressed air provided by the turbocharger 532 and cooled by charge air cooler 538 is provided to the respective cylinders by intake plenum 540. Exhaust generated by the first and second cylinders of two-stroke engine 222 is provided to exhaust manifold 524. Various geometries of exhaust manifold may be utilized, as described above with respect to FIGS. 24A-27D. In general, exhaust manifold 524 bifurcates the exhaust provided by two-stroke engine 222 into first and second parallel paths. In some embodiments, the mass and/or volume of exhaust provided to the first and second parallel paths may be equal or unequal, and may change based on the operating condition of the two-stroke engine. In some embodiments, a first parallel path includes tuned expansion chamber 526, and a second parallel path includes turbocharger 532. As discussed above, turbocharger 532 includes an exhaust turbine that extracts mechanical energy from the received exhaust, and utilizes the extracted mechanical energy to drive a compressor to provide compressed air to the charge air cooler 538.

As shown in more detail in FIG. 28B, exhaust manifold 524 includes first and second inlets 550*a*, 550*b* connected to receive exhaust from first and second combustion cylinders, respectively. In addition, exhaust manifold 524 includes first outlet 552 and second outlet 554, wherein first outlet 552 provides exhaust to the first parallel path (e.g., to tuned expansion chamber 526) and second outlet 554 provides exhaust to the second parallel path (e.g., to turbocharger 532).

In some embodiments, tuned expansion chamber 526 includes expansion chamber inlet 574 and expansion chamber outlet 576. In some embodiments, expansion chamber inlet 574 is connected to first outlet 552 of exhaust manifold 524 to receive exhaust from both the first and second cylinders. The length and cross-sectional geometry of tuned expansion chamber 526 is selected to reflect wavefronts associated with the received exhaust back toward the first and second inlets 550*a*, 550*b* with an arrival timed to push any air/gas mixture drawn out of the engine back into the cylinder prior to the port closing before the next combustion cycle. In the embodiment shown in FIGS. 28A-28B, tuned expansion chamber 526 is coupled to first outlet 552. In some embodiments, expansion chamber outlet 576 is coupled to external wastegate 528 via wastegate inlet 578, which in turn is coupled via wastegate outlet 580 to exhaust pipe inlet 542 associated with exhaust muffler 530. In this embodiment, exhaust muffler 530 includes separate inlet pipes 542 and 564 for receiving exhaust from the first and second parallel paths. In particular, inlet pipe 542 is configured for connection to wastegate outlet 580, and inlet pipe 564 is configured for connection to exhaust inlet pipe 564, which in turn is connected to turbocharger 532 via exhaust outlet 558. In some embodiments, inlet pipe 542 is smaller in diameter than exhaust inlet pipe 564.

Figure 29:
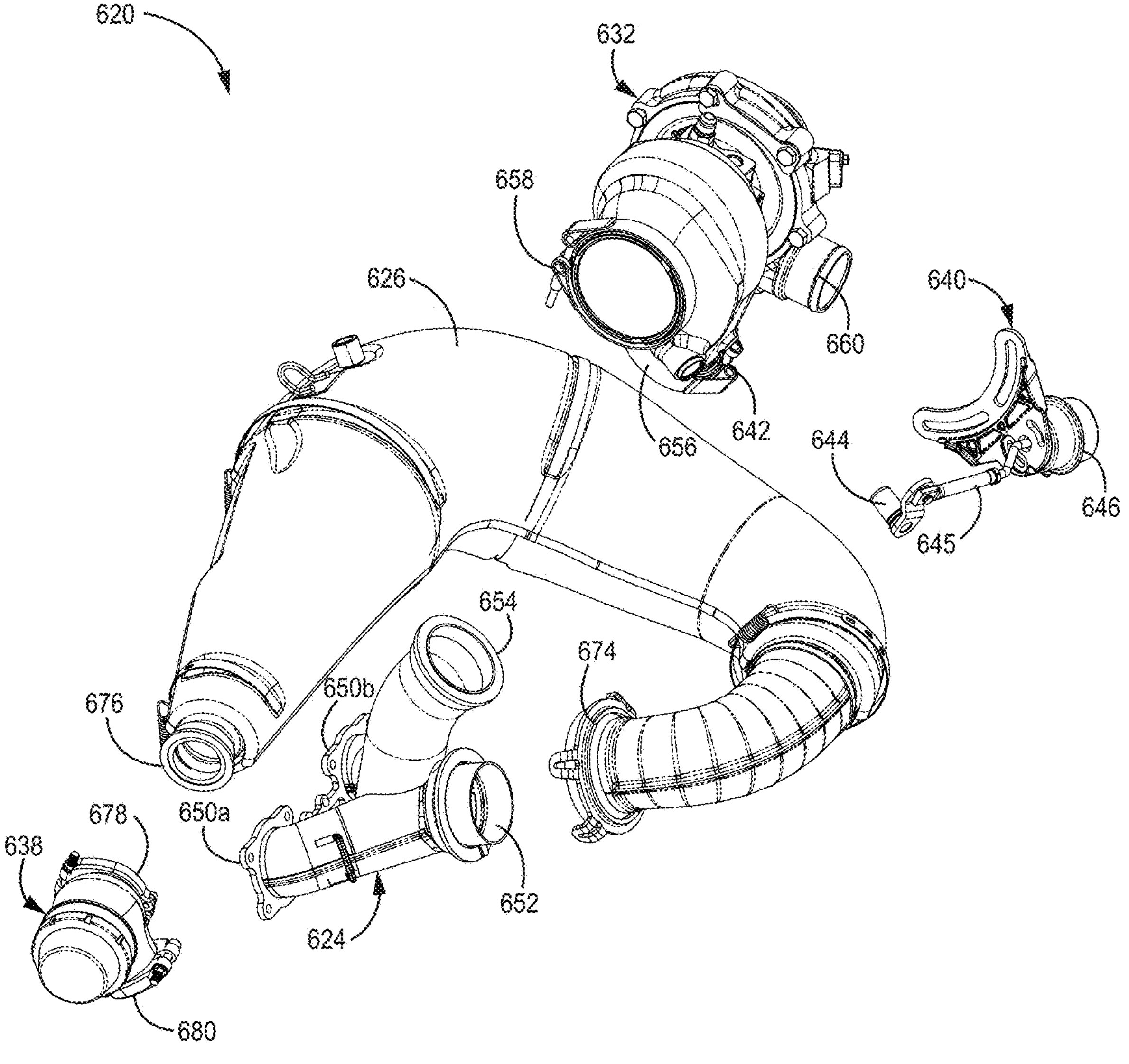
FIG. 29 is an exploded view of a parallel path exhaust system utilizing both an internal wastegate and an external wastegate according to some embodiments.

Referring now to FIG. 29, a parallel-path exhaust system 620 utilizing both an external wastegate 638 and an internal wastegate (not visible) is provided. As described above, the parallel-path exhaust system 620 includes an exhaust manifold 624, a tuned expansion chamber 626, a turbocharger 632 and an external wastegate 638. In some embodiments, the exhaust manifold 624 includes at least one inlet for receiving exhaust from the two-stroke engine. In some embodiments, such as that shown in FIG. 29, the exhaust manifold 624 includes first and second inlets 650*a* and 650*b*. In addition, exhaust manifold 624 includes first and second outlets 652 and 654. Various geometries associated with exhaust manifold 624 may be utilized, wherein the position of the exhaust inlets and exhaust outlets are selected to provide the desired bifurcation of exhaust within the given space constraints of the system.

In some embodiments, tuned expansion chamber 626 includes expansion chamber inlet 674 and expansion chamber outlet 676. In some embodiments, expansion chamber inlet 674 is connected to first outlet 652 of exhaust manifold 624 to receive exhaust from both the first and second cylinders. The length and cross-sectional geometry of tuned expansion chamber 626 is selected to reflect wavefronts associated with the received exhaust back toward the first and second inlets 650*a*, 650*b* with an arrival timed to push any air/gas mixture drawn out of the engine back into the cylinder prior to the port closing before the next combustion cycle. In the embodiment shown in FIG. 29, tuned expansion chamber 626 is coupled to first outlet 652. In some embodiments, expansion chamber outlet 676 is coupled to external wastegate 638 via wastegate inlet 678, which in turn is coupled via wastegate outlet 680 to the exhaust muffler (not shown). As described above, external wastegate 638 regulates the exhaust gas within the tuned expansion chamber 626. In some embodiments, external wastegate 638 may be utilized to regulate the flow of exhaust through the turbocharger 632. However, in the embodiment shown in FIG. 29, turbocharger 632 includes an internal wastegate (not shown) actuated by internal wastegate actuator 640. In some embodiments, external wastegate 638 is utilized to regulate the flow of exhaust through the tuned expansion chamber 626, and the internal wastegate associated with turbocharger 632 is utilized to regulate the flow of exhaust through the turbocharger 632. In other embodiments, the external wastegate 638 and internal wastegate (now shown) work in unison to control the flow of exhaust through both the tuned expansion chamber 626 and the turbocharger 632.

In some embodiments, turbocharger 632 includes an exhaust inlet 656 for receiving exhaust from the exhaust manifold (e.g., via exhaust outlet 654). Internal wastegate (not shown) provides a path for the received exhaust to bypass the turbine portion of the turbocharger 632, thereby reducing the mechanical energy extracted from the received exhaust. In some embodiments, internal wastegate is controlled or actuated by internal wastegate actuator 640, which includes pin assembly 644, lever 645, and diagram/spring assembly 646. In some embodiments, diagram/spring assembly 646 is configured to actuate lever 645 in response to changes in pressure. The actuation of lever 645 causes a rotation of pin assembly 644 within opening 642, which is configured to selectively open/close the valve associated with the internal wastegate. In some embodiments, diagram/spring assembly 646 is connected via hose (not shown) to the hose/tube connecting compressed air outlet 660 to the charge air cooler, such that actuation of the internal wastegate is related to the turbo boost pressure. In some embodiments, as turbo boost pressure increases, internal wastegate is actuated to decrease the flow of exhaust through the turbine, and as turbo boost pressure decreases, internal wastegate is actuated to increase the flow of exhaust through the turbine. In some embodiments, the turbo boost pressure is also utilized as input for controlling external wastegate 638. In some embodiments, a hose (not shown) connected to the hose/tube for providing compressed air to the charge air cooler provides turbo boost pressure input to the external wastegate 638. In other embodiments, actuation of the valves associated with external wastegate 638 and the internal wastegate (not shown) may be controlled by an engine control unit (ECU) (not shown) based on one or more measured inputs, including one or more of exhaust pressure, exhaust temperature, exhaust flow through the turbocharger, turbo boost pressure, etc. In this way, internal wastegate may be pneumatically actuated or electronically actuated, and may be based on one or more inputs as discussed above.

Figure 30:
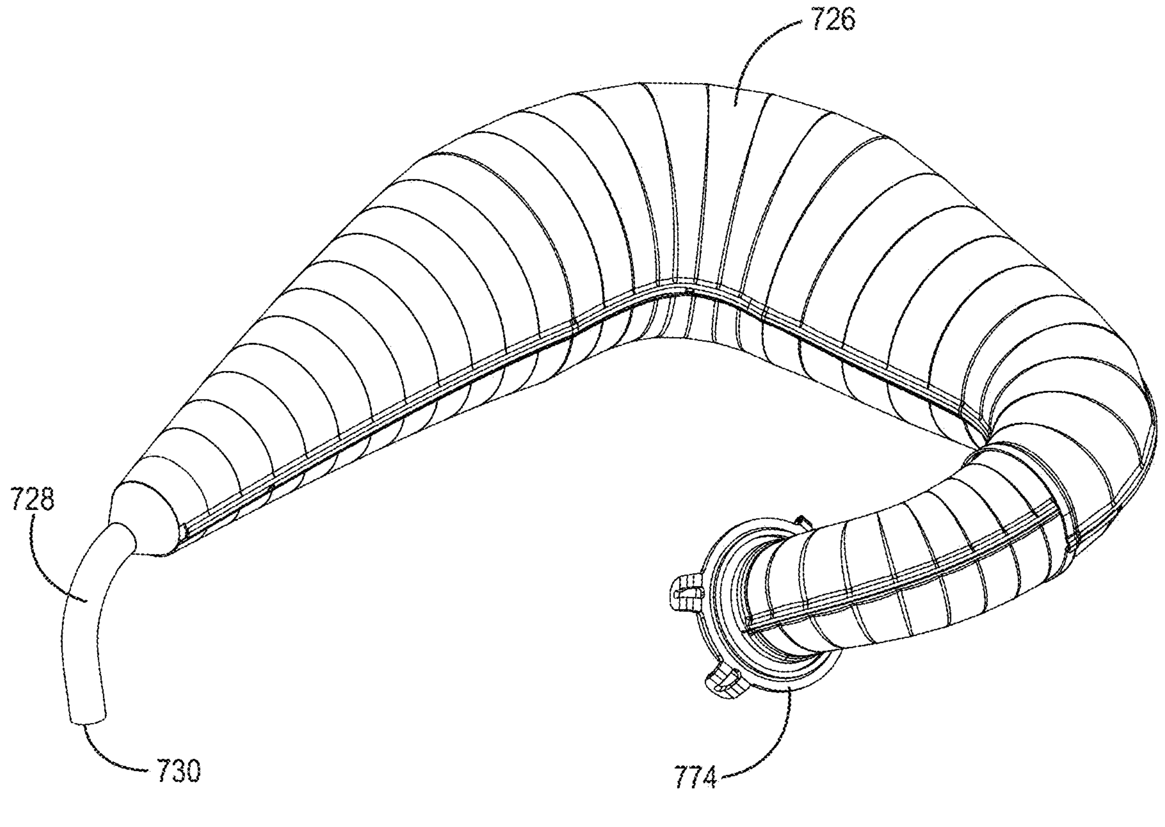
FIG. 30 is a perspective view of a tuned expansion chamber with a fixed flow orifice according to some embodiments.

Referring now to FIG. 30, a tuned expansion chamber 726 is shown that includes a fixed flow orifice 728. In some embodiments, tuned expansion chamber 726 includes exhaust inlet 774 and exhaust outlet 730. In some embodiments, exhaust flows through fixed flow orifice 728. The diameter of fixed flow orifice 728 is fixed, and therefore does not act to regulate the flow of exhaust provided by the tuned expansion chamber 726 to the exhaust muffler.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A snowmobile comprising:
- a frame;
- at least one ski;
- handlebars operatively coupled to the at least one ski;
- an engine assembly comprising an engine and an exhaust manifold, the exhaust manifold comprising:
  - at least a first inlet connected to at least a first exhaust port and a second inlet connected to a second exhaust port;
  - a first outlet connected to provide exhaust received from the first inlet and the second inlet to a first exhaust path; and
  - a second outlet connected to provide exhaust received from the first inlet and the second inlet to a second exhaust path, wherein the first inlet, the second inlet, and the first outlet are oriented in a shared horizontal plane and form a Y-shape and wherein the first outlet and the second outlet are aligned on a vertical plane, offset from one another in a vertical direction and co-located in a horizontal direction defined by the horizontal plane.

2. The snowmobile of claim 1, wherein the second outlet is oriented at an angle relative to the shared horizontal plane defined by the first inlet, the second inlet, and the first outlet.

3. A snowmobile comprising:
- a frame;
- at least one ski;
- handlebars operatively coupled to the at least one ski;
- an engine assembly comprising an engine and an exhaust manifold, the exhaust manifold having first and second inlets and first and second outlets, wherein the first inlet is connected to receive exhaust from a first cylinder and the second inlet is connected to receive exhaust from a second cylinder, wherein exhaust provided at the first and second inlets is communicated by the exhaust manifold to the first and second outlets;
- an expansion chamber having a first end connected to receive exhaust from the first outlet;
- an external wastegate connected to a second end of the expansion chamber; and
- a turbocharger connected to receive exhaust from the second outlet.

4. The snowmobile of claim 3, further including:
- an exhaust muffler connected to receive exhaust output from the turbocharger.

5. The snowmobile of claim 3, wherein the external wastegate is actuated in response to one or more of temperature measured within the expansion chamber, exhaust pressure, turbo boost pressure, and flow of exhaust through the turbocharger.

6. The snowmobile of claim 3, wherein the turbocharger includes an internal wastegate to regulate a flow of exhaust through the turbocharger.

7. The snowmobile of claim 3, wherein the first outlet is located above the second outlet.

8. The snowmobile of claim 3, wherein the first outlet is located below the second outlet.

9. The snowmobile of claim 3, wherein the first and second inlets are located on a horizontal plane.

10. The snowmobile of claim 3, wherein the first and second inlets and the first outlet are located on a shared horizontal plane in a Y-shaped configuration and the second outlet is oriented at an angle relative to the shared horizontal plane defined by the first inlet, the second inlet, and the first outlet.

11. A snowmobile comprising:
- a frame;
- at least one ski;
- handlebars operatively coupled to the at least one ski;
- an engine system comprising:
  - a two-stroke engine having at least a first combustion cylinder;
  - an exhaust manifold having at least a first inlet and first and second outlets, wherein the first inlet is connected to receive exhaust from the first combustion cylinder, wherein exhaust provided at the first inlet is communicated by the exhaust manifold to the first and second outlets;
  - an expansion chamber having a first end connected to receive exhaust from the first outlet and a second end connected to an external wastegate;
  - a turbocharger connected to the second outlet to receive exhaust from the exhaust manifold and to utilize the received exhaust to generate compressed air, wherein the external wastegate regulates a flow of exhaust through the expansion chamber and through the turbocharger;

an exhaust muffler connected to receive exhaust output from the turbocharger; and an intake manifold connected to receive compressed air from the turbocharger and to provide the compressed air to the first combustion cylinder for combustion.

12. The engine system of claim 11, wherein the turbocharger includes an internal wastegate, wherein the internal wastegate controls a flow of exhaust through the turbocharger.

13. The engine system of claim 11, wherein the two-stroke engine includes at least a second combustion cylinder and wherein the exhaust manifold includes at least a second inlet connected to receive exhaust from the second combustion cylinder, wherein the first and second inlets and the first outlet are located on a shared horizontal plane in a Y-shaped configuration and the second outlet is oriented at an angle relative to the shared horizontal plane defined by the first inlet, the second inlet, and the first outlet.

14. The engine system of claim 13, wherein the second outlet is oriented at an angle of less than ninety degrees relative to the shared horizontal plane.

* * * * *